US012580463B2

(12) United States Patent
Takeda et al.

(10) Patent No.: US 12,580,463 B2
(45) Date of Patent: Mar. 17, 2026

(54) BONDED AND STACKED CORE MANUFACTURING METHOD

(71) Applicant: NIPPON STEEL CORPORATION, Tokyo (JP)

(72) Inventors: Kazutoshi Takeda, Tokyo (JP); Shinsuke Takatani, Tokyo (JP); Ryu Hirayama, Tokyo (JP); Minako Fukuchi, Tokyo (JP); Yoshiaki Iwase, Nagoya (JP); Makoto Niwa, Nagoya (JP); Makoto Hirakawa, Nagoya (JP)

(73) Assignee: NIPPON STEEL CORPORATION, Tokyo (JP)

( * ) Notice: Subject to any disclaimer, the term of this patent is extended or adjusted under 35 U.S.C. 154(b) by 139 days.

(21) Appl. No.: 18/286,534

(22) PCT Filed: Apr. 13, 2022

(86) PCT No.: PCT/JP2022/017687
§ 371 (c)(1),
(2) Date: Oct. 11, 2023

(87) PCT Pub. No.: WO2022/220260
PCT Pub. Date: Oct. 20, 2022

(65) Prior Publication Data
US 2024/0204634 A1 Jun. 20, 2024

(30) Foreign Application Priority Data

Apr. 14, 2021 (JP) ................................. 2021-068134

(51) Int. Cl.
*H02K 15/12* (2025.01)
*H02K 15/02* (2025.01)

(52) U.S. Cl.
CPC ............. *H02K 15/12* (2013.01); *H02K 15/02* (2013.01); *H02K 2201/09* (2013.01)

(58) Field of Classification Search
CPC .... H02K 15/12; H02K 15/02; H02K 2201/09; C08K 5/0025; C08K 3/011; H01F 41/0233; H01F 41/02; B32B 37/12; C09J 5/00
See application file for complete search history.

(56) References Cited

U.S. PATENT DOCUMENTS 5,730,828 A 3/1998 Somemiya et al.
2015/0097463 A1 4/2015 Blocher et al.
(Continued)

FOREIGN PATENT DOCUMENTS

CA 3 131 521 A1 6/2020
CA 3 131 659 A1 6/2020
(Continued)

*Primary Examiner* — Jeffrey T Carley
*Assistant Examiner* — Jose K Abraham
(74) *Attorney, Agent, or Firm* — Birch, Stewart, Kolasch & Birch, LLP

(57) ABSTRACT

This bonded and stacked core manufacturing method is a method for manufacturing a bonded and stacked core by performing press working on a strip-shaped steel sheet with a press working oil applied to one surface or both surfaces thereof, applying an anaerobic adhesive and an instantaneous adhesive to one surface of the strip-shaped steel sheet to obtain a plurality of steel sheet components, and stacking and bonding the steel sheet components, in which a curing accelerating layer is formed by applying an anaerobic adhesive curing accelerator and an instantaneous adhesive curing accelerator to one surface or both surfaces of the strip-shaped steel sheet before the press working oil is applied, and drying the adhesive curing accelerator and the instantaneous adhesive curing accelerator.

10 Claims, 27 Drawing Sheets

(56)           References Cited

U.S. PATENT DOCUMENTS

| | | | |
|---|---|---|---|
| 2018/0056629 A1* | 3/2018 | Hamamura | H02K 1/185 |
| 2020/0086619 A1 | 3/2020 | Nakagawa et al. | |
| 2021/0091644 A1* | 3/2021 | Maruyama | H02K 15/02 |
| 2021/0171813 A1 | 6/2021 | Kaneko | |
| 2021/0296975 A1* | 9/2021 | Hino | H02K 15/02 |
| 2021/0332464 A1 | 10/2021 | Uesaka et al. | |
| 2022/0006336 A1 | 1/2022 | Takeda et al. | |
| 2022/0014053 A1 | 1/2022 | Takeda et al. | |
| 2023/0119661 A1 | 4/2023 | Lewe et al. | |
| 2023/0253140 A1 | 8/2023 | Takeda et al. | |

FOREIGN PATENT DOCUMENTS

| | | | | |
|---|---|---|---|---|
| CN | 107776170 A | 3/2018 | | |
| CN | 111433303 A | 7/2020 | | |
| EP | 4 181 365 A1 | 5/2023 | | |
| JP | 2-232319 A | 9/1990 | | |
| JP | 8-295853 A | 11/1996 | | |
| JP | 2002-249881 A | 9/2002 | | |
| JP | 2006-334648 A | 12/2006 | | |
| JP | 2011-23523 A | 2/2011 | | |
| JP | 4648765 B2 | 3/2011 | | |
| JP | 2013089883 A * | 5/2013 | | |
| JP | 2016-125142 A | 7/2016 | | |
| JP | 2016-138333 A | 8/2016 | | |
| JP | 2017-11863 A | 1/2017 | | |
| JP | 6164029 B2 | 7/2017 | | |
| JP | 2018-38119 A | 3/2018 | | |
| JP | 2019-112475 A | 7/2019 | | |
| JP | 2019-212756 A | 12/2019 | | |
| JP | 7467634 B2 | 4/2024 | | |
| TW | 202043502 A | 12/2020 | | |
| WO | WO-2016200024 A1 * | 12/2016 | | H02K 15/02 |
| WO | WO 2018/116881 A1 | 6/2018 | | |
| WO | WO 2019/123885 A1 | 6/2019 | | |
| WO | WO 2020/129921 A1 | 6/2020 | | |
| WO | WO 2020/129929 A1 | 6/2020 | | |
| WO | WO 2022/009878 A1 | 1/2022 | | |

* cited by examiner

FIG. 15

BONDED AND STACKED CORE MANUFACTURING METHOD

TECHNICAL FIELD OF THE INVENTION

The present invention relates to a bonded and stacked core manufacturing method and a bonded and stacked core manufacturing apparatus.

Priority is claimed on Japanese Patent Application No. 2021-068134, filed Apr. 14, 2021, the content of which is incorporated herein by reference.

RELATED ART

For example, a rotary electric machine used as an electric motor includes a stacked core. This stacked core is manufactured by punching a strip-shaped steel sheet into a predetermined shape a plurality of times while intermittently feeding the strip-shaped steel sheet, and stacking a plurality of the obtained steel sheet components. The steel sheet components are fixed to each other by welding, bonding, crimping, or the like, and among these, a fixing method by bonding has attracted attention from a viewpoint of effectively suppressing core loss of the stacked core.

For example, Patent Document 1 below discloses a method for manufacturing a metal sheet stacked body by sequentially performing a plurality of press workings on a hoop material with a press working oil applied to one surface or both surfaces thereof, applying an adhesive to one surface of the hoop material, then performing outer shape punching to obtain a metal sheet, and stacking and bonding a predetermined number of the metal sheets, in which a curing accelerator is added to the press working oil.

It is described that according to this method for manufacturing a metal sheet stacked body, the curing accelerator is added to the press working oil, and therefore bonding between the metal sheets is quickly and firmly performed without removing the press working oil, simplification of a manufacturing step, miniaturization of a die in a forward feed die device, and the like are possible, and improvement of product quality and productivity, miniaturization of manufacturing equipment, and the like are achieved.

In addition, Patent Document 2 below discloses a punching stacking press method for punching a steel sheet component having a predetermined shape from an intermittently fed strip-shaped steel sheet and stacking the steel sheet component, the punching stacking press method including: a first application step of applying one of an adhesive and a curing accelerator for accelerating curing of the adhesive to a lower surface of the strip-shaped steel sheet on an upstream side of a press working position at which the steel sheet component is punched from the strip-shaped steel sheet; and a second application step of applying the other of the adhesive and the curing accelerator to an upper surface of the strip-shaped steel sheet at the press working position.

It is described that according to this punching stacking press method, time for curing the adhesive can be significantly shortened by performing the first application step and the second application step, and productivity of a core manufactured by stacking a plurality of steel sheet components can be enhanced.

CITATION LIST

Patent Document

[Patent Document 1]
   Japanese Patent No. 4648765
[Patent Document 2]
   Japanese Patent No. 6164029

SUMMARY OF INVENTION

Problems to be Solved by the Invention

According to the method for manufacturing a metal sheet stacked body of Patent Document 1, bonding between the metal sheets can be quickly performed by using the curing accelerator. Since the curing accelerator is applied in a diluted state by addition of the press working oil, it is necessary to increase the content of the curing accelerator to a considerable amount when a higher curing accelerating effect is required. However, in this case, since a ratio of the press working oil is reduced this time, there is a concern that punching workability at the time of punching the metal sheet may be affected.

In addition, according to the punching stacking press method of Patent Document 2 described above, the time for curing the adhesive can be significantly shortened. However, also here, an influence of the press working oil, which is essential for punching, on the curing accelerator has not been studied at all.

As described above, in order to further enhance the productivity of the bonded and stacked core, a lubricating function of the press working oil at the time of punching the steel sheet and a curing accelerating function of the adhesive by using the curing accelerator at the time of bonding of the steel sheet need to be exhibited at a higher level. However, conventionally, an application form of the curing accelerator has not been sufficiently studied.

The present invention has been made in view of the above circumstances, and an object of the present invention is to provide a bonded and stacked core manufacturing method and a bonded and stacked core manufacturing apparatus capable of obtaining higher productivity while ensuring sufficient bonding strength in manufacture of a bonded and stacked core.

Means for Solving the Problem

In order to solve the above problems, the present invention adopts the following means.

(1) A bonded and stacked core manufacturing method according to an aspect of the present invention is
   a method for manufacturing a bonded and stacked core by performing press working on a strip-shaped steel sheet with a press working oil applied to one surface or both surfaces thereof, applying an anaerobic adhesive and an instantaneous adhesive to one surface of the strip-shaped steel sheet to obtain a plurality of steel sheet components, and stacking and bonding the steel sheet components, in which
   a curing accelerating layer is formed by applying an anaerobic adhesive curing accelerator and an instantaneous adhesive curing accelerator to one surface or both surfaces of the strip-shaped steel sheet before the press working oil is applied, and drying the anaerobic adhesive curing accelerator and the instantaneous adhesive curing accelerator.

According to the bonded and stacked core manufacturing method described in the above (1), both the anaerobic adhesive curing accelerator and the instantaneous adhesive curing accelerator are not naturally dried but are actively dried by heating or application of a blowing air or the like. As described above, since the curing accelerating layer is formed by actively drying the curing accelerators previously, dilution of the curing accelerators due to mixing with a press working oil applied in post-working is suppressed. Therefore, when the steel sheet components are stacked and bonded to each other, the anaerobic adhesive curing accelerator can be mixed with the anaerobic adhesive while maintaining a high concentration thereof, and the instantaneous adhesive curing accelerator can also be mixed with the instantaneous adhesive while maintaining a high concentration thereof. Therefore, high bonding strength can be expressed early. Therefore, it is possible to obtain higher productivity while ensuring sufficient bonding strength. Furthermore, by using an anaerobic adhesive that has strong heat resistance and slowly expresses initial strength and an instantaneous adhesive that rapidly expresses initial strength in combination, the steel sheet components can be handled immediately after being stacked and bonded. Therefore, by transferring the bonded and stacked core obtained by stacking and bonding to a next step early or transferring the bonded and stacked core to the outside of a workspace, the workspace can be vacated.

(2) In the bonded and stacked core manufacturing method described in the above (1), the anaerobic adhesive curing accelerator and the instantaneous adhesive curing accelerator may be arranged in a checker shape.

According to the bonded and stacked core manufacturing method described in the above (2), the anaerobic adhesive curing accelerator and the instantaneous adhesive curing accelerator can be uniformly arranged along an application surface of the strip-shaped steel sheet. Therefore, a bonding force along the application surface can be uniform.

(3) In the bonded and stacked core manufacturing method described in the above (1), the curing accelerating layer may be formed by applying the anaerobic adhesive curing accelerator and the instantaneous adhesive curing accelerator to one surface or both surfaces of the strip-shaped steel sheet in a state where the anaerobic adhesive curing accelerator and the instantaneous adhesive curing accelerator are previously mixed, and drying the anaerobic adhesive curing accelerator and the instantaneous adhesive curing accelerator.

According to the bonded and stacked core manufacturing method described in the above (3), the anaerobic adhesive curing accelerator and the instantaneous adhesive curing accelerator can be uniformly arranged along an application surface of the strip-shaped steel sheet. Therefore, a bonding force along the application surface can be uniform.

(4) In the bonded and stacked core manufacturing method described in the above (1), the anaerobic adhesive curing accelerator and the instantaneous adhesive curing accelerator may be arranged in a stripe shape to form the curing accelerating layer.

According to the bonded and stacked core manufacturing method described in the above (4), the anaerobic adhesive curing accelerator and the instantaneous adhesive curing accelerator can be uniformly arranged along an application surface of the strip-shaped steel sheet. Therefore, a bonding force along the application surface can be uniform.

(5) In the bonded and stacked core manufacturing method described in any one of the above (1) to (4), the following may be adopted.

The steel sheet components include a first steel sheet component and a second steel sheet component, and the method includes:

a first step of preparing the first steel sheet component having a first surface, the curing accelerating layer formed on the first surface, and the press working oil disposed on the curing accelerating layer;

a second step of preparing the second steel sheet component having a second surface, and the anaerobic adhesive and the instantaneous adhesive disposed on the second surface; and a third step of superimposing and bonding the first steel sheet component and the second steel sheet component such that the first surface and the second surface face each other.

According to the bonded and stacked core manufacturing method described in the above (5), in the first step, both the anaerobic adhesive curing accelerator and the instantaneous adhesive curing accelerator are formed into the previously dried curing accelerating layer, and mixing of the anaerobic adhesive curing accelerator and the instantaneous adhesive curing accelerator with the press working oil is suppressed. Therefore, when the first steel sheet component and the second steel sheet component are superimposed and bonded in the third step, the anaerobic adhesive curing accelerator can be mixed with the anaerobic adhesive while maintaining a high concentration thereof, and the instantaneous adhesive curing accelerator can also be mixed with the instantaneous adhesive while maintaining a high concentration thereof.

(6) In the bonded and stacked core manufacturing method described in any one of the above (1) to (4), the following may be adopted.

The steel sheet components include a first steel sheet component and a second steel sheet component, and the method includes:

a fourth step of preparing the first steel sheet component having a first surface, the curing accelerating layer formed on the first surface, the press working oil disposed on the curing accelerating layer, and the anaerobic adhesive and the instantaneous adhesive disposed on the press working oil;

a fifth step of preparing the second steel sheet component having a second surface; and a sixth step of superimposing and bonding the first steel sheet component and the second steel sheet component such that the first surface and the second surface face each other.

According to the bonded and stacked core manufacturing method described in the above (6), in the fourth step, both the anaerobic adhesive curing accelerator and the instantaneous adhesive curing accelerator are formed into the previously dried curing accelerating layer, and mixing of the anaerobic adhesive curing accelerator and the instantaneous adhesive curing accelerator with the press working oil is suppressed. Therefore, when the first steel sheet component and the second steel sheet component are superimposed and bonded in the sixth step, the anaerobic adhesive curing accelerator can be mixed with the anaerobic adhesive while maintaining a high concentration thereof, and the instantaneous adhesive curing accelerator can also be mixed with the instantaneous adhesive while maintaining a high concentration thereof.

(7) In the bonded and stacked core manufacturing method described in any one of the above (1) to (6), the anaerobic adhesive curing accelerator may contain an active component that accelerates anaerobic curing, selected from titanium, chromium, manganese, iron, cobalt, nickel, copper, zinc, silver, vanadium, molybdenum, ruthenium, saccharin, and combinations thereof.

That is, the active component that accelerates curing of the anaerobic adhesive is selected from titanium, chromium, manganese, iron, cobalt, nickel, copper, zinc, silver, vanadium, molybdenum, ruthenium, saccharin, and combinations thereof. The active component that accelerates anaerobic curing may be preferably selected from copper, iron, vanadium, cobalt, chromium, silver, manganese, and combinations thereof. The active component that accelerates anaerobic curing may be desirably copper, iron, vanadium, cobalt, chromium, or a combination thereof. The active component that accelerates anaerobic curing is desirably provided in a form of a metal oxide or a salt. Preferred examples of the active component that accelerates anaerobic curing include one or a combination of two or more selected from vanadium acetylacetonate, vanadyl acetylacetonate, vanadyl stearate, vanadium propoxide, vanadium butoxide, vanadium pentoxide, cobalt naphthenate, manganese naphthenate, copper hexanoate, and copper(II) bis(2-ethylhexanoate).

According to the bonded and stacked core manufacturing method described in the above (7), curing of the anaerobic adhesive proceeds quickly and completely, and thus the method has advantages that the method is extremely excellent particularly in short time manufacture or manufacture requiring suppression of outgassing or the like, and can improve productivity.

(8) In the bonded and stacked core manufacturing method described in any one of the above (1) to (7), the instantaneous adhesive curing accelerator may contain an active component that accelerates curing of a 2-cyanoacrylate-based adhesive, selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride or the like, and combinations thereof.

That is, specific examples of the active component that accelerates curing of the instantaneous adhesive are selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride, and combinations thereof. Preferred examples thereof include one or a combination of two or more selected from organic amines such as dimethylaniline, diethylamine, o-phenylenediamine, dimethyl para-toluidine, diethyl para-toluidine, and N,N-diethylaniline.

According to the bonded and stacked core manufacturing method described in the above (8), curing of the instantaneous adhesive proceeds quickly and completely, and thus the method has advantages that the method is extremely excellent particularly in short time manufacture or manufacture requiring suppression of outgassing or the like, and can improve productivity.

(9) In the bonded and stacked core manufacturing method described in any one of the above (1) to (8), at least one of the anaerobic adhesive curing accelerators and the instantaneous adhesive curing accelerator may be diluted with a solvent such as a ketone-based solvent, an alcohol-based solvent, an ester-based solvent, a glycol ether-based solvent, a hydrocarbon-based solvent, a halogenated hydrocarbon-based solvent, an ether-based solvent, a glycol-based solvent, or an amine-based solvent.

As the type of solvent, one or a combination of two or more selected from the above types of solvents is selected. In manufacture of the bonded and stacked core, one or a combination of two or more selected from ethyl acetate, acetone, ethanol, methanol, butanol, toluene, and heptane is preferable.

(10) In the bonded and stacked core manufacturing method described in any one of the above (1) to (9), the bonded and stacked core may be a stator for a rotary electric machine.

According to the bonded and stacked core manufacturing method described in the above (10), since higher productivity can be obtained while ensuring sufficient bonding strength, it is possible to manufacture a stator for a rotary electric machine having high performance and low manufacturing cost.

(11) A bonded and stacked core manufacturing apparatus according to an aspect of the present invention is an apparatus for manufacturing a bonded and stacked core including a plurality of steel sheet components punched from a strip-shaped steel sheet, the apparatus including:

a press working oil application unit that applies a press working oil to one surface or both surfaces of the strip-shaped steel sheet;

a press working unit that applies press working to the strip-shaped steel sheet;

an adhesive application unit that applies an anaerobic adhesive and an instantaneous adhesive to one surface of the strip-shaped steel sheet; and a curing accelerating layer forming unit that forms a curing accelerating layer obtained by applying an anaerobic adhesive curing accelerator and an instantaneous adhesive curing accelerator to one surface or both surfaces of the strip-shaped steel sheet before the press working oil is applied, and drying the anaerobic adhesive curing accelerator and the instantaneous adhesive curing accelerator.

According to the bonded and stacked core manufacturing apparatus described in the above (11), both the anaerobic adhesive curing accelerator and the instantaneous adhesive curing accelerator are not naturally dried but are actively dried by heating or application of a blowing air or the like by the curing accelerating layer forming unit. As described above, since the curing accelerating layer is formed by actively drying the curing accelerators previously, dilution of the curing accelerators due to mixing with a press working oil applied in post-working is suppressed. Therefore, when the steel sheet components are stacked and bonded to each other, the anaerobic adhesive curing accelerator can be mixed with the anaerobic adhesive while maintaining a high concentration thereof, and the instantaneous adhesive curing accelerator can also be mixed with the instantaneous adhesive while maintaining a high concentration thereof. Therefore, high bonding strength can be expressed early. Therefore, it is possible to obtain higher productivity while ensuring sufficient bonding strength.

(12) In the bonded and stacked core manufacturing apparatus described in the above (11), the curing accelerating layer forming unit may include a nozzle that applies the anaerobic adhesive curing accelerator and the instantaneous adhesive curing accelerator in a checker shape.

According to the bonded and stacked core manufacturing apparatus described in the above (12), the anaerobic adhesive curing accelerator and the instantaneous adhesive curing accelerator can be uniformly arranged along an application surface of the strip-shaped steel sheet by the nozzle. Therefore, a bonding force along the application surface can be uniform.

(13) In the bonded and stacked core manufacturing apparatus described in the above (11)

the curing accelerating layer forming unit may include a curing accelerator supply flow path through which the anaerobic adhesive curing accelerator and the instantaneous adhesive curing accelerator flow in a state where the anaerobic adhesive curing accelerator and the instantaneous adhesive curing accelerator are previously mixed, and a nozzle leading to the curing accelerator supply flow path.

According to the bonded and stacked core manufacturing apparatus described in the above (13), the anaerobic adhesive curing accelerator and the instantaneous adhesive curing accelerator can be uniformly arranged along an application surface of the strip-shaped steel sheet by the nozzle. Therefore, a bonding force along the application surface can be uniform.

(14) In the bonded and stacked core manufacturing apparatus described in the above (11), the curing accelerating layer forming unit may include a nozzle that applies the anaerobic adhesive curing accelerator and the instantaneous adhesive curing accelerator in a stripe shape.

According to the bonded and stacked core manufacturing apparatus described in the above (14), the anaerobic adhesive curing accelerator and the instantaneous adhesive curing accelerator can be uniformly arranged along an application surface of the strip-shaped steel sheet by the nozzle. Therefore, a bonding force along the application surface can be uniform.

(15) In the bonded and stacked core manufacturing apparatus described in the above (11), the following constitution may be adopted.

The apparatus includes:

a first stage including the curing accelerating layer forming unit; and a second stage including a conveyance unit that feeds the strip-shaped steel sheet transferred from the first stage toward the press working oil application unit, in which on the second stage, the conveyance unit, the press working oil application unit, the press working unit, and the adhesive application unit are arranged in this order in a feeding direction of the strip-shaped steel sheet.

According to the bonded and stacked core manufacturing apparatus described in the above (15), the strip-shaped steel sheets on which the curing accelerating layer is previously formed can be collectively prepared and stored in the first stage. Then, from among these strip-shaped steel sheets, a necessary number of strip-shaped steel sheets are taken out and transferred to the second stage, a press working oil can be applied thereto, an anaerobic adhesive and an instantaneous adhesive can be applied thereto, and the steel sheet component can be bonded to each other. As described above, even when the bonded and stacked core manufacturing apparatus is divided into the first stage and the second stage, it is possible to obtain higher productivity while ensuring sufficient bonding strength.

(16) In the bonded and stacked core manufacturing apparatus described in any one of the above (11) to (15), the anaerobic adhesive curing accelerator may contain an active component that accelerates anaerobic curing, selected from titanium, chromium, manganese, iron, cobalt, nickel, copper, zinc, silver, vanadium, molybdenum, ruthenium, saccharin, and combinations thereof.

That is, in the bonded and stacked core manufacturing apparatus described in the above (16), examples of the curing accelerator of the anaerobic adhesive include a curing accelerator containing an active component that accelerates anaerobic curing.

The active component that accelerates anaerobic curing is selected from titanium, chromium, manganese, iron, cobalt, nickel, copper, zinc, silver, vanadium, molybdenum, ruthenium, saccharin, and combinations thereof. The active component that accelerates anaerobic curing may be preferably selected from copper, iron, vanadium, cobalt, chromium, silver, manganese, and combinations thereof. The active component that accelerates anaerobic curing may be desirably copper, iron, vanadium, cobalt, chromium, or a combination thereof. The active component that accelerates anaerobic curing is desirably provided in a form of a metal oxide or a salt. Preferred examples of the active component that accelerates anaerobic curing include one or a combination of two or more selected from vanadium acetylacetonate, vanadyl acetylacetonate, vanadyl stearate, vanadium propoxide, vanadium butoxide, vanadium pentoxide, cobalt naphthenate, manganese naphthenate, copper hexanoate, and copper(II) bis(2-ethylhexanoate).

According to the bonded and stacked core manufacturing apparatus described in the above (16), curing of the anaerobic adhesive proceeds quickly and completely, and thus the apparatus has advantages that the apparatus is extremely excellent particularly in short time manufacture or manufacture requiring suppression of outgassing or the like, and can improve productivity.

(17) In the bonded and stacked core manufacturing apparatus described in any one of the above (11) to (16), the instantaneous adhesive curing accelerator may contain an active component that accelerates curing of a 2-cyanoacrylate-based adhesive, selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride or the like, and combinations thereof.

That is, in the bonded and stacked core manufacturing apparatus described in the above (17), examples of the instantaneous adhesive curing accelerator include a curing accelerator containing an active component that accelerates curing of a 2-cyanoacrylate-based adhesive.

Specific examples of the active component that accelerates curing of the 2-cyanoacrylate-based adhesive are selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride, and combinations thereof. Preferred examples thereof include one or a combination of two or more selected from organic amines such as dimethylaniline, diethylamine, o-phenylenediamine, dimethyl para-toluidine, diethyl para-toluidine, and N,N-diethylaniline.

According to the bonded and stacked core manufacturing apparatus described in the above (17), curing of the instantaneous adhesive proceeds quickly and completely, and thus the apparatus has advantages that the apparatus is extremely excellent particularly in short time manufacture or manufacture requiring suppression of outgassing or the like, and can improve productivity.

(18) In the bonded and stacked core manufacturing apparatus described in any one of the above (11) to (17), the bonded and stacked core may be a stator for a rotary electric machine.

According to the bonded and stacked core manufacturing apparatus described in the above (18), since higher productivity can be obtained while ensuring sufficient bonding strength, it is possible to manufacture a stator for a rotary electric machine having high performance and low manufacturing cost.

Effects of the Invention

According to the above aspects of the present invention, it is possible to provide a bonded and stacked core manufacturing method and a bonded and stacked core manufacturing apparatus capable of obtaining higher productivity while ensuring sufficient bonding strength in manufacture of a bonded and stacked core.

BRIEF DESCRIPTION OF THE DRAWINGS

FIG. 5 is a diagram for explaining a first aspect of the bonded and stacked core manufacturing method according to the embodiment, in which FIG. 5(a) is a partial longitudinal cross-sectional view indicating a stacking and bonding step, and FIG. 5(b) is a cross-sectional view taken along line A-A of FIG. 5(a).

FIG. 6 is a diagram for explaining a second aspect of the bonded and stacked core manufacturing method according to the embodiment, in which FIG. 6(a) is a partial longitudinal cross-sectional view indicating a stacking and bonding step, and FIG. 6(b) is a cross-sectional view taken along line B-B of FIG. 6(a).

FIG. 7 is a diagram for explaining a third aspect of the bonded and stacked core manufacturing method according to the embodiment, in which FIG. 7(a) is a partial longitudinal cross-sectional view indicating a stacking and bonding step, and FIG. 7(b) is a cross-sectional view taken along line C-C of FIG. 7(a).

FIG. 11 is a diagram for explaining a first aspect of the bonded and stacked core manufacturing method according to the embodiment, in which FIG. 11(a) is a partial longitudinal cross-sectional view indicating a stacking and bonding step, and FIG. 11(b) is a cross-sectional view taken along line D-D of FIG. 11(a).

FIG. 12 is a diagram for explaining a second aspect of the bonded and stacked core manufacturing method according to the embodiment, in which FIG. 12(a) is a partial longitudinal cross-sectional view indicating a stacking and bonding step, and FIG. 12(b) is a cross-sectional view taken along line E-E of FIG. 12(a).

FIG. 13 is a diagram for explaining a third aspect of the bonded and stacked core manufacturing method according to the embodiment, in which FIG. 13(a) is a partial longitudinal cross-sectional view indicating a stacking and bonding step, and FIG. 13(b) is a cross-sectional view taken along line F-F of FIG. 13(a).

FIG. 15 is a side view of a bonded and stacked core manufacturing apparatus according to a third embodiment of the present invention.

FIG. 17 is a diagram for explaining a first aspect of the bonded and stacked core manufacturing method according to the embodiment, in which FIG. 17(a) is a partial longitudinal cross-sectional view indicating a stacking and bonding step, and FIG. 17(b) is a cross-sectional view taken along line G-G of FIG. 17(a).

FIG. 18 is a diagram for explaining a second aspect of the bonded and stacked core manufacturing method according to the embodiment, in which FIG. 18(a) is a partial longitudinal cross-sectional view indicating a stacking and bonding step, and FIG. 18(b) is a cross-sectional view taken along line H-H of FIG. 18(a).

FIG. 19 is a diagram for explaining a third aspect of the bonded and stacked core manufacturing method according to the embodiment, in which FIG. 19(a) is a partial longitudinal cross-sectional view indicating a stacking and bonding step, and FIG. 19(b) is a cross-sectional view taken along line I-I of FIG. 19(a).

FIG. 23 is a diagram for explaining a first aspect of the bonded and stacked core manufacturing method according to the embodiment, in which FIG. 23(a) is a partial longitudinal cross-sectional view indicating a stacking and bonding step, and FIG. 23(b) is a cross-sectional view taken along line J-J of FIG. 23(a).

FIG. 24 is a diagram for explaining a second aspect of the bonded and stacked core manufacturing method according to the embodiment, in which FIG. 24(a) is a partial longitudinal cross-sectional view indicating a stacking and bonding step, and FIG. 24(b) is a cross-sectional view taken along line K-K of FIG. 24(a).

FIG. 25 is a diagram for explaining a third aspect of the bonded and stacked core manufacturing method according to the embodiment, in which FIG. 25(a) is a partial longitudinal cross-sectional view indicating a stacking and bonding step, and FIG. 25(b) is a cross-sectional view taken along line L-L of FIG. 25(a).

EMBODIMENTS OF THE INVENTION

Hereinafter, a bonded and stacked core manufacturing method and a bonded and stacked core manufacturing apparatus according to each of embodiments of the present invention will be described with reference to the drawings. Before that, with reference to FIGS. 1 and 2, a stator bonded and stacked core (bonded and stacked core. stator for a rotary electric machine) manufactured in each of the embodiments and the modification examples will be described first.

[Stator Bonded and Stacked Core]

Figure 1:
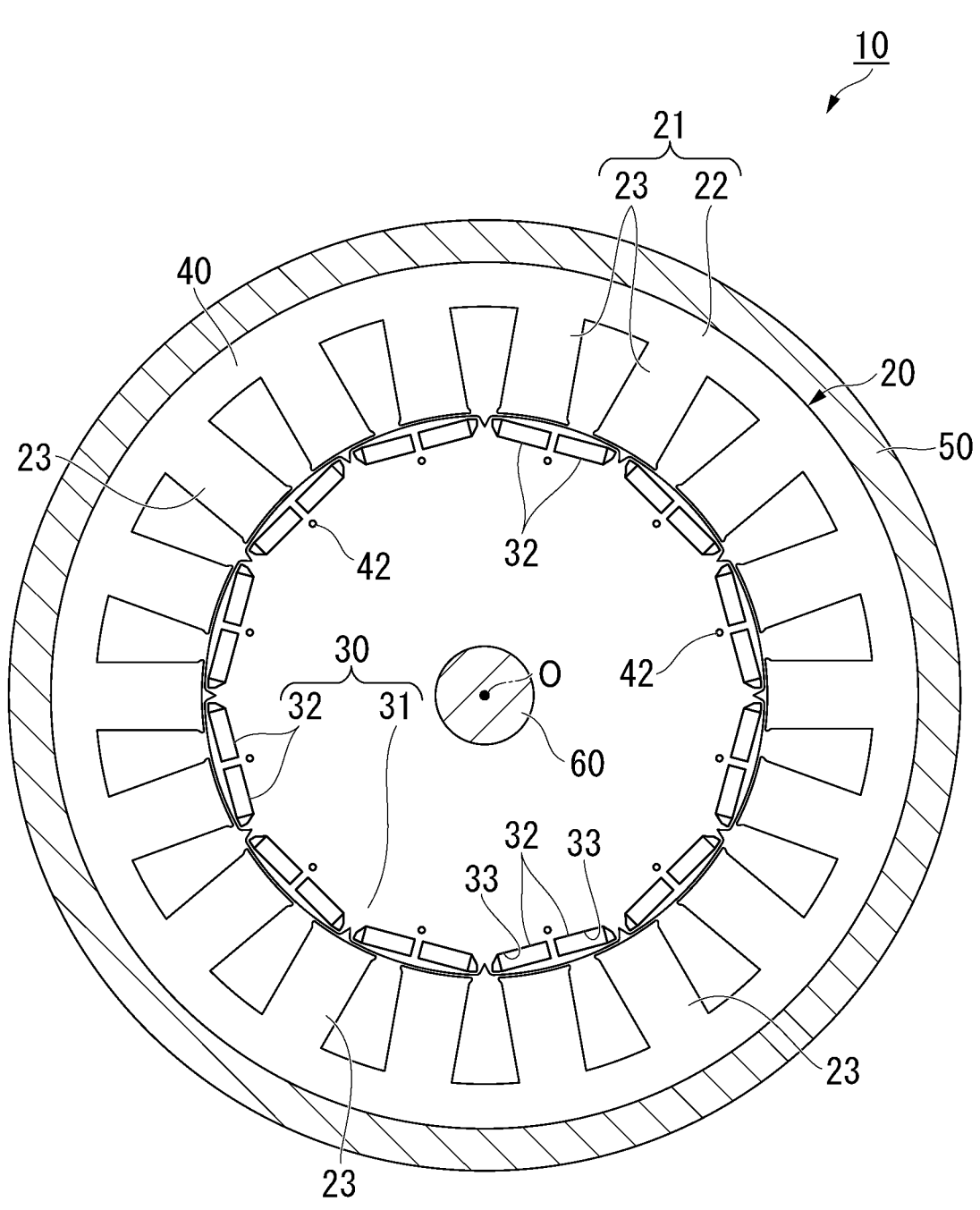
FIG. 1 is a cross-sectional view of a rotary electric machine including a stator bonded and stacked core manufactured in each of embodiments of the present invention.
Figure 2:
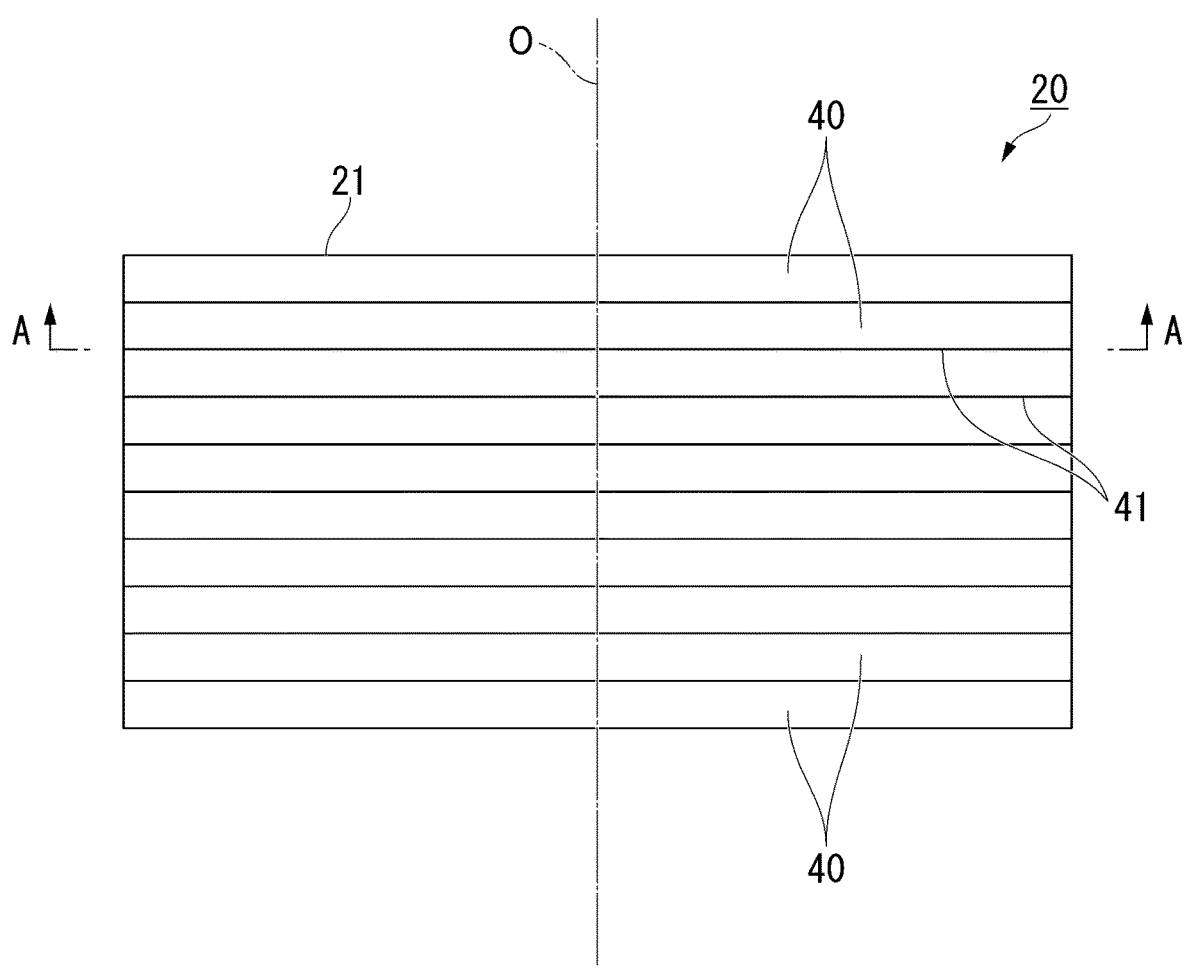
FIG. 2 is a side view of the stator bonded and stacked core.

FIG. 1 is a cross-sectional view of a rotary electric machine 10 including a stator bonded and stacked core 21 manufactured in each of the embodiments. FIG. 2 is a side view of the stator bonded and stacked core 21.

Hereinafter, a case where the rotary electric machine 10 shown in FIG. 1 is an electric motor, specifically, an AC electric motor, more specifically, a synchronous electric motor, and still more specifically, a permanent magnet field type electric motor will be described as an example. This type of electric motor is suitably adopted in, for example, an electric vehicle.

As shown in FIG. 1, the rotary electric machine 10 includes a stator 20, a rotor 30, a case 50, and a rotating shaft 60. The stator 20 and the rotor 30 are housed in the case 50. The stator 20 is fixed in the case 50.

In the example of FIG. 1, an inner rotor type in which the rotor 30 is positioned on a radially inner side of the stator 20 is shown as the rotary electric machine 10. However, the rotary electric machine 10 may be an outer rotor type in which the rotor 30 is positioned outside the stator 20. Here, a case where the rotary electric machine 10 is a three-phase AC motor having 12 poles and 18 slots will be exemplified. However, the number of poles, the number of slots, the number of phases, and the like can be appropriately changed.

For example, the rotary electric machine 10 can rotate at a rotation speed of 1000 rpm by applying an excitation current having an effective value of 10 A and a frequency of 100 Hz to each phase.

The stator 20 includes the stator bonded and stacked core 21 and a winding (not shown).

The stator bonded and stacked core 21 includes an annular core back portion 22 and a plurality of tooth portions 23. Hereinafter, a central axis O direction of the stator bonded and stacked core 21 (or the core back portion 22) is referred to as an axial direction, a radial direction (direction orthogonal to the central axis O) of the stator bonded and stacked core 21 (or the core back portion 22) is referred to as a radial direction, and a circumferential direction (a direction going around the central axis O) of the stator bonded and stacked core 21 (or the core back portion 22) is referred to as a circumferential direction.

The core back portion 22 is formed in a circular shape in a plane view in which the stator 20 is viewed from the axial direction.

The plurality of tooth portions 23 protrudes radially inward from an inner circumference of the core back portion 22. The plurality of tooth portions 23 are arranged at equal angular intervals in the circumferential direction. In the example of FIG. 1, 18 tooth portions 23 are arranged every 20 degrees of a central angle centered on the central axis O.

The plurality of tooth portions 23 are formed in the same shape and the same size. Therefore, the plurality of tooth portions 23 have the same thickness dimension.

The winding is wound around the tooth portion 23. The winding may be wound by concentrated winding or distributed winding.

The rotor 30 is disposed on an inner side in the radial direction with respect to the stator 20 (stator bonded and stacked core 21). The rotor 30 includes a rotor core 31 and a plurality of permanent magnets 32.

The rotor core 31 is formed in an annular shape (circular shape) disposed coaxially with the stator 20. The rotating shaft 60 is disposed in the rotor core 31. The rotating shaft 60 is fixed to the rotor core 31.

The plurality of permanent magnets 32 is fixed to the rotor core 31. In the example of FIG. 1, a pair of permanent magnets 32 forms one magnetic pole. The plurality of pairs of permanent magnets 32 are arranged at equal angular intervals in the circumferential direction. In the example of FIG. 1, 12 pairs of (24 in total) permanent magnets 32 are arranged every 30 degrees of a central angle centered on the central axis O.

In the example of FIG. 1, an embedded permanent magnet type motor is adopted as a permanent magnet field type electric motor. A plurality of through-holes 33 penetrating the rotor core 31 in the axial direction is formed in the rotor core 31. The plurality of through-holes 33 are arranged corresponding to the arrangement of the plurality of permanent magnets 32. Each of the permanent magnets 32 is fixed to the rotor core 31 in a state of being disposed in the corresponding through-hole 33. Each of the permanent magnets 32 can be fixed to the rotor core 31, for example, by bonding an outer surface of the permanent magnet 32 to an inner surface of the through-hole 33 with an adhesive. Note that, as the permanent magnet field type electric motor, a surface magnet type motor may be adopted instead of the embedded permanent magnet type.

The stator bonded and stacked core 21 and the rotor core 31 are both stacked cores. For example, as shown in FIG. 2, the stator bonded and stacked core 21 is formed by stacking a plurality of electrical steel sheets 40 in a stacking direction.

Note that the stacking thickness (the total length along the central axis O) of each of the stator bonded and stacked core 21 and the rotor core 31 is, for example, 50.0 mm. The outer diameter of the stator bonded and stacked core 21 is, for example, 250.0 mm. The inner diameter of the stator bonded and stacked core 21 is, for example, 165.0 mm. The outer diameter of the rotor core 31 is, for example, 163.0 mm. The inner diameter of the rotor core 31 is, for example, 30.0 mm. Note that these values are merely examples, and the stacking thickness, the outer diameter, and the inner diameter of the stator bonded and stacked core 21, and the stacking thickness, the outer diameter, and the inner diameter of the rotor core 31 are not limited only to these values. Here, the inner diameter of the stator bonded and stacked core 21 is based on a distal end portion of the tooth portion 23 in the stator bonded and stacked core 21. That is, the inner diameter of the stator bonded and stacked core 21 is the diameter of a virtual circle inscribed in the distal end portions of all the tooth portions 23.

Each of the electrical steel sheets 40 forming the stator bonded and stacked core 21 and the rotor core 31 is formed by, for example, punching a strip-shaped steel sheet serving as a base metal. As the electrical steel sheet 40, a known electrical steel sheet can be used. The electrical steel sheet 40 contains, as a chemical composition, 2.5% to 3.9% of Si in mass % as shown in mass % unit below. By setting the chemical composition within this range, yield strength of each of the electrical steel sheets 40 can be set to 380 MPa or more and 540 MPa or less.

Si: 2.5% to 3.9%

Al: 0.001% to 3.0%

Mn: 0.05% to 5.0%

Remainder: Fe and impurities

In the present embodiment, a non-oriented electrical steel sheet is adopted as the electrical steel sheet 40. As the non-oriented electrical steel sheet, a non-oriented electrical steel strip of JISC2552:2014 can be adopted. However, as the electrical steel sheet 40, a grain-oriented electrical steel sheet may be adopted instead of the non-oriented electrical steel sheet. As the grain-oriented electrical steel sheet in this case, an oriented electrical steel strip of JISC2553:2012 can be adopted.

Both surfaces of the electrical steel sheet 40 are coated with phosphate-based insulating coatings in order to improve workability of the stacked core and core loss of the stacked core. Examples of a substance constituting the insulating coating include (1) an inorganic compound, (2) an organic resin, and (3) a mixture of an inorganic compound and an organic resin. Examples of the inorganic compound include (1) a complex of a dichromate and boric acid, and (2) a complex of a phosphate and silica. Examples of the organic resin include an epoxy-based resin, an acrylic resin, an acrylic styrene-based resin, a polyester-based resin, a silicon-based resin, and a fluorine-based resin.

First Embodiment

A first embodiment of the present invention will be described below with reference to FIGS. 3 to 8.

Figure 3:
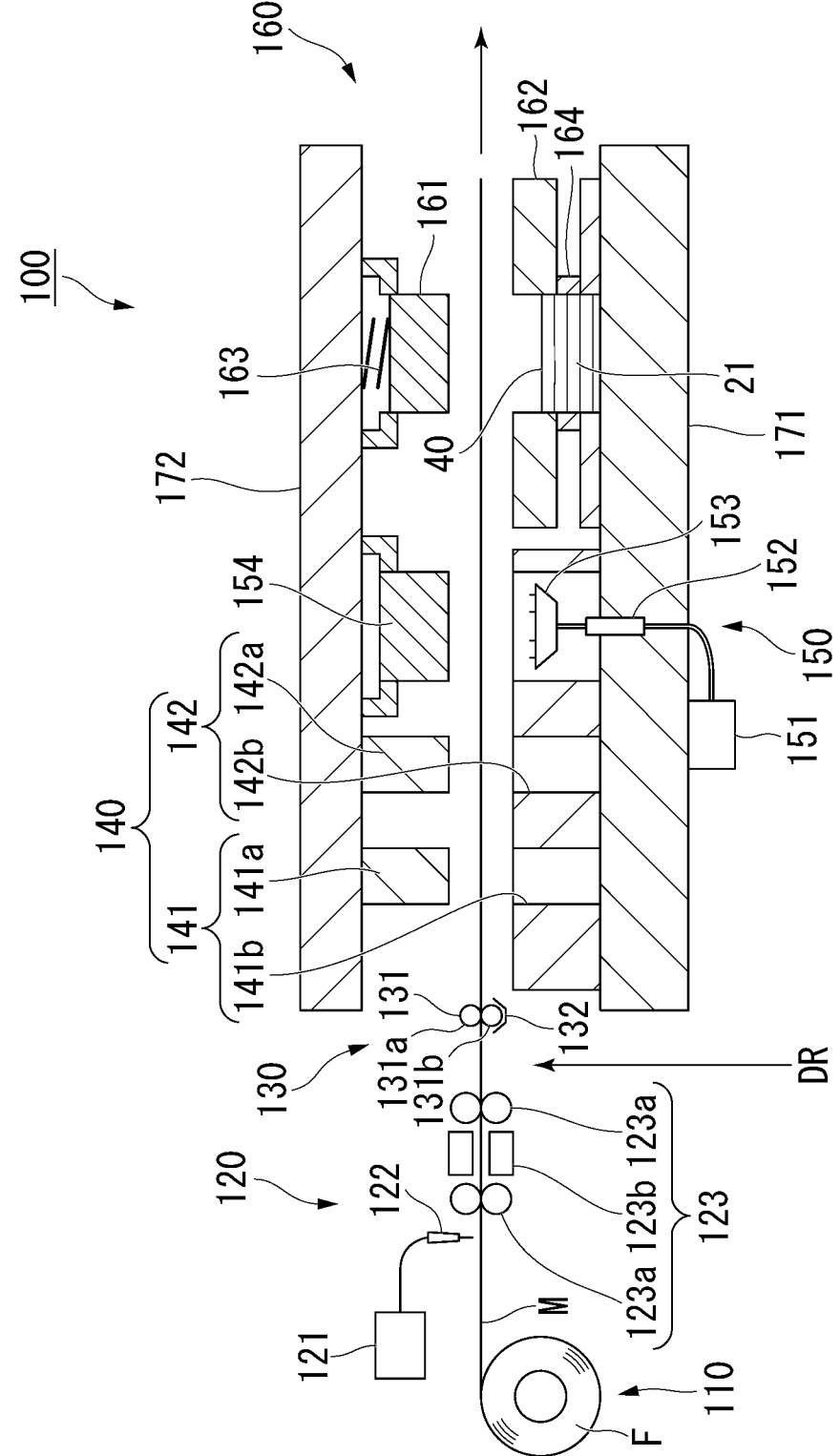
FIG. 3 is a side view of a bonded and stacked core manufacturing apparatus according to a first embodiment of the present invention.

First, a bonded and stacked core manufacturing apparatus 100 according to the present embodiment will be described with reference to a side view shown in FIG. 3. As shown in FIG. 3, the bonded and stacked core manufacturing apparatus 100 includes a strip-shaped steel sheet supply unit 110, a curing accelerating layer forming unit 120, a drive unit (not shown), a press working oil application unit 130, a press working unit 140, an adhesive application unit 150, and a stacking and bonding unit 160.

A hoop material F around which a strip-shaped steel sheet M to be a material of an electrical steel sheet (steel sheet component) 40 is wound is pivotally supported by the strip-shaped steel sheet supply unit 110, and the strip-shaped steel sheet M is fed toward the right side of FIG. 3. In the following description, the right side of a drawing, which is a feeding direction of the strip-shaped steel sheet M, may be referred to as a downstream side, and the left side of the drawing, which is the direction opposite thereto, may be referred to as an upstream side. The strip-shaped steel sheet M fed toward the downstream side from the strip-shaped steel sheet supply unit 110 is a steel sheet having the above-described chemical composition, and both surfaces of the strip-shaped steel sheet M are coated with the above-described insulating coatings.

The curing accelerating layer forming unit 120 includes a curing accelerator tank 121, a nozzle 122, and a dryer 123.

The curing accelerator tank 121 includes a first storage unit that stores an anaerobic adhesive curing accelerator dissolved in a solvent, a second storage unit that stores an instantaneous adhesive curing accelerator dissolved in a solvent, and a curing accelerator mixing unit (not shown). The first storage unit and the second storage unit are partitioned from each other such that the anaerobic adhesive curing accelerator and the instantaneous adhesive curing accelerator are not mixed with each other.

As the anaerobic adhesive curing accelerator, a curing accelerator containing an active component that accelerates anaerobic curing of an anaerobic adhesive is used. As the instantaneous adhesive curing accelerator, a curing accelerator containing an active component that accelerates instantaneous curing of a 2-cyanoacrylate-based adhesive is used. Each of the anaerobic adhesive curing accelerator and the instantaneous adhesive curing accelerator is diluted to an appropriate concentration with a solvent such as a ketone-based solvent, an alcohol-based solvent, an ester-based solvent, a glycol ether-based solvent, a hydrocarbon-based solvent, a halogenated hydrocarbon-based solvent, an ether-based solvent, a glycol-based solvent, or an amine-based solvent.

As the type of solvent, one or a combination selected from the above types of solvents is selected.

In manufacture of the bonded and stacked core, one or a combination of two or more selected from ethyl acetate, acetone, ethanol, methanol, butanol, and toluene is preferably used as the type of solvent.

The active component of the anaerobic adhesive curing accelerator is selected from titanium, chromium, manganese, iron, cobalt, nickel, copper, zinc, silver, vanadium, molybdenum, ruthenium, saccharin, and combinations thereof. The active component that accelerates anaerobic curing may be preferably selected from copper, iron, vanadium, cobalt, chromium, silver, manganese, and combinations thereof. The active component that accelerates anaerobic curing may be desirably copper, iron, vanadium, cobalt, chromium, or a combination thereof. The active component that accelerates anaerobic curing is desirably provided in a form of a metal oxide or a salt. Preferred examples of the active component that accelerates anaerobic curing include one or a combination of two or more selected from vanadium acetylacetonate, vanadyl acetylacetonate, vanadyl stearate, vanadium propoxide, vanadium butoxide, vanadium pentoxide, cobalt naphthenate, manganese naphthenate, copper hexanoate, and copper(II) bis(2-ethylhexanoate). The anaerobic adhesive curing accelerator is mixed with the anaerobic adhesive to accelerate instantaneous curing of the anaerobic adhesive.

The instantaneous adhesive curing accelerator contains an active component that accelerates curing of the 2-cyanoacrylate-based adhesive, selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride, and combinations thereof. Preferred examples thereof include one or a combination of two or more selected from organic amines such as dimethylaniline, diethylamine, o-phenylenediamine, dimethyl para-toluidine, diethyl para-toluidine, and N,N-diethylaniline.

The nozzle 122 has a plurality of first nozzle holes for applying the anaerobic adhesive curing accelerator, and a plurality of second nozzle holes for applying the instantaneous adhesive curing accelerator (not shown).

The first nozzle holes are directly connected to the first storage unit of the curing accelerator tank 121 through a first pipe.

The second nozzle holes are directly connected to the second storage unit of the curing accelerator tank 121 through a second pipe.

Furthermore, both the first nozzle holes and the second nozzle holes are also connected to the curing accelerator mixing unit through a third pipe. The curing accelerator mixing unit is connected to both the first storage unit and the second storage unit through a fourth pipe. The anaerobic adhesive curing accelerator from the first storage unit and the instantaneous adhesive curing accelerator from the second storage unit can be taken into the curing accelerator mixing unit, and stirred and mixed therein.

The first pipe, the second pipe, and the fourth pipe are connected to a switching valve (not shown). By operation of this switching valve, a flow of the anaerobic adhesive curing accelerator and a flow of the instantaneous adhesive curing accelerator can be switched to the following (1) or (2).

(1) The anaerobic adhesive curing accelerator in the first storage unit is caused to flow into the first nozzle holes through the first pipe, and at the same time, the instantaneous adhesive curing accelerator in the second storage unit is caused to flow into the second nozzle holes through the second pipe. As a result, the anaerobic adhesive curing accelerator is ejected from the first nozzle holes, and the instantaneous adhesive curing accelerator is ejected from the second nozzle holes.

(2) Both the anaerobic adhesive curing accelerator in the first storage unit and the instantaneous adhesive curing accelerator in the second storage unit are taken into the curing accelerator mixing unit through the fourth pipe, and stirred and mixed therein. The mixed accelerator in which the anaerobic adhesive curing accelerator and the instantaneous adhesive curing accelerator are mixed in this manner is caused to flow into both the first nozzle holes and the second nozzle holes through the third pipe. As a result, the mixed accelerator is ejected from both the first nozzle holes and the second nozzle holes.

Ejection ports of the first nozzle holes face an upper surface of the strip-shaped steel sheet M, and the anaerobic adhesive curing accelerator or the mixed accelerator can be applied to the upper surface in a point shape or a linear shape.

Ejection ports of the second nozzle holes also face the upper surface of the strip-shaped steel sheet M, and the instantaneous adhesive curing accelerator or the mixed accelerator can be applied to the upper surface in a point shape or a linear shape.

In the nozzle 122, the first nozzle holes and the second nozzle holes are alternately arranged, and a pitch is determined such that the curing accelerators ejected from the first nozzle holes and the second nozzle holes are not excessively mixed with each other on an application surface of the strip-shaped steel sheet M. When the anaerobic adhesive curing accelerator and the instantaneous adhesive curing accelerator are applied in a checker shape as described later with reference to FIG. 5, the pitch is preferably the same as a pitch between nozzle holes of a nozzle 153 described later such that application positions of the anaerobic adhesive curing accelerator and the instantaneous adhesive curing accelerator relatively coincide with application positions of an anaerobic adhesive and an instantaneous adhesive in a subsequent step.

By switching to either of the above (1) and (2) by the switching valve, an application form of the anaerobic adhesive curing accelerator and the instantaneous adhesive curing accelerator applied to an application surface of the strip-shaped steel sheet M is divided into a case of application in an unmixed state and a case of application in a mixed state. In the following description, three of the anaerobic adhesive curing accelerator, the instantaneous adhesive curing accelerator, and the mixed accelerator may be collectively referred to simply as "curing accelerator". On the other hand, when it is necessary to distinguish these from each other, the anaerobic adhesive curing accelerator, the instantaneous adhesive curing accelerator, and the mixed accelerator will be described separately.

The dryer 123 includes a pair of rollers 123a and dryer 123b.

The pair of rollers 123a is disposed on a downstream side of the nozzle 122. The pair of rollers 123a retains the strip-shaped steel sheet M passing therebetween such that the strip-shaped steel sheet M is kept horizontal all the time.

The dryer 123b is disposed at a position sandwiched between the pair of rollers 123a. The dryer 123b blows air to the upper surface and the lower surface of the strip-shaped steel sheet M to dry the curing accelerator. As a result, when the strip-shaped steel sheet M passes the upstream roller out of the pair of rollers 123a, the curing accelerator starts to be dried by being blown with air, and the drying is completed before the strip-shaped steel sheet M reaches the downstream roller out of the pair of rollers 123a. Therefore, on the upper surface of the strip-shaped steel sheet M after the strip-shaped steel sheet M passes through the downstream roller out of the pair of rollers 123a, a curing accelerating layer in which a solvent is dried is formed with a uniform thickness over the entire surface. The thickness of the curing accelerating layer may be 0.1 µm, for example. On the other hand, since the curing accelerator is not applied to the lower surface of the strip-shaped steel sheet M, an insulating coating remains exposed on the lower surface.

Note that a plurality of patterns can be selected for the curing accelerating layer by operation of the switching valve or the like. These patterns will be described later with reference to FIGS. 5 to 7.

The drive unit is disposed at a position DR between the curing accelerating layer forming unit 120 and the press working oil application unit 130. The drive unit intermittently feeds the strip-shaped steel sheet M in the right direction of the drawing from the curing accelerating layer forming unit 120 toward the press working oil application unit 130. Note that, on the upper surface of the strip-shaped steel sheet M fed from the curing accelerating layer forming unit 120, a curing accelerating layer in which the curing accelerator is dried is already formed before the strip-shaped steel sheet M enters the drive unit. On the other hand, on the lower surface of the strip-shaped steel sheet M before the strip-shaped steel sheet M enters the drive unit, there is no curing accelerating layer, and an insulating coating remains exposed on the lower surface.

The press working oil application unit 130 includes an application roller 131 and an oil pan 132.

The oil pan 132 is disposed at a position below the strip-shaped steel sheet M and immediately below the application roller 131. The application roller 131 includes an upper roller 131a and a lower roller 131b.

The upper roller 131a is disposed immediately above the strip-shaped steel sheet M, and can be switched between a state of being in contact with the upper surface of the strip-shaped steel sheet M and a state of being separated from the upper surface of the strip-shaped steel sheet M by moving up and down. The upper roller 131a can apply a press working oil supplied from a press working oil supply unit (not shown) to the upper surface of the strip-shaped steel sheet M by rolling while being in contact with the upper surface of the steel sheet M in a state where an outer circumferential surface of the upper roller 131a is impregnated with the press working oil.

The lower roller 131b is disposed immediately below the strip-shaped steel sheet M, and can be switched between a state of being in contact with the lower surface of the strip-shaped steel sheet M and a state of being separated from the lower surface of the strip-shaped steel sheet M by moving up and down. The lower roller 131b can apply a press working oil supplied from the press working oil supply unit to the lower surface of the strip-shaped steel sheet M by rolling while being in contact with the lower surface of the steel sheet M in a state where an outer circumferential surface of the lower roller 131b is impregnated with the press working oil.

The oil pan 132 receives and collects an excess press working oil dripping from the upper roller 131a and the lower roller 131b, and returns the excess press working oil to the press working oil supply unit.

According to the press working oil application unit 130, by supplying a press working oil from the press working oil supply unit in a state where the upper roller 131a is in contact with the upper surface of the strip-shaped steel sheet M, it is possible to continuously or intermittently feed the strip-shaped steel sheet M to the downstream side while forming a layer of the press working oil over the entire upper surface of the strip-shaped steel sheet M.

Similarly, by supplying a press working oil from the press working oil supply unit in a state where the lower roller 131b is in contact with the lower surface of the strip-shaped steel sheet M, it is possible to continuously or intermittently feed the strip-shaped steel sheet M to the downstream side while forming a layer of the press working oil over the entire lower surface of the strip-shaped steel sheet M.

Alternatively, by sandwiching the strip-shaped steel sheet M between the upper roller 131a and the lower roller 131b, it is possible to continuously or intermittently feed the strip-shaped steel sheet M to the downstream side while forming a layer of the press working oil over both the entire upper surface and the entire lower surface of the strip-shaped steel sheet M.

As described above, by moving the respective positions of the upper roller 131a and the lower roller 131b up and down as necessary, selection can be made from three cases of applying the press working oil only to the upper surface of the strip-shaped steel sheet M, applying the press working oil only to the lower surface of the strip-shaped steel sheet M, and applying the press working oil to both the upper and lower surfaces of the strip-shaped steel sheet M.

Here, in any of the above cases, before the press working oil is applied, both the anaerobic adhesive curing accelerator and the instantaneous adhesive curing accelerator applied to the upper surface of the strip-shaped steel sheet M are not naturally dried but actively dried. As described above, since the curing accelerating layer is formed by actively drying the curing accelerators previously, dilution of the curing accelerators due to mixing with the press working oil is suppressed. Therefore, the concentration of the anaerobic adhesive curing accelerator and the concentration of the instantaneous adhesive curing accelerator on the upper surface of the strip-shaped steel sheet M after application of the press working oil are both maintained unchanged before and after application of the press working oil. Therefore, the strip-shaped steel sheet M after passing through the press working oil application unit 130 is fed to the press working unit 140 while maintaining the concentration of the curing accelerator on the upper surface of the strip-shaped steel sheet M.

The press working unit 140 includes a first-stage punching unit 141 and a second-stage punching unit 142.

The first-stage punching unit 141 is disposed on the downstream side of the press working oil application unit 130 and includes a male die 141a and a female die 141b. The male die 141a and the female die 141b are coaxially disposed in the vertical direction, and the strip-shaped steel sheet M is inserted therebetween. Therefore, the male die 141a faces the upper surface of the strip-shaped steel sheet M, and the female die 141b faces the lower surface of the strip-shaped steel sheet M. Then, in a state where feeding of the strip-shaped steel sheet M is temporarily stopped, the male die 141a is moved downward to reach the inside of the female die 141b by a hydraulic mechanism (not shown), thereby performing first punching necessary for forming the electrical steel sheet 40 from the strip-shaped steel sheet M. At this time, since the press working oil is applied to the strip-shaped steel sheet M, punching can be performed without causing seizure or the like. After the punching, the male die 141a is moved upward to be pulled out from the female die 141b, and the strip-shaped steel sheet M is fed toward the downstream side again.

The second-stage punching unit 142 is disposed on the downstream side of the first-stage punching unit 141, and includes a male die 142a and a female die 142b. The male die 142a and the female die 142b are coaxially disposed in the vertical direction, and the strip-shaped steel sheet M after the first punching is inserted therebetween. Therefore, the male die 142a faces the upper surface of the strip-shaped steel sheet M, and the female die 142b faces the lower surface of the strip-shaped steel sheet M. Then, in a state where feeding of the strip-shaped steel sheet M is temporarily stopped again, the male die 142a is moved downward to reach the inside of the female die 142b by a hydraulic mechanism (not shown), thereby performing second punching necessary for forming the electrical steel sheet 40 from the strip-shaped steel sheet M. Also at this time, since the press working oil is applied to the strip-shaped steel sheet M, punching can be performed without causing seizure or the like. After the punching, the male die 142a is moved upward to be pulled out from the female die 142b, and the strip-shaped steel sheet M is fed toward the downstream side again.

The adhesive application unit 150 is disposed on the downstream side of the press working unit 140. The adhesive application unit 150 includes an air pressure feeder 151, a syringe 152, a nozzle 153, and a steel sheet retainer 154.

The syringe 152 is a container having a space for storing an anaerobic adhesive and a space for storing an instantaneous adhesive (not shown). The space for storing an anaerobic adhesive and the space for storing an instantaneous adhesive are partitioned from each other such that the anaerobic adhesive and the instantaneous adhesive are not mixed. Here, examples of the anaerobic adhesive include "ARONTITE" (registered trademark) manufactured by Toagosei Co., Ltd., and examples of the instantaneous adhesive (2-cyanoacrylate-based adhesive) include "ARON ALPHA" (registered trademark) manufactured by Toagosei Co., Ltd. The syringe 152 and the air pressure feeder 151 are connected to each other through a pipe that feeds air from the air pressure feeder 151 to the syringe 152. In addition, the syringe 152 and the nozzle 153 are connected to each other through a fifth pipe that supplies an anaerobic adhesive from the syringe 152 to the nozzle 153 and a sixth pipe that supplies an instantaneous adhesive.

The nozzle 153 includes a plurality of needles (not shown) whose ejection ports face upward. These needles are disposed below the strip-shaped steel sheet M. Therefore, the ejection ports of the needles face the lower surface of the strip-shaped steel sheet M. The needles include a plurality of first needles for applying an anaerobic adhesive and a plurality of second needles for applying an instantaneous adhesive (not shown). An ejection port of the first needle and an ejection port of the second needle are alternately and uniformly arranged in a plane view of the nozzle 153.

Figure 5:
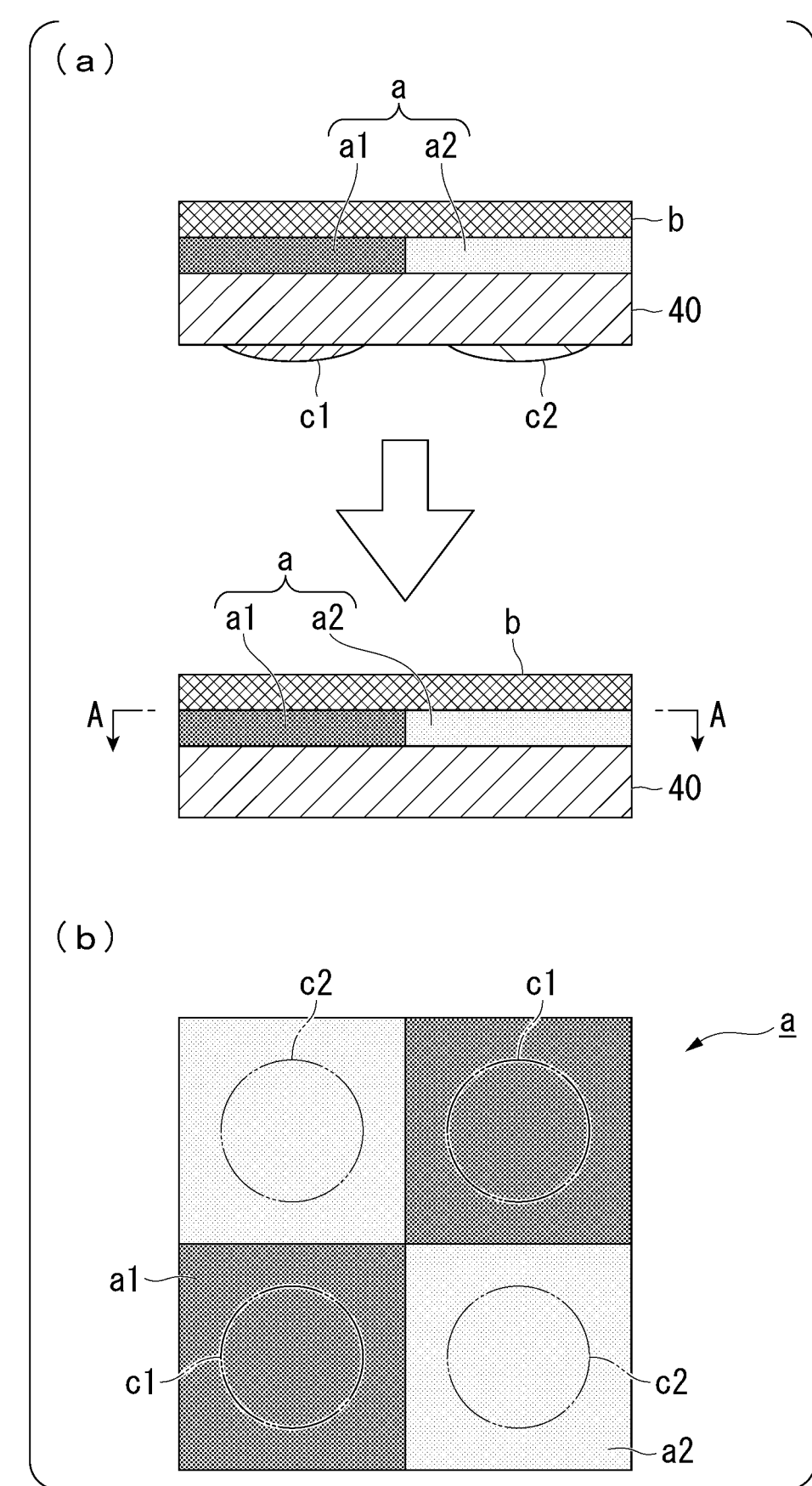

Here, as shown in FIG. 5 described later, when the anaerobic adhesive curing accelerator and the instantaneous adhesive curing accelerator are arranged in a checker shape, the position of the ejection port of each of the first needles preferably coincides with each position of the anaerobic adhesive curing accelerator applied and dried on the upper surface of the strip-shaped steel sheet M. Similarly, the position of the ejection port of each of the second needles preferably coincides with each position of the instantaneous adhesive curing accelerator applied and dried on the upper surface of the strip-shaped steel sheet M. In this case, when feeding of the strip-shaped steel sheet M is temporarily stopped above the nozzle 153 after the strip-shaped steel sheet M passes the press working unit 140, relative positions of the spots of the anaerobic adhesive curing accelerator on the upper surface of the strip-shaped steel sheet M and the ejection ports of the first needles coincide with each other, and relative positions of the spots of the instantaneous adhesive curing accelerator and the ejection ports of the second needles coincide with each other. As a result, the adhesives can be applied to the curing accelerators, respectively in a correct combination.

The first needles are directly connected to a space that stores the anaerobic adhesive through the fifth pipe. On the other hand, the second needles are directly connected to a space that stores the instantaneous adhesive through the sixth pipe.

The first needles and the second needles can apply the anaerobic adhesive and the instantaneous adhesive to the lower surface of the strip-shaped steel sheet M such that the anaerobic adhesive and the instantaneous adhesive form a checker shape (lattice shape). As a result, a square or circular pattern formed of the anaerobic adhesive and a square or circular pattern formed of the instantaneous adhesive are alternately arranged on the lower surface side of the strip-shaped steel sheet M in both a longitudinal direction of the strip-shaped steel sheet M and a width direction of the strip-shaped steel sheet M. That is, the anaerobic adhesive and the instantaneous adhesive can be arranged so as to be adjacent to each other in both the longitudinal direction of the strip-shaped steel sheet M and the width direction of the strip-shaped steel sheet M.

The steel sheet retainer 154 is disposed above the nozzle 153 (immediately above the first needles and the second needles). Therefore, the steel sheet retainer 154 faces the upper surface of the strip-shaped steel sheet M. The steel sheet retainer 154 is pushed downward by a hydraulic mechanism (not shown) in a state where feeding of the strip-shaped steel sheet M is temporarily stopped. As a result, the lower surface of the steel sheet retainer 154 comes into contact with the upper surface of the strip-shaped steel sheet M to push the strip-shaped steel sheet M downward. As a result, the height position of the strip-shaped steel sheet M can be pushed down and positioned to the adhesive application position by the nozzle 153. In this positioning state, the lower surface of the strip-shaped steel sheet M is close to the ejection ports of the first needles and the second needles.

Furthermore, in this positioning state, when air is pressure-fed from the air pressure feeder 151 to the syringe 152, the air is uniformly supplied to both the space that stores the anaerobic adhesive and the space that stores the instantaneous adhesive. Then, the anaerobic adhesive is supplied to the first needles through the fifth pipe, and the instantaneous adhesive is supplied to the second needles through the sixth pipe. Then, the anaerobic adhesive is ejected from the ejection ports of the first needles and applied to the lower surface of the strip-shaped steel sheet M. Similarly, the instantaneous adhesive is ejected from the ejection ports of the second needles and applied to the lower surface of the strip-shaped steel sheet M. Thereafter, by raising the steel sheet retainer 154 by the hydraulic mechanism, the height position of the strip-shaped steel sheet M is returned to the original height.

The stacking and bonding unit 160 is disposed on the downstream side of the adhesive application unit 150. The stacking and bonding unit 160 includes an outer circumferential punching male die 161, an outer circumferential punching female die 162, a spring 163, and a heater 164.

The outer circumferential punching male die 161 is a cylindrical die having a circular bottom surface, and a lower end of the spring 163 is connected to an upper end of the outer circumferential punching male die 161. The outer circumferential punching male die 161 can move up and down together with the spring 163 in a state of being supported by the spring 163. The outer circumferential punching male die 161 has an outer diameter dimension substantially the same as the outer diameter dimension of the stator bonded and stacked core 21.

The outer circumferential punching female die 162 is a die having a cylindrical internal space, and has an inner diameter dimension substantially the same as the outer diameter dimension of the stator bonded and stacked core 21.

The heater 164 is integrally incorporated in the outer circumferential punching female die 162. The heater 164 heats the electrical steel sheets (steel sheet components) 40 stacked in the outer circumferential punching female die 162 from a circumference of the electrical steel sheets 40. When a thermosetting type is used as the adhesive, the adhesive is cured by receiving heat from the heater 164. On the other hand, when a room-temperature curing type is used as the adhesive, the adhesive is cured at room temperature without requiring heating.

According to the stacking and bonding unit 160, in a state where feeding of the strip-shaped steel sheet M is temporarily stopped, the outer circumferential punching male die 161 is lowered to sandwich the strip-shaped steel sheet M between the outer circumferential punching male die 161 and the outer circumferential punching female die 162, and furthermore, the outer circumferential punching male die 161 is pressed into the outer circumferential punching female die 162, whereby the electrical steel sheet 40 whose outer circumference has been punched from the strip-shaped steel sheet M is obtained.

The punched electrical steel sheet 40 is stacked on an upper surface of another electrical steel sheet 40 that has been previously punched, and stacked and bonded in the outer circumferential punching female die 162, and furthermore, a pressurizing force from the outer circumferential punching male die 161 and heating from the heater 164 are applied to the punched electrical steel sheet 40. At this time, the pressurizing force applied from the outer circumferential punching male die 161 to the electrical steel sheet 40 is maintained almost constant all the time by a biasing force of the spring 163.

As described above, the electrical steel sheet 40 punched this time is bonded and fixed to the upper surface of the electrical steel sheet 40 punched last time. By repeating such steps of outer circumferential punching, pressurizing, and heating as many times as the number of stacked electrical steel sheets 40, the stator bonded and stacked core 21 is formed in the outer circumferential punching female die 162.

As shown in FIG. 3, the female die 141b, the female die 142b, the nozzle 153, the outer circumferential punching female die 162, and the heater 164 are fixed onto a common fixing base 171. Therefore, relative positions of the female die 141b, the female die 142b, the nozzle 153, the outer circumferential punching female die 162, and the heater 164 in the horizontal direction and the up-down direction are fixed.

Similarly, the male die 141a, the male die 142a, the steel sheet retainer 154, and the outer circumferential punching male die 161 are also fixed to the lower surface of the common movable base 172. Therefore, relative positions of the male die 141a, the male die 142a, the steel sheet retainer 154, and the outer circumferential punching male die 161 in the horizontal direction and the up-down direction are fixed.

The drive unit feeds the strip-shaped steel sheet M toward the downstream side, and lowers the movable base 172 when the drive unit temporarily stops the strip-shaped steel sheet M, whereby outer circumferential punching, stacking, and bonding of the electrical steel sheet 40, application of an anaerobic adhesive and an instantaneous adhesive to the position of the electrical steel sheet 40 to be subjected to outer circumferential punching next from the strip-shaped steel sheet M, the second punching to the position of the strip-shaped steel sheet M to which the anaerobic adhesive and the instantaneous adhesive are applied next, and the first punching to the position of the strip-shaped steel sheet M to be subjected to the second punching next are simultaneously performed.

Subsequently, the movable base 172 is raised and retracted above the strip-shaped steel sheet M, and then the strip-shaped steel sheet M is fed again toward the downstream side by a predetermined distance by the drive unit and temporarily stopped again. In this state, the movable base 172 is lowered again, and working at each position is continuously performed. As described above, the step of moving the movable base 172 up and down during a temporary stop while intermittently feeding the strip-shaped steel sheet M by the drive unit is repeated, whereby the stator bonded and stacked core 21 is manufactured.

A bonded and stacked core manufacturing method using the bonded and stacked core manufacturing apparatus 100 having the above-described constitution will be described below with reference to FIGS. 4 to 8.

Figure 4:
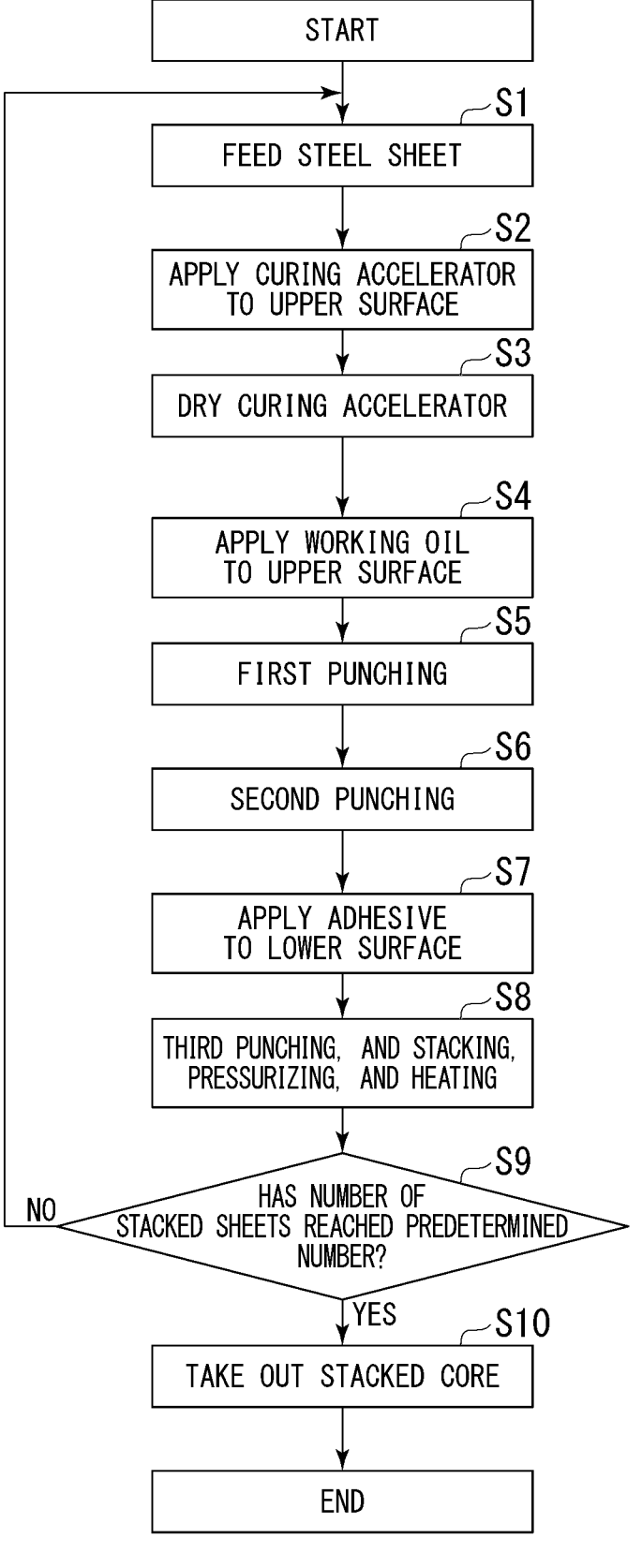
FIG. 4 is a flowchart for explaining a bonded and stacked core manufacturing method according to the embodiment.
Figure 6:
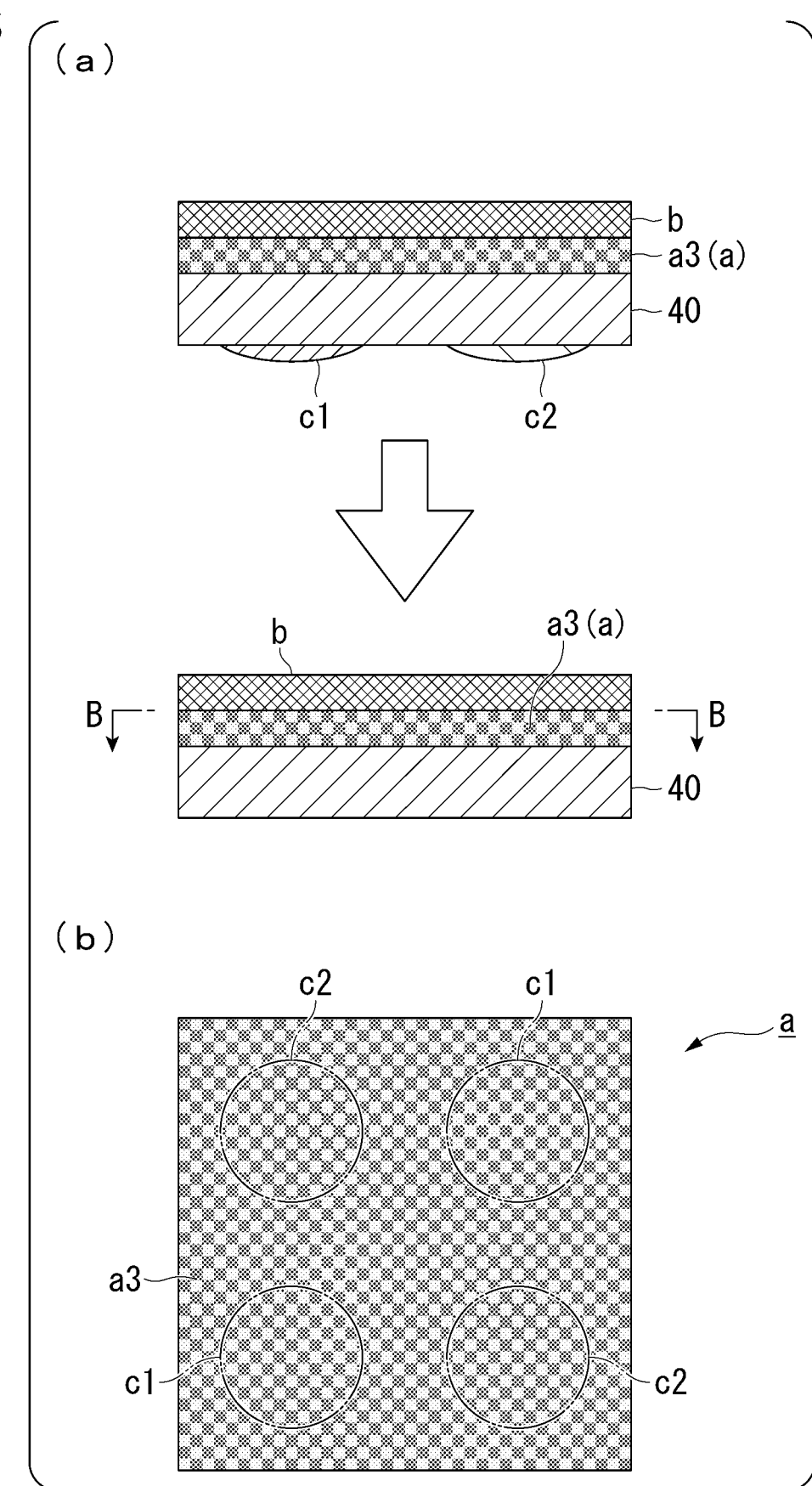
Figure 7:
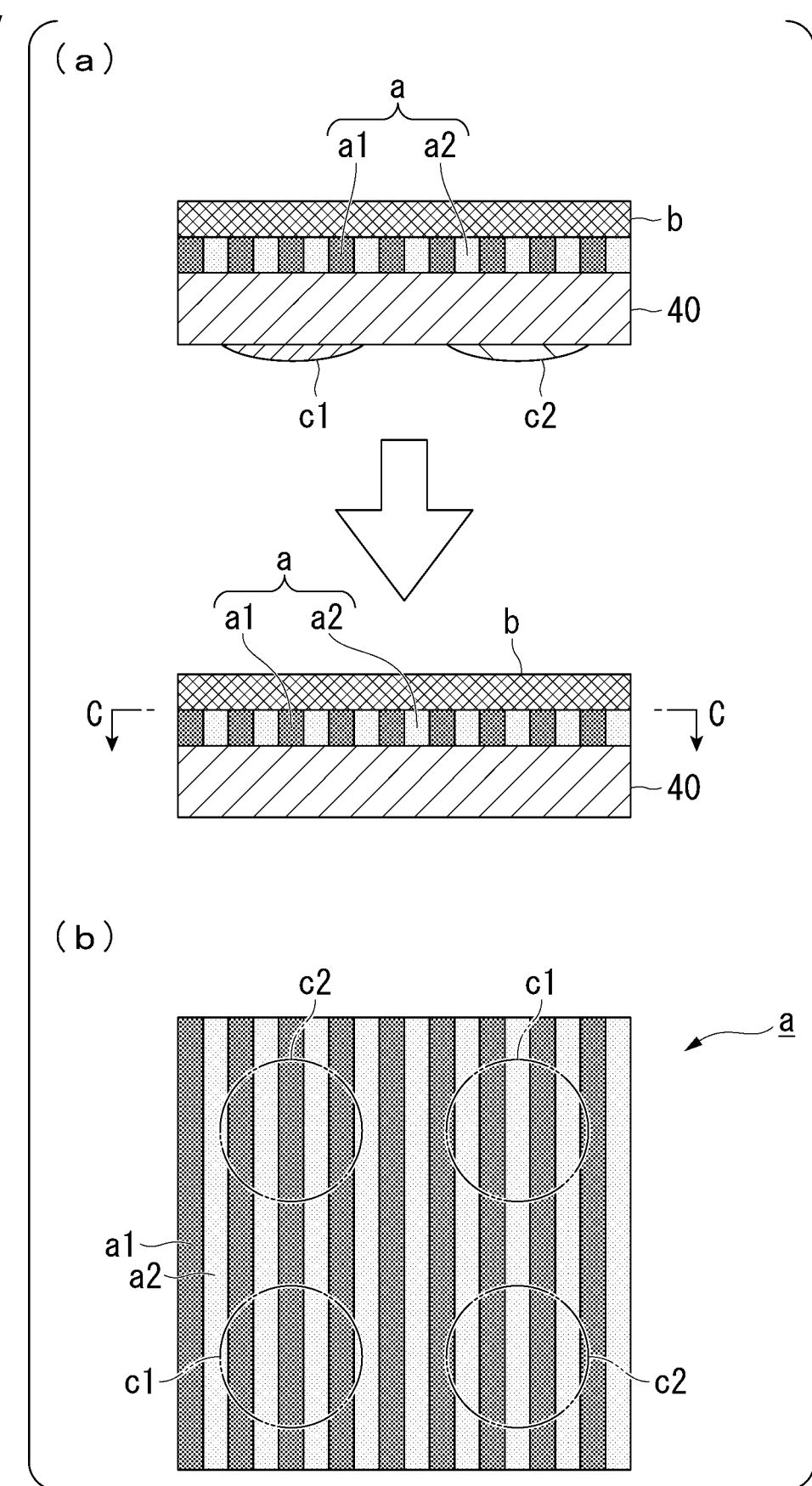
Figure 8:
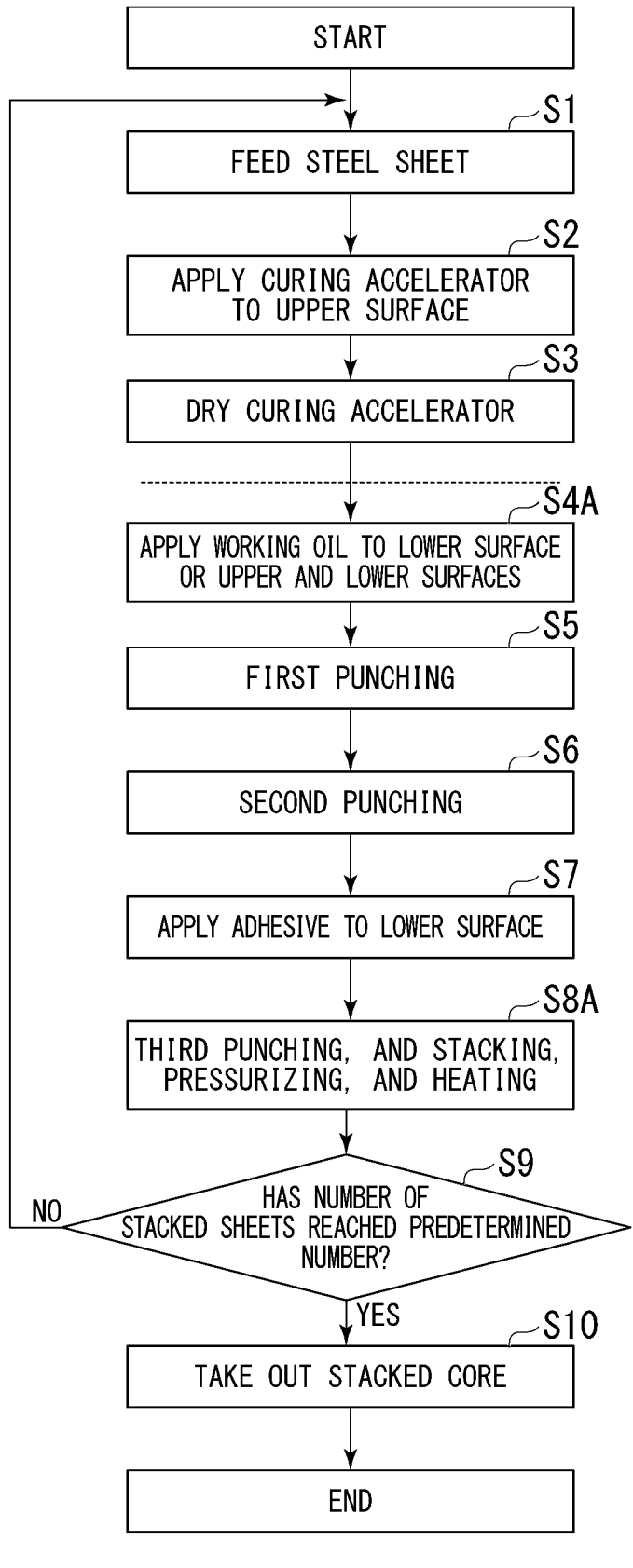
FIG. 8 is a flowchart for explaining a modification example of the bonded and stacked core manufacturing method according to the embodiment.

FIG. 4 is a flowchart for explaining the bonded and stacked core manufacturing method according to the present embodiment. FIG. 5 is a diagram for explaining a first aspect of the bonded and stacked core manufacturing method, in which FIG. 5(a) is a partial longitudinal cross-sectional view indicating a stacking and bonding step, and FIG. 5(b) is a cross-sectional view taken along line A-A of FIG. 5(a). FIG. 6 is a diagram for explaining a second aspect of the bonded and stacked core manufacturing method, in which FIG. 6(a) is a partial longitudinal cross-sectional view indicating a stacking and bonding step, and FIG. 6(b) is a cross-sectional view taken along line B-B of FIG. 6(a). FIG. 7 is a diagram for explaining a third aspect of the bonded and stacked core manufacturing method, in which FIG. 7(a) is a partial longitudinal cross-sectional view indicating a stacking and bonding step, and FIG. 7(b) is a cross-sectional view taken along line C-C of FIG. 7(a). FIG. 8 is a flowchart for explaining a modification example of the bonded and stacked core manufacturing method according to the present embodiment.

As shown in FIG. 4, the bonded and stacked core manufacturing method of the present embodiment includes a steel sheet feeding step S1, a curing accelerator application step S2, a curing accelerator drying step S3, a working oil application step S4, a first punching step S5, a second punching step S6, an adhesive application step S7, a stacking and bonding step S8, a stacked sheet number confirmation step S9, and a taking-out step S10.

In the steel sheet feeding step S1, the strip-shaped steel sheet M is fed from the hoop material F toward the downstream side.

In the subsequent curing accelerator application step S2, an anaerobic adhesive curing accelerator a1 and an instantaneous adhesive curing accelerator a2 are applied to the entire upper surface of the strip-shaped steel sheet M from the nozzle 122. The anaerobic adhesive curing accelerator a1 and the instantaneous adhesive curing accelerator a2 at this time point are both in a liquid form.

Here, three patterns are exemplified in FIGS. 5 to 7 as an application pattern of the anaerobic adhesive curing accelerator a1 and the instantaneous adhesive curing accelerator a2. FIGS. 5 to 7 are diagrams corresponding to the stacking and bonding step S8, and the application pattern of the anaerobic adhesive curing accelerator a1 and the instantaneous adhesive curing accelerator a2 formed in the curing accelerator application step S2 remains fixed after the curing accelerator drying step S3. Therefore, the application patterns will be described with reference to these drawings.

For example, in the application pattern of FIG. 5, the anaerobic adhesive curing accelerator a1 and the instantaneous adhesive curing accelerator a2 are arranged so as to form a checker shape (lattice shape) on the upper surface of the strip-shaped steel sheet M (electrical steel sheet 40). More specifically, a square or circular pattern formed of the anaerobic adhesive curing accelerator a1 and a square or circular pattern formed of the instantaneous adhesive curing accelerator a2 are alternately arranged on the insulating coating formed on the upper surface of the strip-shaped steel sheet M in both the longitudinal direction of the strip-shaped steel sheet M and the width direction of the strip-shaped steel sheet M. That is, the anaerobic adhesive curing accelerator a1 and the instantaneous adhesive curing accelerator a2 are arranged so as to be adjacent to each other in both the longitudinal direction of the strip-shaped steel sheet M and the width direction of the strip-shaped steel sheet M.

The anaerobic adhesive curing accelerator a1 and the instantaneous adhesive curing accelerator a2 thus applied are dried in the subsequent curing accelerator drying step S3 to form a curing accelerating layer a having a constant coating thickness.

In addition, in the application pattern of FIG. 6, the anaerobic adhesive curing accelerator a1 and the instantaneous adhesive curing accelerator a2 are arranged on the upper surface of the strip-shaped steel sheet M (electrical steel sheet 40) in a state of being previously mixed. This mixing is obtained by taking both the anaerobic adhesive curing accelerator a1 in the first storage unit and the instantaneous adhesive curing accelerator a2 in the second storage unit into the curing accelerator mixing unit through the third pipe, and stirring and mixing the curing accelerators therein in the curing accelerating layer forming unit 120. The mixed accelerator thus obtained is supplied to both the first nozzle holes and the second nozzle holes through the fourth pipe. As a result, the mixed accelerator is ejected from both the first nozzle holes and the second nozzle holes. The ejected mixed accelerator is uniformly disposed on the insulating coating formed on the upper surface of the strip-shaped steel sheet M in both the longitudinal direction of the strip-shaped steel sheet M and the width direction of the strip-shaped steel sheet M.

The mixed accelerator thus applied is dried in the subsequent curing accelerator drying step S3 to form the curing accelerating layer a having a constant coating thickness.

Alternatively, in the application pattern of FIG. 7, the anaerobic adhesive curing accelerator a1 and the instantaneous adhesive curing accelerator a2 are alternately arranged so as to form a stripe shape (linear shape) on the upper surface of the strip-shaped steel sheet M (electrical steel sheet 40). More specifically, the linear pattern formed of the anaerobic adhesive curing accelerator a1 and the linear pattern formed of the instantaneous adhesive curing accelerator a2 are alternately arranged on the insulating coating formed on the upper surface of the strip-shaped steel sheet M in the longitudinal direction of the strip-shaped steel sheet M. That is, when the right direction of FIG. 7(b) is the feeding direction of the strip-shaped steel sheet M, the anaerobic adhesive curing accelerator a1 and the instantaneous adhesive curing accelerator a2 are linearly formed so as to be parallel to a direction orthogonal to the feeding direction. The anaerobic adhesive curing accelerator a1 and the instantaneous adhesive curing accelerator a2 are alternately arranged adjacent to each other when viewed in the feeding direction of the strip-shaped steel sheet M.

The anaerobic adhesive curing accelerator a1 and the instantaneous adhesive curing accelerator a2 thus applied are dried in the subsequent curing accelerator drying step S3 to form a curing accelerating layer a having a constant coating thickness.

Note that, instead of the application form described above, the anaerobic adhesive curing accelerator a1 and the instantaneous adhesive curing accelerator a2 may be formed in a linear shape parallel to the feeding direction such that the downward direction of FIG. 7(b) is the feeding direction of the strip-shaped steel sheet M.

Returning to FIG. 4, in the subsequent curing accelerator drying step S3, air from the dryer 123b is blown onto the upper and lower surfaces of the strip-shaped steel sheet M, and the liquid anaerobic adhesive curing accelerator a1 and the liquid instantaneous adhesive curing accelerator a2 are dried to form the curing accelerating layer a. The curing accelerating layer a is solid.

In the subsequent working oil application step S4, the upper roller 131a rolls while being in contact with the upper surface of the steel sheet M in a state where an outer circumferential surface of the upper roller 131a is impregnated with the press working oil b supplied from the press working oil supply unit. As a result, the press working oil b is applied to the entire surface of only the upper surface side of the strip-shaped steel sheet M. That is, the press working oil b is applied so as to coat the upper surface of the curing accelerating layer a.

At this time, since both the anaerobic adhesive curing accelerator a1 and the instantaneous adhesive curing accelerator a2 are formed into the previously dried curing accelerating layer a, dilution of the anaerobic adhesive curing accelerator a1 and the instantaneous adhesive curing accelerator a2 due to mixing with the press working oil b applied to the upper surface of the curing accelerating layer a is suppressed.

On the other hand, since the lower roller 131b descends and is separated from the lower surface of the strip-shaped steel sheet M, the press working oil b is not applied to the lower surface of the strip-shaped steel sheet M, and the insulating coating remains exposed.

In the subsequent first punching step S5, first punching of the strip-shaped steel sheet M is performed by the first-stage punching unit 141. At this time, since the press working oil b is previously applied to the upper surface of the strip-shaped steel sheet M, a defect in press working such as seizure between the male die 141a and the female die 141b does not occur.

In the subsequent second punching step S6, second punching of the strip-shaped steel sheet M is performed by the second-stage punching unit 142. Also at this time, since the press working oil b is previously applied to the upper surface of the strip-shaped steel sheet M, a defect in press working such as seizure between the male die 142a and the female die 142b does not occur.

Through the first punching step S5 and the second punching step S6 described above, the core back portion 22 and the tooth portion 23 shown in FIG. 1 are formed in the strip-shaped steel sheet M except for an outer shape portion.

In the subsequent adhesive application step S7, as shown in FIGS. 5 to 7, an anaerobic adhesive c1 and an instantaneous adhesive c2 ejected from the nozzle 153 are directly applied to the lower surface of the strip-shaped steel sheet M. At this time, the anaerobic adhesive c1 and the instantaneous adhesive c2 are applied in a point shape having a predetermined thickness dimension and a predetermined diameter dimension. Here, since the anaerobic adhesive c1 and the instantaneous adhesive c2 have not been mixed with the curing accelerating layer a yet, the anaerobic adhesive c1 and the instantaneous adhesive c2 are in a liquid form.

As shown in FIG. 5(b), when the anaerobic adhesive curing accelerator a1 and the instantaneous adhesive curing accelerator a2 are arranged in a checker shape, the anaerobic adhesive c1 and the instantaneous adhesive c2 are also arranged in a checker shape so as to coincide with relative positions of the anaerobic adhesive curing accelerator a1 and the instantaneous adhesive curing accelerator a2.

In the subsequent stacking and bonding step S8, as shown in FIGS. 5 to 7, the electrical steel sheet 40 whose outer circumference has been punched from the strip-shaped steel sheet M by the outer circumferential punching male die 161 is stacked on an upper surface of another electrical steel sheet 40 that has been previously punched. At this time, the curing accelerating layer a coated with the press working oil b is formed on the upper surface of the other electrical steel sheet 40. The electrical steel sheet 40 that has been subjected to outer circumferential punching this time is stacked on the other electrical steel sheet 40 and heated while being pressurized. Then, the anaerobic adhesive c1 and the instantaneous adhesive c2 on the lower surface of the electrical steel sheet 40 that has been subjected to outer circumferential punching this time push away the press working oil b on the upper surface side of the other electrical steel sheet 40 that has been previously subjected to outer circumferential punching, and are mixed with the curing accelerating layer a under the press working oil b. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

By sequentially repeating the above steps, a predetermined number of electrical steel sheets 40 are stacked and bonded, and the stator bonded and stacked core 21 is completed.

That is, in the stacked sheet number confirmation step S9, it is determined whether or not the number of stacked electrical steel sheets 40 has reached a predetermined number. As a result, if the number has not reached the predetermined number (determination: NO), the flow returns to the steel sheet feeding step S1, and the steel sheet feeding step S1 to the stacking and bonding step S8 are repeated again. On the other hand, if the number has reached the predetermined number in the stacked sheet number confirmation step S9 (determination: YES), the flow proceeds to the taking-out step S10.

In the subsequent taking-out step S10, the completed stator bonded and stacked core 21 is taken out from the outer circumferential punching female die 162, whereby all the steps of the bonded and stacked core manufacturing method are completed.

The gist of the bonded and stacked core manufacturing method using the bonded and stacked core manufacturing apparatus 100 described above will be summarized below.

The bonded and stacked core manufacturing method of the present embodiment is a method for manufacturing the stator bonded and stacked core 21 (bonded and stacked core) by performing press working on the strip-shaped steel sheet M obtained by applying the anaerobic adhesive a1 and the instantaneous adhesive a2 to one surface (upper surface) thereof and furthermore, applying the press working oil b onto the anaerobic adhesive a1 and the instantaneous adhesive a2 to obtain a plurality of electrical steel sheets 40 (steel sheet components), and stacking and bonding the electrical steel sheets 40.

In addition, in the present embodiment, on the upper surface of the strip-shaped steel sheet M before the press working oil b is applied, the curing accelerating layer a obtained by applying and drying the anaerobic adhesive curing accelerator a1 and the instantaneous adhesive curing accelerator a2 is formed.

According to the bonded and stacked core manufacturing method, both the anaerobic adhesive curing accelerator a1 and the instantaneous adhesive curing accelerator a2 are not naturally dried but are actively dried. As described above, since the curing accelerating layer a is formed by actively drying the curing accelerators previously, dilution of the curing accelerators due to mixing with the press working oil b applied in post-working is suppressed. Therefore, when the electrical steel sheets 40 are stacked and bonded to each other, the anaerobic adhesive curing accelerator a1 can be mixed with the anaerobic adhesive c1 while maintaining a high concentration thereof, and the instantaneous adhesive curing accelerator a2 can also be mixed with the instantaneous adhesive c2 while maintaining a high concentration thereof. Therefore, high bonding strength can be expressed early. Therefore, it is possible to obtain higher productivity while ensuring sufficient bonding strength.

As shown in FIG. 5, in the bonded and stacked core manufacturing method, the anaerobic adhesive curing accelerator a1 and the instantaneous adhesive curing accelerator a2 may be arranged in a checker shape.

Alternatively, as shown in FIG. 6, in the bonded and stacked core manufacturing method, the curing accelerating layer a may be formed by applying the anaerobic adhesive curing accelerator a1 and the instantaneous adhesive curing accelerator a2 to the upper surface of the strip-shaped steel sheet M in a state where the anaerobic adhesive curing accelerator a1 and the instantaneous adhesive curing accelerator a2 are previously mixed, and drying the curing accelerators.

Alternatively, as shown in FIG. 7, in the bonded and stacked core manufacturing method, the anaerobic adhesive curing accelerator a1 and the instantaneous adhesive curing accelerator a2 may be arranged in a stripe shape to form the curing accelerating layer a.

In any of the above cases, the anaerobic adhesive curing accelerator a1 and the instantaneous adhesive curing accelerator a2 can be uniformly arranged along an application surface of the strip-shaped steel sheet M. Therefore, a bonding force along the application surface can be uniform.

More specifically, the bonded and stacked core manufacturing method includes the following steps.

That is, each electrical steel sheet 40 includes an electrical steel sheet 40 (first steel sheet component) 40 that has been previously subjected to outer circumferential punching and an electrical steel sheet 40 (second steel sheet component) 40 that has been subsequently subjected to outer circumferential punching. The bonded and stacked core manufacturing method includes: a first step of preparing an electrical steel sheet 40 (first steel sheet component) 40 having an upper surface (first surface), the curing accelerating layer a formed on the upper surface, and the press working oil b disposed on the curing accelerating layer a; a second step of preparing an electrical steel sheet 40 (second steel sheet component) that has been subsequently subjected to outer circumferential punching, having a lower surface (second surface), and the anaerobic adhesive c1 and the instantaneous adhesive c2 disposed on the lower surface; and a third step of superimposing and bonding the electrical steel sheet 40 (first steel sheet component) 40 that has been previously subjected to outer circumferential punching and the electrical steel sheet 40 (second steel sheet component) that has been subsequently subjected to outer circumferential punching such that the upper surface and the lower surface face each other.

According to the bonded and stacked core manufacturing method, in the first step, both the anaerobic adhesive curing accelerator a1 and the instantaneous adhesive curing accelerator a2 are formed into the previously dried curing accelerating layer a, and mixing of the anaerobic adhesive curing accelerator a1 and the instantaneous adhesive curing accelerator a2 with the press working oil b is suppressed. Therefore, when the electrical steel sheet 40 (first steel sheet component) 40 that has been previously subjected to outer circumferential punching and the electrical steel sheet 40 (second steel sheet component) that has been subsequently subjected to outer circumferential punching are superimposed and bonded in the third step, the anaerobic adhesive curing accelerator a1 can be mixed with the anaerobic adhesive c1 while maintaining a high concentration thereof, and the instantaneous adhesive curing accelerator a2 can also be mixed with the instantaneous adhesive c2 while maintaining a high concentration thereof.

In the bonded and stacked core manufacturing method, the stator bonded and stacked core (bonded and stacked core) 21 may be a stator for a rotary electric machine.

According to the bonded and stacked core manufacturing method, since higher productivity can be obtained while ensuring sufficient bonding strength, it is possible to manufacture a stator for a rotary electric machine having high performance and low manufacturing cost.

The bonded and stacked core manufacturing apparatus 100 of the present embodiment is an apparatus for manufacturing the stator bonded and stacked core (bonded and stacked core) 21 including the plurality of electrical steel sheets (steel sheet components) 40 punched from the strip-shaped steel sheet M.

The bonded and stacked core manufacturing apparatus 100 of the present embodiment includes: the press working oil application unit 130 that applies the press working oil b to an upper surface (one surface) side of the strip-shaped steel sheet M; the press working unit 140 that applies press working to the strip-shaped steel sheet M; the adhesive application unit 150 that applies the anaerobic adhesive c1 and the instantaneous adhesive c2 to a lower surface of the strip-shaped steel sheet M; and the curing accelerating layer forming unit 120 that forms the curing accelerating layer a obtained by applying the anaerobic adhesive curing accelerator a1 and the instantaneous adhesive curing accelerator a2 to the upper surface of the strip-shaped steel sheet M before the press working oil b is applied, and drying the curing accelerators.

According to the bonded and stacked core manufacturing apparatus 100, both the anaerobic adhesive curing accelerator a1 and the instantaneous adhesive curing accelerator a2 are not naturally dried but are actively dried by the curing accelerating layer forming unit 120. As described above, since the curing accelerating layer a is formed by actively drying the curing accelerators previously, dilution of the curing accelerators due to mixing with the press working oil b applied in post-working is suppressed. Therefore, when the electrical steel sheets 40 are stacked and bonded to each other, the anaerobic adhesive curing accelerator a1 can be mixed with the anaerobic adhesive c1 while maintaining a high concentration thereof, and the instantaneous adhesive curing accelerator a2 can also be mixed with the instantaneous adhesive c2 while maintaining a high concentration thereof. Therefore, high bonding strength can be expressed early. Therefore, it is possible to obtain higher productivity while ensuring sufficient bonding strength.

In the bonded and stacked core manufacturing apparatus 100, as shown in FIG. 5, the curing accelerating layer forming unit 120 may include the nozzle 122 that applies the anaerobic adhesive curing accelerator a1 and the instantaneous adhesive curing accelerator a2 in a checker shape.

Alternatively, in the bonded and stacked core manufacturing apparatus 100, as shown in FIG. 6, the curing accelerating layer forming unit 120 may include a pipe (curing accelerator supply flow path) through which the anaerobic adhesive curing accelerator a1 and the instantaneous adhesive curing accelerator a2 flow in a state where the anaerobic adhesive curing accelerator a1 and the instantaneous adhesive curing accelerator a2 are previously mixed, and the nozzle 122 leading to the pipe.

Alternatively, in the bonded and stacked core manufacturing apparatus 100, as shown in FIG. 7, the curing accelerating layer forming unit 120 may include the nozzle 122 that applies the anaerobic adhesive curing accelerator a1 and the instantaneous adhesive curing accelerator a2 in a stripe shape.

In any of the above cases, the anaerobic adhesive curing accelerator a1 and the instantaneous adhesive curing accelerator a2 can be uniformly arranged along an application surface of the strip-shaped steel sheet M by the nozzle 122. Therefore, a bonding force along the application surface can be uniform.

Note that, in the present embodiment, the case where the press working oil b is applied only to the upper surface of the strip-shaped steel sheet M in the working oil application step S4 shown in FIG. 4 has been described, but the present invention is not limited only to this form. For example, as shown in the modification example of FIG. 8, a working oil application step S4A of applying the press working oil b only to the lower surface of the strip-shaped steel sheet M or applying the press working oil b to both the upper and lower surfaces of the strip-shaped steel sheet M may be adopted.

In the working oil application step S4A, when the press working oil b is applied only to the lower surface of the strip-shaped steel sheet M, the upper roller 131a is retracted upward from the upper surface of the strip-shaped steel sheet M to be in non-contact with the strip-shaped steel sheet M, and the lower roller 131b is rolled with respect to the lower surface of the strip-shaped steel sheet M in a state where an outer circumferential surface of the lower roller 131b is impregnated with the press working oil b. As a result, the press working oil is applied to the entire surface of only the lower surface of the strip-shaped steel sheet M. As a result, on the upper surface of the strip-shaped steel sheet M, the curing accelerating layer a including the anaerobic adhesive curing accelerator a1 and the instantaneous adhesive curing accelerator a2 is formed in a state where the curing accelerating layer a is exposed. On the other hand, on the lower surface of the strip-shaped steel sheet M, the press working oil b, and the anaerobic adhesive c1 and the instantaneous adhesive c2 applied onto the press working oil b are formed.

In this case, in the stacking and bonding step S8A in FIG. 8, the electrical steel sheet 40 whose outer circumference has been punched from the strip-shaped steel sheet M by the outer circumferential punching male die 161 is stacked on an upper surface of another electrical steel sheet 40 that has been previously subjected to outer circumferential punching, and is heated while being pressurized. At this time, the anaerobic adhesive c1 and the instantaneous adhesive c2 on the lower surface of the electrical steel sheet 40 that has been subsequently subjected to outer circumferential punching push away the press working oil b on the anaerobic adhesive c1 and the instantaneous adhesive c2, and are applied to the lower surface of the electrical steel sheet 40. At the same time, the anaerobic adhesive c1 and the instantaneous adhesive c2 on the lower surface of the electrical steel sheet 40 that has been subsequently subjected to outer circumferential punching are mixed with the curing accelerating layer a on the upper surface of the electrical steel sheet 40 that has been previously subjected to outer circumferential punching. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

Note that, since the other steps are the same as the steps described with reference to FIG. 4, the same references are used and redundant description is omitted.

Alternatively, for example, in the working oil application step S4A shown in the modification example of FIG. 8, the press working oil b may be applied to both the upper and lower surfaces of the strip-shaped steel sheet M.

In the working oil application step S4A in this case, the upper roller 131a and the lower roller 131b are impregnated with the press working oil b, and then the upper roller 131a and the lower roller 131b are rolled while the strip-shaped steel sheet M is sandwiched therebetween. As a result, on the upper surface of the strip-shaped steel sheet M, the curing accelerating layer a including the anaerobic adhesive curing accelerator a1 and the instantaneous adhesive curing accelerator a2, and the press working oil b coating the upper surface of the curing accelerating layer a are formed. On the other hand, on the lower surface of the strip-shaped steel sheet M, the press working oil b, and the anaerobic adhesive c1 and the instantaneous adhesive c2 applied onto the press working oil b are formed.

In addition, in the stacking and bonding step S8A in FIG. 8, the electrical steel sheet 40 whose outer circumference has been punched from the strip-shaped steel sheet M by the outer circumferential punching male die 161 is stacked on an upper surface of another electrical steel sheet 40 that has been previously subjected to outer circumferential punching, and is heated while being pressurized. At this time, the anaerobic adhesive c1 and the instantaneous adhesive c2 on the lower surface of the electrical steel sheet 40 that has been subsequently subjected to outer circumferential punching push away the press working oil b on the anaerobic adhesive c1 and the instantaneous adhesive c2, and are applied to the lower surface of the electrical steel sheet 40. At the same time, the anaerobic adhesive c1 and the instantaneous adhesive c2 on the lower surface of the electrical steel sheet 40 that has been subsequently subjected to outer circumferential punching are mixed with the curing accelerating layer a under the press working oil b on the upper surface of the electrical steel sheet 40 that has been previously subjected to outer circumferential punching while pushing away the press working oil b. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

Note that, since the other steps are the same as the steps described with reference to FIG. 4, the same references are used and redundant description is omitted.

Second Embodiment

A second embodiment of the present invention will be described below with reference to FIGS. 9 to 14.

Figure 9:
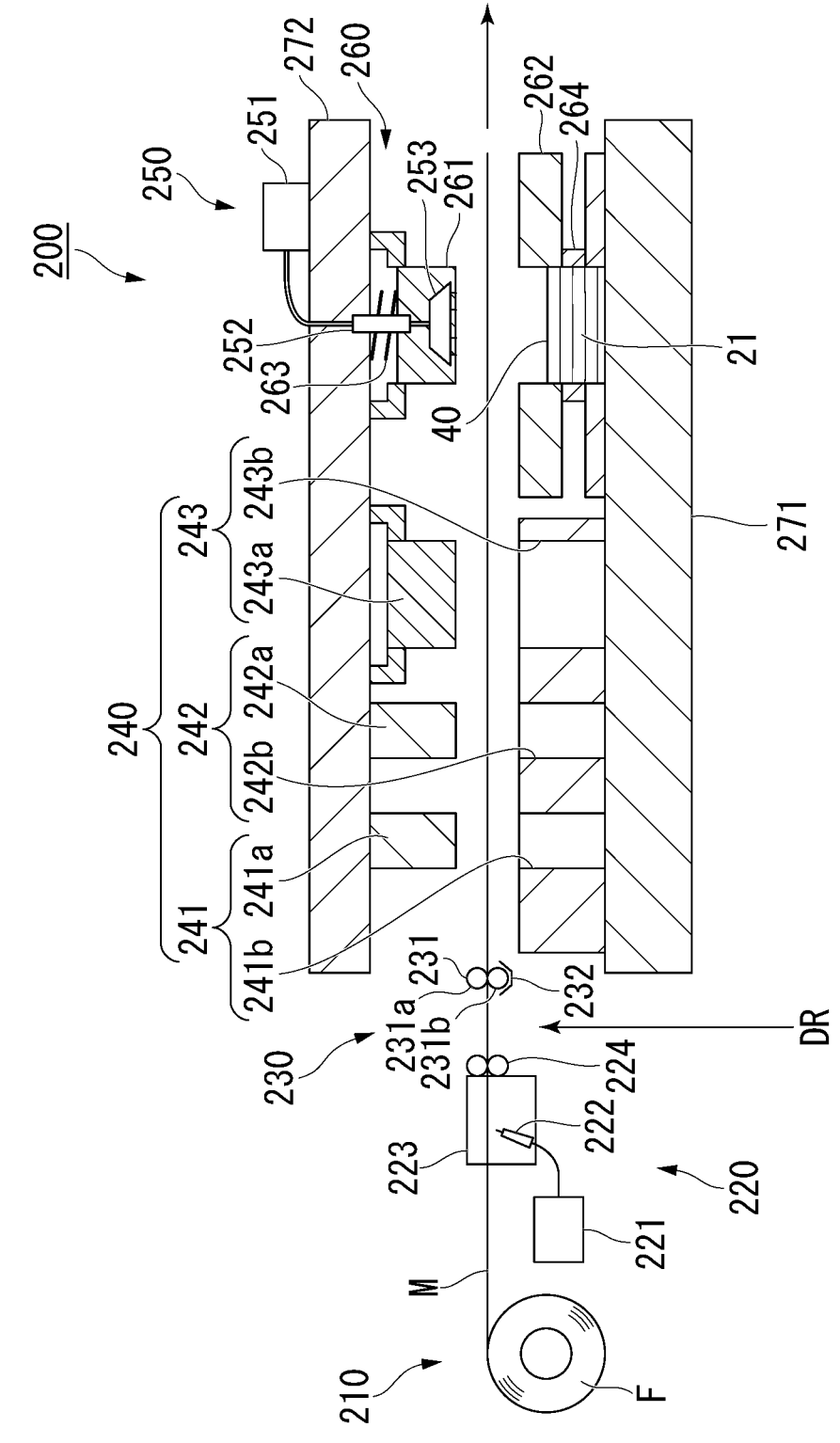
FIG. 9 is a side view of a bonded and stacked core manufacturing apparatus according to a second embodiment of the present invention.

First, a bonded and stacked core manufacturing apparatus 200 according to the present embodiment will be described with reference to a side view shown in FIG. 9. As shown in FIG. 9, the bonded and stacked core manufacturing apparatus 200 includes a strip-shaped steel sheet supply unit 210, a curing accelerating layer forming unit 220, a drive unit (not shown), a press working oil application unit 230, a press working unit 240, an adhesive application unit 250, and a stacking and bonding unit 260.

A hoop material F around which the strip-shaped steel sheet M to be a material of the electrical steel sheet (steel sheet component) 40 is wound is pivotally supported by the strip-shaped steel sheet supply unit 210, and the strip-shaped steel sheet M is fed toward the right side of FIG. 9. In the following description, the right side of a drawing, which is a feeding direction of the strip-shaped steel sheet M, may be referred to as a downstream side, and the left side of the drawing, which is the direction opposite thereto, may be referred to as an upstream side. The strip-shaped steel sheet M fed toward the downstream side from the strip-shaped steel sheet supply unit 210 is a steel sheet having the above-described chemical composition, and both surfaces of the strip-shaped steel sheet M are coated with the above-described insulating coatings.

The curing accelerating layer forming unit 220 includes a curing accelerator tank 221, a nozzle 222, a seal box 223, and a wiping roller 224.

The curing accelerator tank 221 includes a first storage unit that stores an anaerobic adhesive curing accelerator dissolved in a solvent, a second storage unit that stores an instantaneous adhesive curing accelerator dissolved in a solvent, and a curing accelerator mixing unit (not shown). The first storage unit and the second storage unit are partitioned from each other such that the anaerobic adhesive curing accelerator and the instantaneous adhesive curing accelerator are not mixed with each other.

The anaerobic adhesive curing accelerator is mixed with the anaerobic adhesive to accelerate instantaneous curing of the anaerobic adhesive, and the anaerobic adhesive curing accelerator exemplified in the first embodiment can be used. Similarly, the instantaneous adhesive curing accelerator is mixed with the instantaneous adhesive (2-cyanoacrylate-based adhesive) to accelerate instantaneous curing of the instantaneous adhesive, and the instantaneous adhesive curing accelerator exemplified in the first embodiment can be used. As the type of solvent, those exemplified in the first embodiment can be used.

The nozzle 222 has a plurality of first nozzle holes for applying the anaerobic adhesive curing accelerator, and a plurality of second nozzle holes for applying the instantaneous adhesive curing accelerator (not shown).

The first nozzle holes are directly connected to the first storage unit of the curing accelerator tank 221 through a first pipe.

The second nozzle holes are directly connected to the second storage unit of the curing accelerator tank 221 through a second pipe.

Furthermore, both the first nozzle holes and the second nozzle holes are also connected to the curing accelerator mixing unit through a third pipe. The curing accelerator mixing unit is connected to both the first storage unit and the second storage unit through a fourth pipe. The anaerobic adhesive curing accelerator from the first storage unit and the instantaneous adhesive curing accelerator from the second storage unit can be taken into the curing accelerator mixing unit, and stirred and mixed therein.

The first pipe, the second pipe, and the fourth pipe are connected to a switching valve (not shown). By operation of this switching valve, a flow of the anaerobic adhesive curing accelerator and a flow of the instantaneous adhesive curing accelerator can be switched to the following (1) or (2).

(1) The anaerobic adhesive curing accelerator in the first storage unit is caused to flow into the first nozzle holes through the first pipe, and at the same time, the instantaneous adhesive curing accelerator in the second storage unit is caused to flow into the second nozzle holes through the second pipe. As a result, the anaerobic adhesive curing accelerator is ejected from the first nozzle holes, and the instantaneous adhesive curing accelerator is ejected from the second nozzle holes.

(2) Both the anaerobic adhesive curing accelerator in the first storage unit and the instantaneous adhesive curing accelerator in the second storage unit are taken into the curing accelerator mixing unit through the fourth pipe, and stirred and mixed therein. The mixed accelerator in which the anaerobic adhesive curing accelerator and the instantaneous adhesive curing accelerator are mixed in this manner is caused to flow into both the first nozzle holes and the second nozzle holes through the third pipe. As a result, the mixed accelerator is ejected from both the first nozzle holes and the second nozzle holes.

Ejection ports of the first nozzle holes face a lower surface of the strip-shaped steel sheet M, and the anaerobic adhesive curing accelerator or the mixed accelerator can be applied to the lower surface in a point shape or a linear shape.

Ejection ports of the second nozzle holes also face the lower surface of the strip-shaped steel sheet M, and the instantaneous adhesive curing accelerator or the mixed accelerator can be applied to the lower surface in a point shape or a linear shape.

In the nozzle 222, the first nozzle holes and the second nozzle holes are alternately arranged, and a pitch is determined such that the curing accelerators ejected from the first nozzle holes and the second nozzle holes are not excessively mixed with each other on an application surface of the strip-shaped steel sheet M. When the anaerobic adhesive curing accelerator and the instantaneous adhesive curing accelerator are applied in a checker shape as described later with reference to FIG. 11, the pitch is preferably the same as a pitch between nozzle holes of a nozzle 253 described later such that application positions of the anaerobic adhesive curing accelerator and the instantaneous adhesive curing accelerator relatively coincide with application positions of an anaerobic adhesive and an instantaneous adhesive in a subsequent step.

By switching to either of the above (1) and (2) by the switching valve, an application form of the anaerobic adhesive curing accelerator and the instantaneous adhesive curing accelerator applied to an application surface of the strip-shaped steel sheet M is divided into a case of application in an unmixed state and a case of application in a mixed state. In the following description, three of the anaerobic adhesive curing accelerators, the instantaneous adhesive curing accelerator, and the mixed accelerator may be collectively referred to simply as "curing accelerator". On the other hand, when it is necessary to distinguish these from each other, the anaerobic adhesive curing accelerator, the instantaneous adhesive curing accelerator, and the mixed accelerator will be described separately.

The seal box 223 is a box having an internal space, and has an inlet and an outlet leading to the internal space. The strip-shaped steel sheet M is fed from the inlet to the internal space of the seal box 223 while maintaining a horizontal state thereof, and then fed from the outlet to the outside of the seal box 223. The nozzle 222 is disposed at a lower portion of the internal space of the seal box 223. As described above, a nozzle port of the nozzle 222 is directed to a lower surface of a portion of the strip-shaped steel sheet M that passes through the internal space. The curing accelerator sprayed from the nozzle 222 onto the lower surface of the strip-shaped steel sheet M is instantaneously dried because a solvent volatilizes. As a result, on the lower surface of the strip-shaped steel sheet M, the curing accelerating layer in which a solvent is dried is formed with a uniform thickness over the entire surface before the strip-shaped steel sheet M goes out of the outlet. The thickness of the curing accelerating layer may be 0.1 μm, for example. Note that, since the curing accelerator is hardly applied to the upper surface of the strip-shaped steel sheet M, an insulating coating almost remains exposed on the upper surface.

The wiping roller 224 mainly wipes off the curing accelerator remaining on the upper surface of the strip-shaped steel sheet M as an excess. As a result, the curing accelerator is completely wiped off from the upper surface of the strip-shaped steel sheet M after the strip-shaped steel sheet M passes through the wiping roller 224, and the insulating coating remains exposed on the upper surface.

Note that a plurality of patterns can be selected for the curing accelerating layer by operation of the switching valve. These patterns will be described later with reference to FIGS. 11 to 13.

The drive unit is disposed at a position DR between the curing accelerating layer forming unit 220 and the press working oil application unit 230. The drive unit intermittently feeds the strip-shaped steel sheet M in the right direction of the drawing from the curing accelerating layer forming unit 220 toward the press working oil application unit 230. Note that, on the lower surface of the strip-shaped steel sheet M fed from the curing accelerating layer forming unit 220, a curing accelerating layer in which the curing accelerator is dried is already formed before the strip-shaped steel sheet M enters the drive unit. On the other hand, on the upper surface of the strip-shaped steel sheet M before the strip-shaped steel sheet M enters the drive unit, there is no curing accelerating layer, and an insulating coating remains exposed.

The press working oil application unit 230 includes an application roller 231 and an oil pan 232.

The oil pan 232 is disposed at a position below the strip-shaped steel sheet M and immediately below the application roller 231. The application roller 231 includes an upper roller 231a and a lower roller 231b.

The upper roller 231a is disposed immediately above the strip-shaped steel sheet M, and can be switched between a state of being in contact with the upper surface of the strip-shaped steel sheet M and a state of being separated from the upper surface of the strip-shaped steel sheet M by moving up and down. The upper roller 231a can apply a press working oil supplied from a press working oil supply unit (not shown) to the upper surface of the strip-shaped steel sheet M by rolling while being in contact with the upper surface of the steel sheet M in a state where an outer circumferential surface of the upper roller 231a is impregnated with the press working oil.

The lower roller 231b is disposed immediately below the strip-shaped steel sheet M, and can be switched between a state of being in contact with the lower surface of the strip-shaped steel sheet M and a state of being separated from the lower surface of the strip-shaped steel sheet M by moving up and down. The lower roller 231b can apply a press working oil supplied from the press working oil supply unit to the lower surface of the strip-shaped steel sheet M by rolling while being in contact with the lower surface of the steel sheet M in a state where an outer circumferential surface of the lower roller 231b is impregnated with the press working oil.

The oil pan 232 receives and collects excess press working oil dripping from the upper roller 231a and the lower roller 231b, and returns the excess press working oil to the press working oil supply unit.

According to the press working oil application unit 230, by supplying a press working oil from the press working oil supply unit in a state where the upper roller 231a is in contact with the upper surface of the strip-shaped steel sheet M, it is possible to continuously or intermittently feed the strip-shaped steel sheet M to the downstream side while forming a layer of the press working oil over the entire upper surface of the strip-shaped steel sheet M.

Similarly, by supplying a press working oil from the press working oil supply unit in a state where the lower roller 231b is in contact with the lower surface of the strip-shaped steel sheet M, it is possible to continuously or intermittently feed the strip-shaped steel sheet M to the downstream side while forming a layer of the press working oil over the entire lower surface of the strip-shaped steel sheet M.

Alternatively, by sandwiching the strip-shaped steel sheet M between the upper roller 231a and the lower roller 231b, it is possible to continuously or intermittently feed the strip-shaped steel sheet M to the downstream side while forming a layer of the press working oil over both the entire upper surface and the entire lower surface of the strip-shaped steel sheet M.

As described above, by moving the respective positions of the upper roller 231*a* and the lower roller 231*b* up and down as necessary, selection can be made from three cases of applying the press working oil only to the upper surface of the strip-shaped steel sheet M, applying the press working oil only to the lower surface of the strip-shaped steel sheet M, and applying the press working oil to both the upper and lower surfaces of the strip-shaped steel sheet M.

Here, in any of the above cases, before the press working oil is applied, both the anaerobic adhesive curing accelerator and the instantaneous adhesive curing accelerator applied to the lower surface of the strip-shaped steel sheet M are not naturally dried but actively dried. As described above, since the curing accelerating layer is formed by actively drying the curing accelerators previously, dilution of the curing accelerators due to mixing with the press working oil is suppressed. Therefore, the concentration of the anaerobic adhesive curing accelerator and the concentration of the instantaneous adhesive curing accelerator on the lower surface of the strip-shaped steel sheet M after application of the press working oil are both maintained unchanged before and after application of the press working oil. Therefore, the strip-shaped steel sheet M after passing through the press working oil application unit 230 is fed to the press working unit 240 while maintaining the concentration of the curing accelerator on the lower surface of the strip-shaped steel sheet M.

The press working unit 240 includes a first-stage punching unit 241, a second-stage punching unit 242, and a third-stage punching unit 243.

The first-stage punching unit 241 is disposed on the downstream side of the press working oil application unit 230 and includes a male die 241*a* and a female die 241*b*. The male die 241*a* and the female die 241*b* are coaxially disposed in the vertical direction, and the strip-shaped steel sheet M is inserted therebetween. Therefore, the male die 241*a* faces the upper surface of the strip-shaped steel sheet M, and the female die 241*b* faces the lower surface of the strip-shaped steel sheet M. Then, in a state where feeding of the strip-shaped steel sheet M is temporarily stopped, the male die 241*a* is moved downward to reach the inside of the female die 241*b* by a hydraulic mechanism (not shown), thereby performing first punching necessary for forming the electrical steel sheet 40 from the strip-shaped steel sheet M. At this time, since the press working oil is applied to the strip-shaped steel sheet M, punching can be performed without causing seizure or the like. After the punching, the male die 241*a* is moved upward to be pulled out from the female die 241*b*, and the strip-shaped steel sheet M is fed toward the downstream side again.

The second-stage punching unit 242 is disposed on the downstream side of the first-stage punching unit 241, and includes a male die 242*a* and a female die 242*b*. The male die 242*a* and the female die 242*b* are coaxially disposed in the vertical direction, and the strip-shaped steel sheet M after the first punching is inserted therebetween. Therefore, the male die 242*a* faces the upper surface of the strip-shaped steel sheet M, and the female die 242*b* faces the lower surface of the strip-shaped steel sheet M. Then, in a state where feeding of the strip-shaped steel sheet M is temporarily stopped again, the male die 242*a* is moved downward to reach the inside of the female die 242*b* by a hydraulic mechanism (not shown), thereby performing second punching necessary for forming the electrical steel sheet 40 from the strip-shaped steel sheet M. Also at this time, since the press working oil is applied to the strip-shaped steel sheet M, punching can be performed without causing seizure or the like. After the punching, the male die 242*a* is moved upward to be pulled out from the female die 242*b*, and the strip-shaped steel sheet M is fed toward the downstream side again.

The third-stage punching unit 243 is disposed on the downstream side of the second-stage punching unit 242 and includes a male die 243*a* and a female die 243*b*. The male die 243*a* and the female die 243*b* are coaxially disposed in the vertical direction, and the strip-shaped steel sheet M after the second punching is inserted therebetween. Therefore, the male die 243*a* faces the upper surface of the strip-shaped steel sheet M, and the female die 243*b* faces the lower surface of the strip-shaped steel sheet M. Then, in a state where feeding of the strip-shaped steel sheet M is temporarily stopped again, the male die 243*a* is moved downward to reach the inside of the female die 243*b* by a hydraulic mechanism (not shown), thereby performing third punching necessary for forming the electrical steel sheet 40 from the strip-shaped steel sheet M. Also at this time, since the press working oil is applied to the strip-shaped steel sheet M, punching can be performed without causing seizure or the like. After the punching, the male die 243*a* is moved upward to be pulled out from the female die 243*b*, and the strip-shaped steel sheet M is fed toward the downstream side again.

The adhesive application unit 250 is incorporated in the stacking and bonding unit 260 on the downstream side of the press working unit 240. The adhesive application unit 250 includes an air pressure feeder 251, a syringe 252, and a nozzle 253.

The syringe 252 is a container having a space for storing an anaerobic adhesive and a space for storing an instantaneous adhesive (not shown). The space for storing an anaerobic adhesive and the space for storing an instantaneous adhesive are partitioned from each other such that the anaerobic adhesive and the instantaneous adhesive are not mixed. Here, as the anaerobic adhesive, those exemplified in the first embodiment can be used. Similarly, as the instantaneous adhesive, those exemplified in the first embodiment can be used.

The syringe 252 and the air pressure feeder 251 are connected to each other through a pipe that feeds air from the air pressure feeder 251 to the syringe 252. In addition, the syringe 252 and the nozzle 253 are connected to each other through a fifth pipe that supplies an anaerobic adhesive from the syringe 252 to the nozzle 253 and a sixth pipe that supplies an instantaneous adhesive.

The nozzle 253 includes a plurality of needles (not shown) whose ejection ports face downward. These needles are disposed above the strip-shaped steel sheet M. Therefore, the ejection ports of the needles face the upper surface of the strip-shaped steel sheet M. The needles include a plurality of first needles for applying an anaerobic adhesive and a plurality of second needles for applying an instantaneous adhesive (not shown). An ejection port of the first needle and an ejection port of the second needle are alternately and uniformly arranged when the nozzle 253 is viewed from the bottom.

Figure 11:
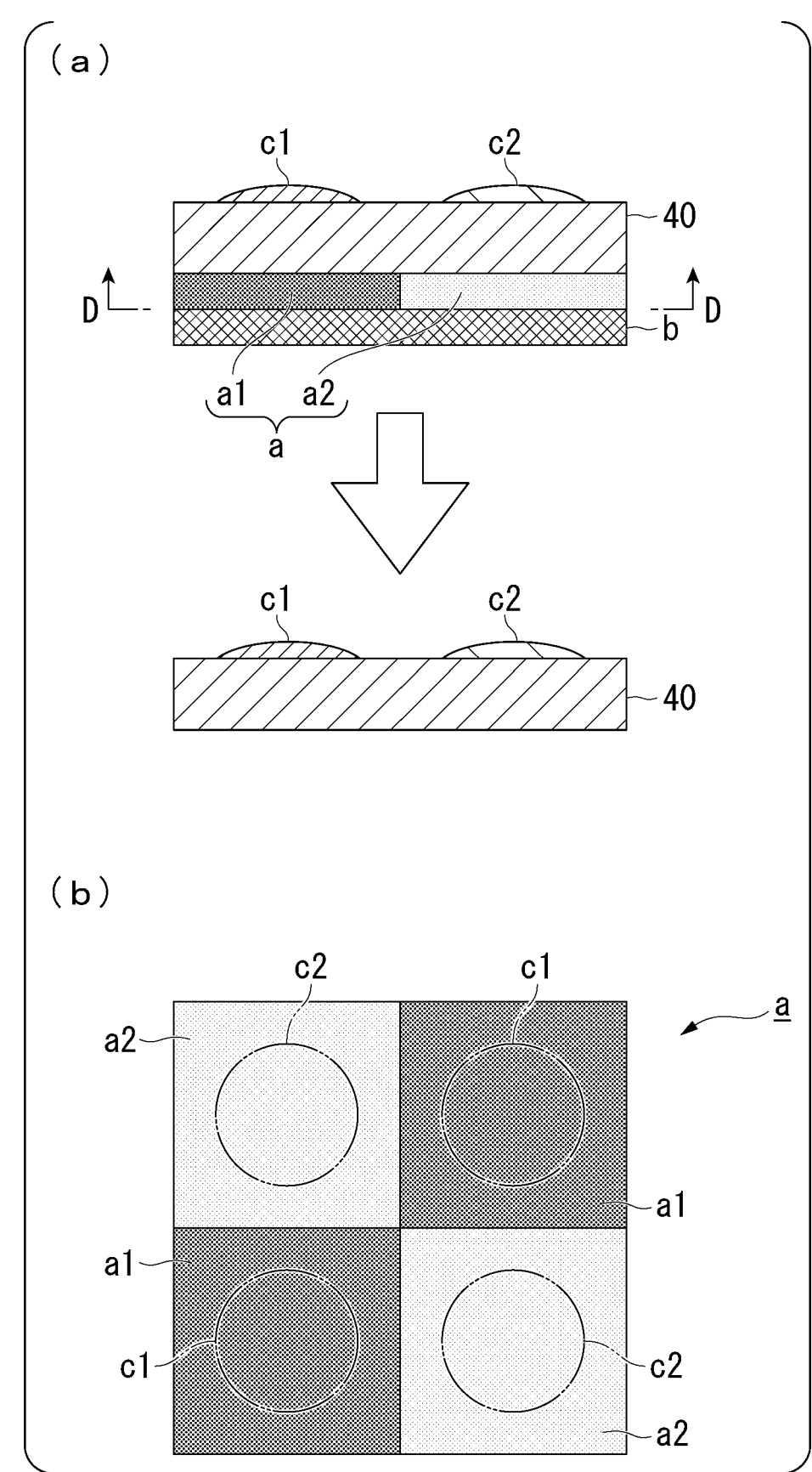

Here, as shown in FIG. 11 described later, when the anaerobic adhesive curing accelerator and the instantaneous adhesive curing accelerator are arranged in a checker shape, the position of the ejection port of each of the first needles preferably coincides with each position of the anaerobic adhesive curing accelerator applied and dried on the lower surface of the strip-shaped steel sheet M. Similarly, the position of the ejection port of each of the second needles preferably coincides with each position of the instantaneous adhesive curing accelerator applied and dried on the lower surface of the strip-shaped steel sheet M. In this case, when feeding of the strip-shaped steel sheet M is temporarily stopped above the nozzle 153 after the strip-shaped steel sheet M passes the press working unit 140, the relative positions of the anaerobic adhesive curing accelerator on the lower surface of the strip-shaped steel sheet M and the ejection ports of the first needles coincide with each other, and the relative positions of the instantaneous adhesive curing accelerator and the ejection ports of the second needles coincide with each other. As a result, the adhesives can be applied to the curing accelerators, respectively in a correct combination.

The first needles are directly connected to a space that stores the anaerobic adhesive through the fifth pipe. On the other hand, the second needles are directly connected to a space that stores the instantaneous adhesive through the sixth pipe.

The first needles and the second needles can apply the anaerobic adhesive and the instantaneous adhesive to the upper surface of the strip-shaped steel sheet M such that the anaerobic adhesive and the instantaneous adhesive form a checker shape (lattice shape). As a result, a square or circular pattern formed of the anaerobic adhesive and a square or circular pattern formed of the instantaneous adhesive are alternately arranged on the insulating coating formed on the upper surface of the strip-shaped steel sheet M in both a longitudinal direction of the strip-shaped steel sheet M and a width direction of the strip-shaped steel sheet M. That is, the anaerobic adhesive and the instantaneous adhesive can be arranged so as to be adjacent to each other in both the longitudinal direction of the strip-shaped steel sheet M and the width direction of the strip-shaped steel sheet M.

Furthermore, in this positioning state, when air is pressure-fed from the air pressure feeder 251 to the syringe 252, the air is uniformly supplied to both the space that stores the anaerobic adhesive and the space that stores the instantaneous adhesive. Then, the anaerobic adhesive is supplied to the first needles through the fifth pipe, and the instantaneous adhesive is supplied to the second needles through the sixth pipe. Then, the anaerobic adhesive is ejected from the ejection ports of the first needles and applied to the upper surface of the strip-shaped steel sheet M. Similarly, the instantaneous adhesive is ejected from the ejection ports of the second needles and applied to the upper surface of the strip-shaped steel sheet M.

The stacking and bonding unit 260 includes an outer circumferential punching male die 261, an outer circumferential punching female die 262, a spring 263, and a heater 264.

The outer circumferential punching male die 261 is a cylindrical die having a circular bottom surface, and a lower end of the spring 263 is connected to an upper end of the outer circumferential punching male die 261. The outer circumferential punching male die 261 can move up and down together with the spring 263 in a state of being supported by the spring 263. The outer circumferential punching male die 261 has an outer diameter dimension substantially the same as the outer diameter dimension of the stator bonded and stacked core 21.

The outer circumferential punching female die 262 is a die having a cylindrical internal space, and has an inner diameter dimension substantially the same as the outer diameter dimension of the stator bonded and stacked core 21.

The heater 264 is integrally incorporated in the outer circumferential punching female die 262. The heater 264 heats the electrical steel sheets (steel sheet components) 40 stacked in the outer circumferential punching female die 262 from a circumference of the electrical steel sheets 40. When a thermosetting type is used as the adhesive, the adhesive is cured by receiving heat from the heater 264. On the other hand, when a room-temperature curing type is used as the adhesive, the adhesive is cured at room temperature without requiring heating.

According to the stacking and bonding unit 260, in a state where feeding of the strip-shaped steel sheet M is temporarily stopped, the outer circumferential punching male die 261 is lowered to sandwich the strip-shaped steel sheet M between the outer circumferential punching male die 261 and the outer circumferential punching female die 262, and the outer circumferential punching male die 261 is further pressed into the outer circumferential punching female die 262, whereby the electrical steel sheet 40 obtained by outer circumferential punching from the strip-shaped steel sheet M is obtained.

The punched electrical steel sheet 40 is stacked on an upper surface of another electrical steel sheet 40 that has been previously punched, and stacked and bonded in the outer circumferential punching female die 262, and furthermore, a pressurizing force from the outer circumferential punching male die 261 and heating from the heater 264 are applied to the punched electrical steel sheet 40. At this time, the pressurizing force applied from the outer circumferential punching male die 261 to the electrical steel sheet 40 is maintained constant all the time by a biasing force of the spring 263.

As described above, the electrical steel sheet 40 punched this time is bonded and fixed to the upper surface of the electrical steel sheet 40 punched last time. By repeating such steps of outer circumferential punching, pressurizing, and heating as many times as the number of stacked electrical steel sheets 40, the stator bonded and stacked core 21 is formed in the outer circumferential punching female die 262.

As shown in FIG. 9, the female die 241*b*, the female die 242*b*, the female die 243*b*, the outer circumferential punching female die 262, and the heater 264 are fixed onto a common fixing base 271. Therefore, relative positions of the female die 241*b*, the female die 242*b*, the female die 243*b*, the outer circumferential punching female die 262, and the heater 264 in the horizontal direction and the up-down direction are fixed.

Similarly, the male die 241*a*, the male die 242*a*, the male die 243*a*, the nozzle 253, and the outer circumferential punching male die 261 are also fixed to the lower surface of the common movable base 272. Therefore, relative positions of the male die 241*a*, the male die 242*a*, the male die 243*a*, the nozzle 253, and the outer circumferential punching male die 261 in the horizontal direction and the up-down direction are also fixed.

The drive unit feeds the strip-shaped steel sheet M toward the downstream side, and lowers the movable base 272 when the drive unit temporarily stops the strip-shaped steel sheet M, whereby outer circumferential punching, stacking, and bonding of the electrical steel sheet 40, application of an adhesive to the electrical steel sheet 40 for the next step, the third punching to the position of the strip-shaped steel sheet M to be subjected to outer circumferential punching next, the second punching to the position of the strip-shaped steel sheet M to be subjected to the third punching next, and the first punching to the position of the strip-shaped steel sheet M to be subjected to the second punching next are simultaneously performed.

Subsequently, the movable base 272 is raised and retracted above the strip-shaped steel sheet M, and then the strip-shaped steel sheet M is fed again toward the downstream side by a predetermined distance by the drive unit and temporarily stopped again. In this state, the movable base 272 is lowered again, and working at each position is continuously performed. As described above, the step of moving the movable base 272 up and down during a temporary stop while intermittently feeding the strip-shaped steel sheet M by the drive unit is repeated, whereby the stator bonded and stacked core 21 is manufactured.

A bonded and stacked core manufacturing method using the bonded and stacked core manufacturing apparatus 200 having the above-described constitution will be described below with reference to FIGS. 10 to 14.

Figure 10:
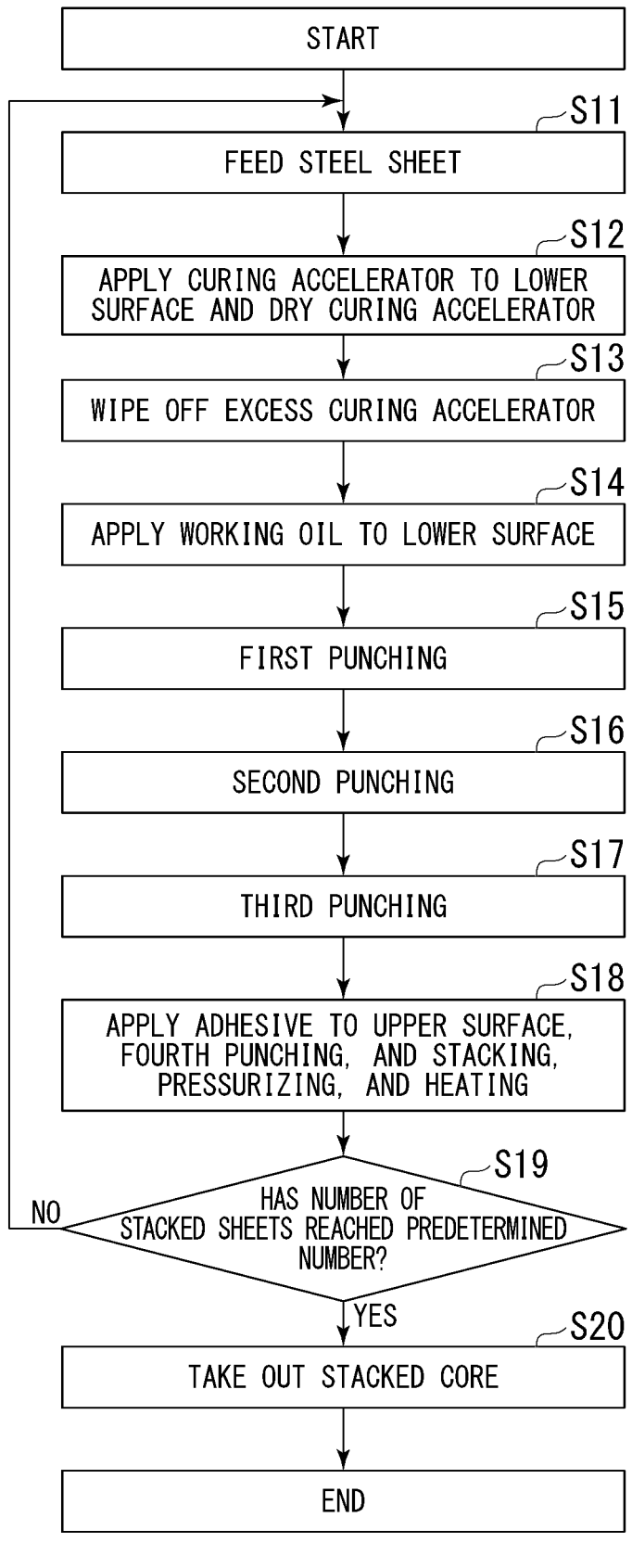
FIG. 10 is a flowchart for explaining a bonded and stacked core manufacturing method according to the embodiment.
Figure 12:
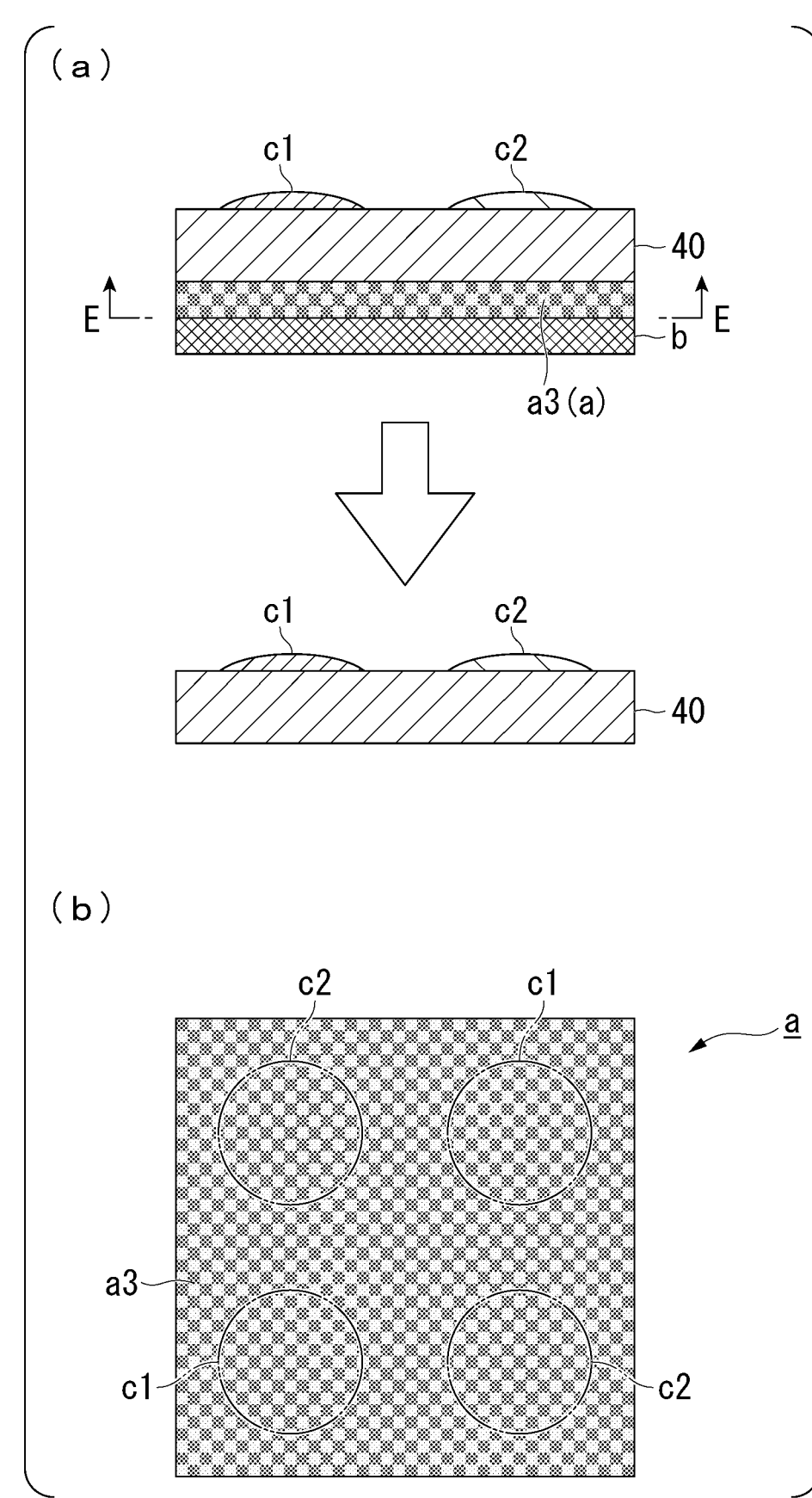
Figure 13:
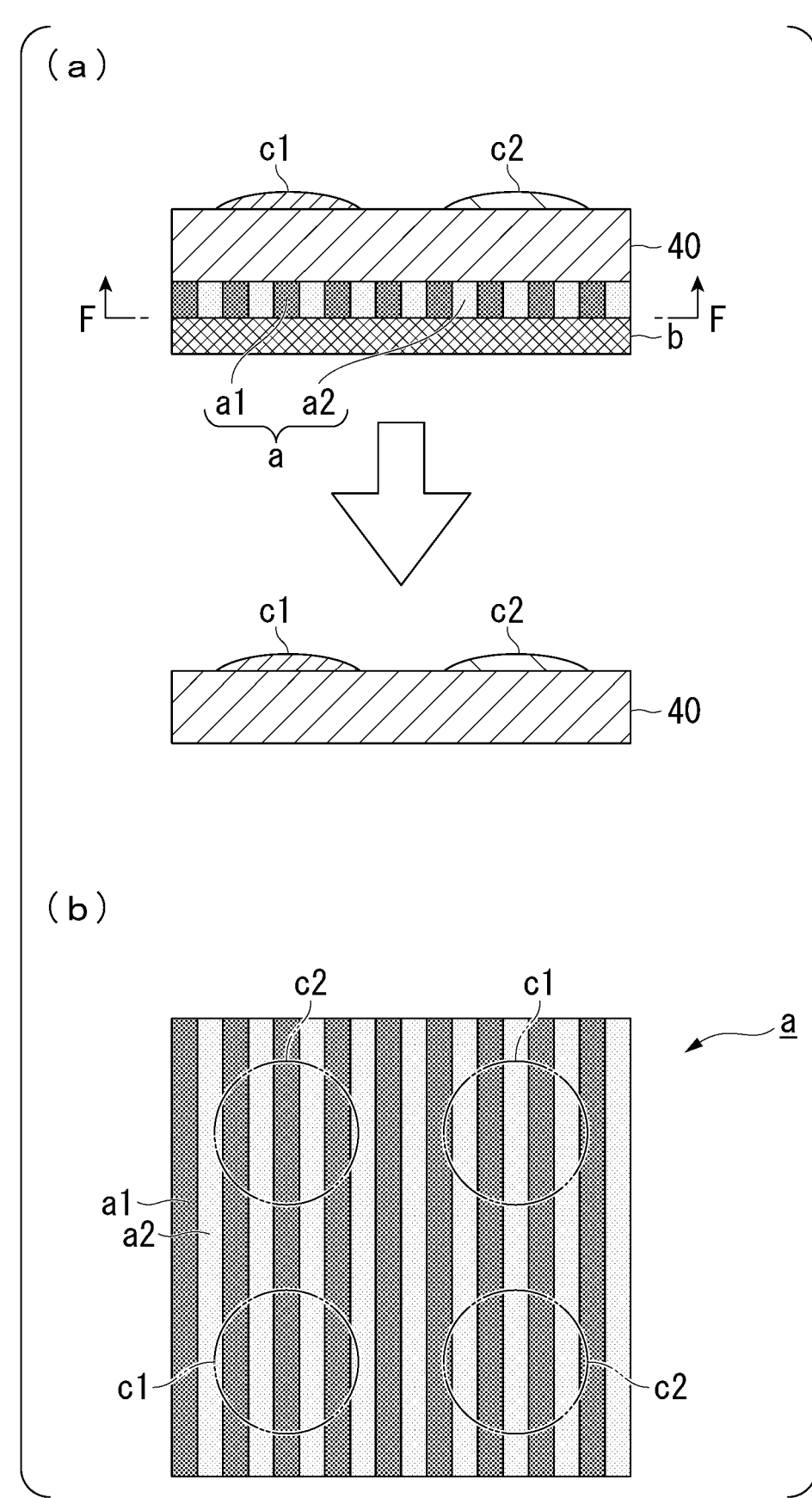
Figure 14:
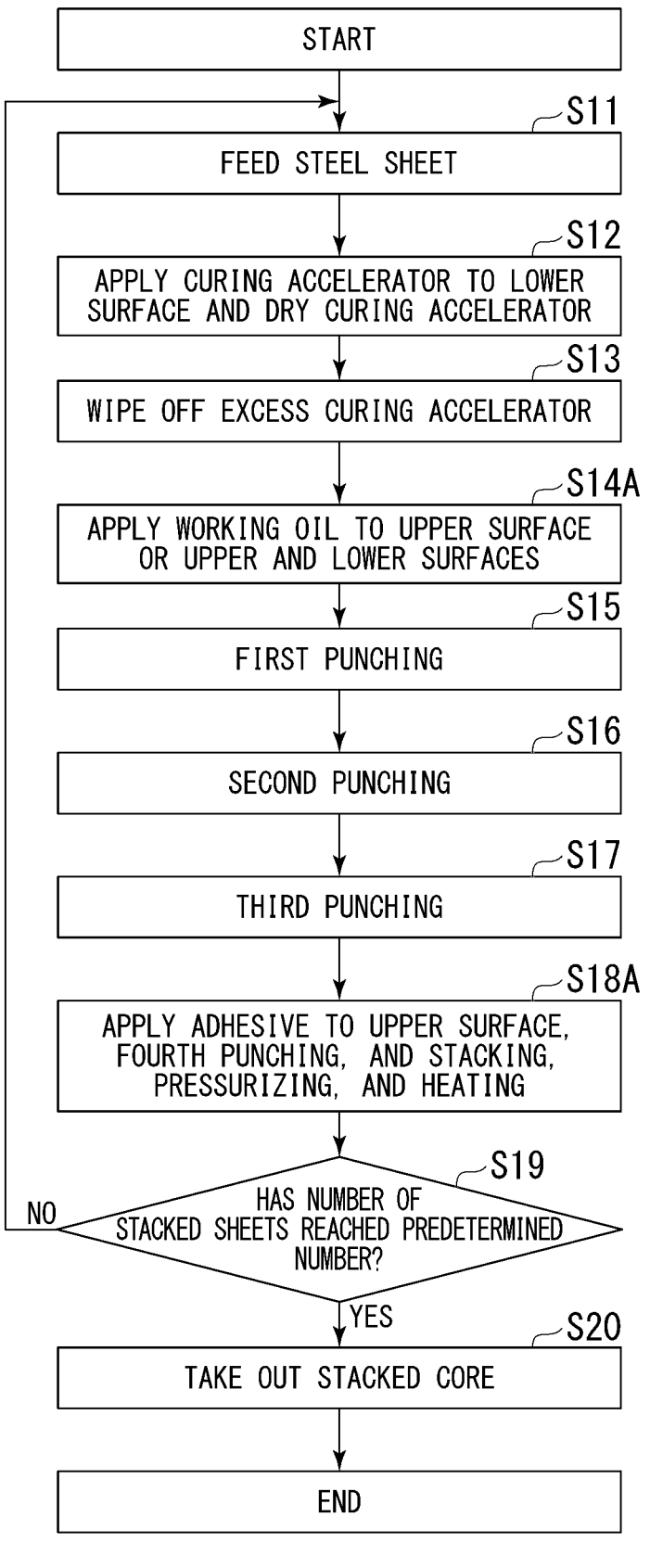
FIG. 14 is a flowchart for explaining a modification example of the bonded and stacked core manufacturing method according to the embodiment.

FIG. 10 is a flowchart for explaining the bonded and stacked core manufacturing method according to the present embodiment. FIG. 11 is a diagram for explaining a first aspect of the bonded and stacked core manufacturing method, in which FIG. 11(a) is a partial longitudinal cross-sectional view indicating a stacking and bonding step, and FIG. 11(b) is a cross-sectional view taken along line D-D of FIG. 11(a). FIG. 12 is a diagram for explaining a second aspect of the bonded and stacked core manufacturing method, in which FIG. 12(a) is a partial longitudinal cross-sectional view indicating a stacking and bonding step, and FIG. 12(b) is a cross-sectional view taken along line E-E of FIG. 12(a). FIG. 13 is a diagram for explaining a third aspect of the bonded and stacked core manufacturing method, in which FIG. 13(a) is a partial longitudinal cross-sectional view indicating a stacking and bonding step, and FIG. 13(b) is a cross-sectional view taken along line F-F of FIG. 13(a). FIG. 14 is a flowchart for explaining a modification example of the bonded and stacked core manufacturing method according to the present embodiment.

As shown in FIG. 10, the bonded and stacked core manufacturing method of the present embodiment includes a steel sheet feeding step S11, a curing accelerator applying and drying step S12, an excess wiping step S13, a working oil application step S14, a first punching step S15, a second punching step S16, a third punching step S17, a stacking and bonding step S18, a stacked sheet number confirmation step S19, and a taking-out step S20.

In the steel sheet feeding step S11, the strip-shaped steel sheet M is fed from the hoop material F toward the downstream side.

In the subsequent curing accelerator applying and drying step S12, an anaerobic adhesive curing accelerator a1 and an instantaneous adhesive curing accelerator a2 are applied to the entire lower surface of the strip-shaped steel sheet M from the nozzle 222, and dried. As a result, a curing accelerating layer a including the anaerobic adhesive curing accelerator a1 and the instantaneous adhesive curing accelerator a2 is formed. The curing accelerating layer a is solid.

Here, three patterns are exemplified in FIGS. 11 to 13 as an application pattern of the anaerobic adhesive curing accelerator a1 and the instantaneous adhesive curing accelerator a2. FIGS. 11 to 13 are diagrams corresponding to the stacking and bonding step S18, and the application pattern of the anaerobic adhesive curing accelerator a1 and the instantaneous adhesive curing accelerator a2 formed in the curing accelerator applying and drying step S12 remains fixed after the curing accelerator applying and drying step S12. Therefore, the application patterns will be described with reference to these drawings.

For example, in the application pattern of FIG. 11, the anaerobic adhesive curing accelerator a1 and the instantaneous adhesive curing accelerator a2 are arranged so as to form a checker shape (lattice shape) on the lower surface of the strip-shaped steel sheet M (electrical steel sheet 40). More specifically, a square or circular pattern formed of the anaerobic adhesive curing accelerator a1 and a square or circular pattern formed of the instantaneous adhesive curing accelerator a2 are alternately arranged on the insulating coating formed on the lower surface of the strip-shaped steel sheet M in both the longitudinal direction of the strip-shaped steel sheet M and the width direction of the strip-shaped steel sheet M. That is, the anaerobic adhesive curing accelerator a1 and the instantaneous adhesive curing accelerator a2 are arranged so as to be adjacent to each other in both the longitudinal direction of the strip-shaped steel sheet M and the width direction of the strip-shaped steel sheet M.

The anaerobic adhesive curing accelerator a1 and the instantaneous adhesive curing accelerator a2 thus applied are dried before the strip-shaped steel sheet M goes out of the seal box 223 to form a curing accelerating layer a having a constant coating thickness. The curing accelerating layer a is solid.

In addition, in the application pattern of FIG. 12, the anaerobic adhesive curing accelerator a1 and the instantaneous adhesive curing accelerator a2 are arranged on the lower surface of the strip-shaped steel sheet M (electrical steel sheet 40) in a state of being previously mixed. This mixing is obtained by taking both the anaerobic adhesive curing accelerator a1 in the first storage unit and the instantaneous adhesive curing accelerator a2 in the second storage unit into the curing accelerator mixing unit through the third pipe, and stirring and mixing the curing accelerators therein in the curing accelerating layer forming unit 220. The mixed accelerator thus obtained is supplied to both the first nozzle holes and the second nozzle holes through the fourth pipe. As a result, the mixed accelerator is ejected from both the first nozzle holes and the second nozzle holes. The ejected mixed accelerator is uniformly disposed on the insulating coating formed on the lower surface of the strip-shaped steel sheet M in both the longitudinal direction of the strip-shaped steel sheet M and the width direction of the strip-shaped steel sheet M.

The mixed accelerator thus applied is dried before the strip-shaped steel sheet M goes out of the seal box 223 to form the curing accelerating layer a having a constant coating thickness. The curing accelerating layer a is solid.

Alternatively, in the application pattern of FIG. 13, the anaerobic adhesive curing accelerator a1 and the instantaneous adhesive curing accelerator a2 are alternately arranged so as to form a stripe shape (linear shape) on the lower surface of the strip-shaped steel sheet M (electrical steel sheet 40). More specifically, the linear pattern formed of the anaerobic adhesive curing accelerator a1 and the linear pattern formed of the instantaneous adhesive curing accelerator a2 are alternately arranged on the insulating coating formed on the lower surface of the strip-shaped steel sheet M in the longitudinal direction of the strip-shaped steel sheet M. That is, when the right direction of FIG. 13(b) is the feeding direction of the strip-shaped steel sheet M, the anaerobic adhesive curing accelerator a1 and the instantaneous adhesive curing accelerator a2 are linearly formed so as to be parallel to a direction orthogonal to the feeding direction. The anaerobic adhesive curing accelerator a1 and the instantaneous adhesive curing accelerator a2 are alternately arranged adjacent to each other when viewed in the feeding direction of the strip-shaped steel sheet M.

The anaerobic adhesive curing accelerator a1 and the instantaneous adhesive curing accelerator a2 thus applied are dried before the strip-shaped steel sheet M goes out of the seal box 223 to form a curing accelerating layer a having a constant coating thickness. The curing accelerating layer a is solid.

Note that, instead of the application form described above, the anaerobic adhesive curing accelerator a1 and the instantaneous adhesive curing accelerator a2 may be formed in a linear shape parallel to the feeding direction such that the downward direction of FIG. 13(b) is the feeding direction of the strip-shaped steel sheet M.

Returning to FIG. 10, in the subsequent excess wiping step S13, the excess curing accelerator on the upper surface of the strip-shaped steel sheet M is wiped off. Therefore, the curing accelerating layer a is not formed on the upper surface of the strip-shaped steel sheet M.

In the subsequent working oil application step S14, the lower roller 131b rolls while being in contact with the lower surface of the steel sheet M in a state where an outer circumferential surface of the lower roller 131b is impregnated with the press working oil b supplied from the press working oil supply unit. As a result, the press working oil b is applied to the entire surface of only the lower surface of the strip-shaped steel sheet M. That is, the press working oil b is applied so as to coat the surface of the curing accelerating layer a.

At this time, both the anaerobic adhesive curing accelerator a1 and the instantaneous adhesive curing accelerator a2 are not naturally dried but are actively dried. As described above, since the curing accelerating layer a is formed by actively drying the curing accelerators previously, dilution of the curing accelerators due to mixing with the press working oil b applied on the surface of the curing accelerating layer a is suppressed.

On the other hand, since the upper roller 131a ascends and is separated from the upper surface of the strip-shaped steel sheet M, the press working oil b is not applied to the upper surface of the strip-shaped steel sheet M, and the insulating coating remains exposed.

In the subsequent first punching step S15, first punching of the strip-shaped steel sheet M is performed by the first-stage punching unit 241. At this time, since the press working oil b is previously applied to the lower surface of the strip-shaped steel sheet M, a defect in press working such as seizure between the male die 241a and the female die 241b does not occur.

In the subsequent second punching step S16, second punching of the strip-shaped steel sheet M is performed by the second-stage punching unit 242. Also at this time, since the press working oil b is previously applied to the lower surface of the strip-shaped steel sheet M, a defect in press working such as seizure between the male die 242a and the female die 242b does not occur.

In the subsequent third punching step S17, third punching of the strip-shaped steel sheet M is performed by the third-stage punching unit 243. Also at this time, since the press working oil b is previously applied to the lower surface of the strip-shaped steel sheet M, a defect in press working such as seizure between the male die 243a and the female die 243b does not occur.

Through the first punching step S15 to the third punching step S17 described above, the core back portion 22 and the tooth portion 23 shown in FIG. 1 are formed in the strip-shaped steel sheet M except for an outer shape portion.

In the subsequent stacking and bonding step S18, the electrical steel sheet 40 whose outer circumference has been punched from the strip-shaped steel sheet M by the outer circumferential punching male die 261 is stacked on an upper surface of another electrical steel sheet 40 that has been previously punched. At this time, the adhesive c is applied to the upper surface of the other electrical steel sheet 40. In addition, the curing accelerating layer a coated with the press working oil b is formed on the lower surface of the electrical steel sheet 40 to be stacked on the other electrical steel sheet 40.

Note that, as shown in FIG. 11(b), when the anaerobic adhesive curing accelerator a1 and the instantaneous adhesive curing accelerator a2 are arranged in a checker shape, the anaerobic adhesive c1 and the instantaneous adhesive c2 are also arranged in a checker shape so as to coincide with the relative positions of the anaerobic adhesive curing accelerator a1 and the instantaneous adhesive curing accelerator a2.

Then, the electrical steel sheets 40 are heated in a state of being stacked and pressurized. Then, the anaerobic adhesive c1 and the instantaneous adhesive c2 on the upper surface of the electrical steel sheet 40 that has been previously subjected to outer circumferential punching push away the press working oil b on the lower surface side of the electrical steel sheet 40 that has been subsequently subjected to outer circumferential punching, and are mixed with the curing accelerating layer a on the press working oil b. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

By sequentially repeating the above steps, a predetermined number of electrical steel sheets 40 are stacked and bonded, and the stator bonded and stacked core 21 is completed.

That is, in the stacked sheet number confirmation step S19, it is determined whether or not the number of stacked electrical steel sheets 40 has reached a predetermined number. As a result, if the number has not reached the predetermined number (determination: NO), the flow returns to the steel sheet feeding step S11, and the steel sheet feeding step S11 to the stacking and bonding step S18 are repeated again. On the other hand, if the number has reached the predetermined number in the stacked sheet number confirmation step S19 (determination: YES), the flow proceeds to the taking-out step S20.

In the subsequent taking-out step S20, the completed stator bonded and stacked core 21 is taken out from the outer circumferential punching female die 262, whereby all the steps of the bonded and stacked core manufacturing method are completed.

The gist of the bonded and stacked core manufacturing method using the bonded and stacked core manufacturing apparatus 200 described above will be summarized below.

The bonded and stacked core manufacturing method of the present embodiment is a method for manufacturing the stator bonded and stacked core 21 (bonded and stacked core) by performing press working on the strip-shaped steel sheet M obtained by applying the anaerobic adhesive a1 and the instantaneous adhesive a2 to one surface (lower surface) side thereof and furthermore, applying the press working oil b onto the anaerobic adhesive a1 and the instantaneous adhesive a2 to obtain a plurality of electrical steel sheets 40 (steel sheet components), and stacking and bonding the electrical steel sheets 40.

In addition, in the present embodiment, on the lower surface of the strip-shaped steel sheet M before the press working oil b is applied, the curing accelerating layer a obtained by applying and drying the anaerobic adhesive curing accelerator a1 and the instantaneous adhesive curing accelerator a2 is formed.

According to the bonded and stacked core manufacturing method using the bonded and stacked core manufacturing apparatus 100 described above, it is possible to obtain the same operation and effects as those described in the first embodiment.

In addition, as shown in FIG. 11, in the bonded and stacked core manufacturing method, the anaerobic adhesive curing accelerator a1 and the instantaneous adhesive curing accelerator a2 may be arranged in a checker shape.

Alternatively, as shown in FIG. 12, in the bonded and stacked core manufacturing method, the curing accelerating layer a may be formed by previously mixing the anaerobic adhesive curing accelerator a1 and the instantaneous adhesive curing accelerator a2, and then applying and drying the curing accelerators.

Alternatively, as shown in FIG. 13, in the bonded and stacked core manufacturing method, the anaerobic adhesive curing accelerator a1 and the instantaneous adhesive curing accelerator a2 may be arranged in a stripe shape to form the curing accelerating layer a.

In any of the above cases, the anaerobic adhesive curing accelerator a1 and the instantaneous adhesive curing accelerator a2 can be uniformly arranged along an application surface of the strip-shaped steel sheet M. Therefore, a bonding force along the application surface can be uniform.

More specifically, the bonded and stacked core manufacturing method includes the following steps.

That is, each electrical steel sheet 40 includes an electrical steel sheet 40 (first steel sheet component) 40 that has been subsequently subjected to outer circumferential punching and an electrical steel sheet 40 (second steel sheet component) 40 that has been previously subjected to outer circumferential punching. The bonded and stacked core manufacturing method includes: a first step of preparing an electrical steel sheet 40 (first steel sheet component) 40 that has been subsequently subjected to outer circumferential punching, having a lower surface (first surface), the curing accelerating layer a formed on the lower surface, and the press working oil b disposed on the curing accelerating layer a; a second step of preparing an electrical steel sheet 40 (second steel sheet component) that has been previously subjected to outer circumferential punching, having an upper surface (second surface) and the anaerobic adhesive c1 and the instantaneous adhesive c2 disposed on the upper surface; and a third step of superimposing and bonding the electrical steel sheet 40 (second steel sheet component) 40 that has been previously subjected to outer circumferential punching and the electrical steel sheet 40 (first steel sheet component) that has been subsequently subjected to outer circumferential punching such that the upper surface and the lower surface face each other.

According to the bonded and stacked core manufacturing method, it is possible to obtain the same operation and effects as those described in the first embodiment.

In the bonded and stacked core manufacturing method, the stator bonded and stacked core (bonded and stacked core) 21 may be a stator for a rotary electric machine.

According to the bonded and stacked core manufacturing method, since higher productivity can be obtained while ensuring sufficient bonding strength, it is possible to manufacture a stator for a rotary electric machine having high performance and low manufacturing cost.

The bonded and stacked core manufacturing apparatus 200 of the present embodiment is an apparatus for manufacturing the stator bonded and stacked core (bonded and stacked core) 21 including the plurality of electrical steel sheets (steel sheet components) 40 punched from the strip-shaped steel sheet M.

The bonded and stacked core manufacturing apparatus 200 of the present embodiment includes: the press working oil application unit 230 that applies the press working oil b to a lower surface (one surface) side of the strip-shaped steel sheet M; the press working unit 240 that applies press working to the strip-shaped steel sheet M; the adhesive application unit 250 that applies the anaerobic adhesive a1 and the instantaneous adhesive a2 to an upper surface of the strip-shaped steel sheet M; and the curing accelerating layer forming unit 220 that forms the curing accelerating layer a obtained by applying the anaerobic adhesive curing accelerator a1 and the instantaneous adhesive curing accelerator a2 to the lower surface of the strip-shaped steel sheet M before the press working oil b is applied, and drying the curing accelerators.

According to the bonded and stacked core manufacturing apparatus 200, it is possible to obtain the same operation and effects as those described in the first embodiment.

In the bonded and stacked core manufacturing apparatus 200, as shown in FIG. 11, the curing accelerating layer forming unit 220 may include the nozzle 222 that applies the anaerobic adhesive curing accelerator a1 and the instantaneous adhesive curing accelerator a2 in a checker shape.

Alternatively, in the bonded and stacked core manufacturing apparatus 200, as shown in FIG. 12, the curing accelerating layer forming unit 220 may include a pipe (curing accelerator supply flow path) through which the anaerobic adhesive curing accelerator a1 and the instantaneous adhesive curing accelerator a2 flow in a state where the anaerobic adhesive curing accelerator a1 and the instantaneous adhesive curing accelerator a2 are previously mixed, and the nozzle 222 leading to the pipe.

Alternatively, in the bonded and stacked core manufacturing apparatus 200, as shown in FIG. 13, the curing accelerating layer forming unit 220 may include the nozzle 222 that applies the anaerobic adhesive curing accelerator a1 and the instantaneous adhesive curing accelerator a2 in a stripe shape.

In any of the above cases, the anaerobic adhesive curing accelerator a1 and the instantaneous adhesive curing accelerator a2 can be uniformly arranged along an application surface of the strip-shaped steel sheet M by the nozzle 222. Therefore, a bonding force along the application surface can be uniform.

Note that, in the present embodiment, the case where the press working oil b is applied only to the lower surface side of the strip-shaped steel sheet M in the working oil application step S14 shown in FIG. 10 has been described, but the present invention is not limited only to this form. For example, as shown in the modification example of FIG. 14, a working oil application step S14A of applying the press working oil b only to the upper surface of the strip-shaped steel sheet M or applying the press working oil b to both the upper and lower surfaces of the strip-shaped steel sheet M may be adopted.

In the working oil application step S14A, when the press working oil b is applied only to the upper surface of the strip-shaped steel sheet M, the lower roller 131b is retracted downward from the lower surface of the strip-shaped steel sheet M to be in non-contact with the strip-shaped steel sheet M, and the upper roller 131a is rolled with respect to the upper surface of the strip-shaped steel sheet M in a state where an outer circumferential surface of the upper roller 131a is impregnated with the press working oil b. As a result, the press working oil is applied to the entire surface of only the upper surface of the strip-shaped steel sheet M. On the lower surface of the strip-shaped steel sheet M, the curing accelerating layer a including the anaerobic adhesive curing accelerator a1 and the instantaneous adhesive curing accelerator a2 is formed in a state where the curing accelerating layer a is exposed. On the other hand, on the upper surface of the strip-shaped steel sheet M, the press working oil b, and the anaerobic adhesive c1 and the instantaneous adhesive c2 applied onto the press working oil b are formed.

In this case, in the stacking and bonding step S18A in FIG. 14, the electrical steel sheet 40 whose outer circumference has been punched from the strip-shaped steel sheet M by the outer circumferential punching male die 261 is stacked on an upper surface of another electrical steel sheet 40 that has been previously subjected to outer circumferential punching, and is heated while being pressurized. At this time, the anaerobic adhesive c1 and the instantaneous adhesive c2 on the upper surface of the electrical steel sheet 40 that has been previously subjected to outer circumferential punching push away the press working oil b under the anaerobic adhesive c1 and the instantaneous adhesive c2, and are applied to the upper surface of the electrical steel sheet 40. At the same time, the anaerobic adhesive c1 and the instantaneous adhesive c2 on the upper surface of the electrical steel sheet 40 that has been previously subjected to outer circumferential punching are mixed with the curing accelerating layer a on the lower surface of the electrical steel sheet 40 that has been subsequently subjected to outer circumferential punching. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

Note that, since the other steps are the same as the steps described with reference to FIG. 10, the same references are used and redundant description is omitted.

Alternatively, for example, in the working oil application step S14A shown in the modification example of FIG. 14, the press working oil b may be applied to both the upper and lower surfaces of the strip-shaped steel sheet M.

In the working oil application step S14A in this case, the upper roller 131a and the lower roller 131b are impregnated with the press working oil b, and then the upper roller 131a and the lower roller 131b are rolled while the strip-shaped steel sheet M is sandwiched therebetween. As a result, on the lower surface of the strip-shaped steel sheet M, the curing accelerating layer a including the anaerobic adhesive curing accelerator a1 and the instantaneous adhesive curing accelerator a2, and the press working oil b coating the surface of the curing accelerating layer a are formed. On the other hand, on the upper surface of the strip-shaped steel sheet M, the press working oil b, and the anaerobic adhesive c1 and the instantaneous adhesive c2 applied onto the press working oil b are formed.

In addition, in the stacking and bonding step S18A in FIG. 14, the electrical steel sheet 40 whose outer circumference has been punched from the strip-shaped steel sheet M by the outer circumferential punching male die 261 is stacked on an upper surface of another electrical steel sheet 40 that has been previously subjected to outer circumferential punching, and is heated while being pressurized. At this time, the anaerobic adhesive c1 and the instantaneous adhesive c2 on the upper surface of the electrical steel sheet 40 that has been previously subjected to outer circumferential punching push away the press working oil b under the anaerobic adhesive c1 and the instantaneous adhesive c2, and are applied to the upper surface of the electrical steel sheet 40. At the same time, the anaerobic adhesive c1 and the instantaneous adhesive c2 on the upper surface of the electrical steel sheet 40 that has been previously subjected to outer circumferential punching push away the press working oil b on the lower surface of the electrical steel sheet 40 that has been subsequently subjected to outer circumferential punching, and are mixed with the curing accelerating layer a on the press working oil b. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

Note that, since the other steps are the same as the steps described with reference to FIG. 10, the same references are used and redundant description is omitted.

Third Embodiment

A third embodiment of the present invention will be described below with reference to FIGS. 15 to 21.

Figure 15:
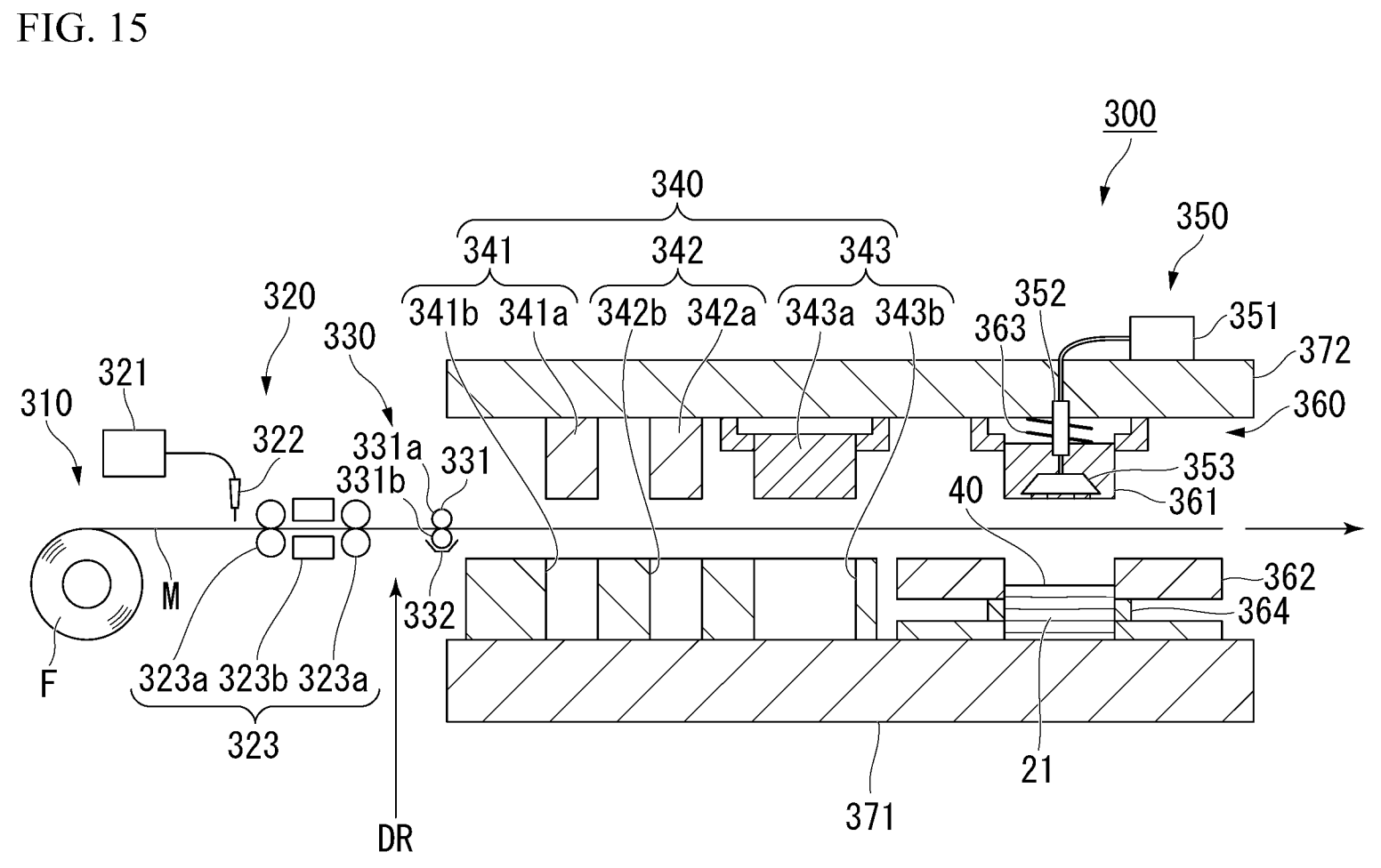

First, a bonded and stacked core manufacturing apparatus 300 according to the present embodiment will be described with reference to a side view shown in FIG. 15. As shown in FIG. 15, the bonded and stacked core manufacturing apparatus 300 includes a strip-shaped steel sheet supply unit 310, a curing accelerating layer forming unit 320, a drive unit (not shown), a press working oil application unit 330, a press working unit 340, an adhesive application unit 350, and a stacking and bonding unit 360.

A hoop material F around which the strip-shaped steel sheet M to be a material of the electrical steel sheet (steel sheet component) 40 is wound is pivotally supported by the strip-shaped steel sheet supply unit 310, and the strip-shaped steel sheet M is fed toward the right side of FIG. 15. In the following description, the right side of a drawing, which is a feeding direction of the strip-shaped steel sheet M, may be referred to as a downstream side, and the left side of the drawing, which is the direction opposite thereto, may be referred to as an upstream side. The strip-shaped steel sheet M fed toward the downstream side from the strip-shaped steel sheet supply unit 310 is a steel sheet having the above-described chemical composition, and both surfaces of the strip-shaped steel sheet M are coated with the above-described insulating coatings.

The curing accelerating layer forming unit 320 includes a curing accelerator tank 321, a nozzle 322, and a dryer 323.

The curing accelerator tank 321 includes a first storage unit that stores an anaerobic adhesive curing accelerator dissolved in a solvent, a second storage unit that stores an instantaneous adhesive curing accelerator dissolved in a solvent, and a curing accelerator mixing unit (not shown). The first storage unit and the second storage unit are partitioned from each other such that the anaerobic adhesive curing accelerator and the instantaneous adhesive curing accelerator are not mixed with each other.

The anaerobic adhesive curing accelerator is mixed with the anaerobic adhesive to accelerate instantaneous curing of the anaerobic adhesive, and the anaerobic adhesive curing accelerator exemplified in the first embodiment can be used. Similarly, the instantaneous adhesive curing accelerator is mixed with the instantaneous adhesive (2-cyanoacrylate-based adhesive) to accelerate instantaneous curing of the instantaneous adhesive, and the instantaneous adhesive curing accelerator exemplified in the first embodiment can be used. As the type of solvent, those exemplified in the first embodiment can be used.

The nozzle 322 has a plurality of first nozzle holes for applying the anaerobic adhesive curing accelerator, and a plurality of second nozzle holes for applying the instantaneous adhesive curing accelerator (not shown).

The first nozzle holes are directly connected to the first storage unit of the curing accelerator tank 321 through a first pipe.

The second nozzle holes are directly connected to the second storage unit of the curing accelerator tank 321 through a second pipe.

Furthermore, both the first nozzle holes and the second nozzle holes are also connected to the curing accelerator mixing unit through a third pipe. The curing accelerator mixing unit is connected to both the first storage unit and the second storage unit through a fourth pipe. The anaerobic adhesive curing accelerator from the first storage unit and the instantaneous adhesive curing accelerator from the second storage unit can be taken into the curing accelerator mixing unit, and stirred and mixed therein.

The first pipe, the second pipe, and the fourth pipe are connected to a switching valve (not shown). By operation of this switching valve, a flow of the anaerobic adhesive curing accelerator and a flow of the instantaneous adhesive curing accelerator can be switched to the following (1) or (2).

(1) The anaerobic adhesive curing accelerator in the first storage unit is caused to flow into the first nozzle holes through the first pipe, and at the same time, the instantaneous adhesive curing accelerator in the second storage unit is caused to flow into the second nozzle holes through the second pipe. As a result, the anaerobic adhesive curing accelerator is ejected from the first nozzle holes, and the instantaneous adhesive curing accelerator is ejected from the second nozzle holes.

(2) Both the anaerobic adhesive curing accelerator in the first storage unit and the instantaneous adhesive curing accelerator in the second storage unit are taken into the curing accelerator mixing unit through the fourth pipe, and stirred and mixed therein. The mixed accelerator in which the anaerobic adhesive curing accelerator and the instantaneous adhesive curing accelerator are mixed in this manner is caused to flow into both the first nozzle holes and the second nozzle holes through the third pipe. As a result, the mixed accelerator is ejected from both the first nozzle holes and the second nozzle holes.

Ejection ports of the first nozzle holes face an upper surface of the strip-shaped steel sheet M, and the anaerobic adhesive curing accelerator or the mixed accelerator can be applied to the upper surface in a point shape or a linear shape.

Ejection ports of the second nozzle holes also face the upper surface of the strip-shaped steel sheet M, and the instantaneous adhesive curing accelerator or the mixed accelerator can be applied to the upper surface in a point shape or a linear shape.

In the nozzle 322, the first nozzle holes and the second nozzle holes are alternately arranged, and a pitch is determined such that the curing accelerators ejected from the first nozzle holes and the second nozzle holes are not excessively mixed with each other on an application surface of the strip-shaped steel sheet M. When the anaerobic adhesive curing accelerator and the instantaneous adhesive curing accelerator are applied in a checker shape as described later with reference to FIG. 17, the pitch is preferably the same as a pitch between nozzle holes of a nozzle 353 described later such that application positions of the anaerobic adhesive curing accelerator and the instantaneous adhesive curing accelerator relatively coincide with application positions of an anaerobic adhesive and an instantaneous adhesive in a subsequent step.

By switching to either of the above (1) and (2) by the switching valve, an application form of the anaerobic adhesive curing accelerator and the instantaneous adhesive curing accelerator applied to an application surface of the strip-shaped steel sheet M is divided into a case of application in an unmixed state and a case of application in a mixed state. In the following description, three of the anaerobic adhesive curing accelerators, the instantaneous adhesive curing accelerator, and the mixed accelerator may be collectively referred to simply as "curing accelerator". On the other hand, when it is necessary to distinguish these from each other, the anaerobic adhesive curing accelerator, the instantaneous adhesive curing accelerator, and the mixed accelerator will be described separately.

The dryer 323 includes a pair of rollers 323a and dryer 323b.

The pair of rollers 323a is disposed on a downstream side of the nozzle 322. The pair of rollers 323a retains the strip-shaped steel sheet M passing therebetween such that the strip-shaped steel sheet M is kept horizontal all the time.

The dryer 323b is disposed at a position sandwiched between the pair of rollers 323a. The dryer 323b blows air to the upper surface and the lower surface of the strip-shaped steel sheet M to dry the curing accelerator. As a result, when the strip-shaped steel sheet M passes the upstream roller out of the pair of rollers 323a, the curing accelerator starts to be dried by being blown with air, and the drying is completed before the strip-shaped steel sheet M reaches the downstream roller out of the pair of rollers 323a. Therefore, on the upper surface of the strip-shaped steel sheet M after the strip-shaped steel sheet M passes through the downstream roller out of the pair of rollers 323a, a curing accelerating layer in which a solvent is dried is formed with a uniform thickness over the entire surface. The thickness of the curing accelerating layer may be 0.1 μm, for example. On the other hand, since the curing accelerator is not applied to the lower surface of the strip-shaped steel sheet M, an insulating coating remains exposed on the lower surface.

Note that a plurality of patterns can be selected for the curing accelerating layer by operation of the switching valve. These patterns will be described later with reference to FIGS. 17 to 19.

The drive unit is disposed at a position DR between the curing accelerating layer forming unit 320 and the press working oil application unit 330. The drive unit intermittently feeds the strip-shaped steel sheet M in the right direction of the drawing from the curing accelerating layer forming unit 320 toward the press working oil application unit 330. Note that, on the upper surface of the strip-shaped steel sheet M fed from the curing accelerating layer forming unit 320, a curing accelerating layer in which the curing accelerator is dried is already formed before the strip-shaped steel sheet M enters the drive unit. On the other hand, on the lower surface of the strip-shaped steel sheet M before the strip-shaped steel sheet M enters the drive unit, there is no curing accelerating layer, and an insulating coating remains exposed on the lower surface.

The press working oil application unit 330 includes an application roller 331 and an oil pan 332.

The oil pan 332 is disposed at a position below the strip-shaped steel sheet M and immediately below the application roller 331. The application roller 331 includes an upper roller 331*a* and a lower roller 331*b*.

The upper roller 331*a* is disposed immediately above the strip-shaped steel sheet M, and can be switched between a state of being in contact with the upper surface of the strip-shaped steel sheet M and a state of being separated from the upper surface of the strip-shaped steel sheet M by moving up and down. The upper roller 331*a* can apply a press working oil supplied from a press working oil supply unit (not shown) to the upper surface of the strip-shaped steel sheet M by rolling while being in contact with the upper surface of the steel sheet M in a state where an outer circumferential surface of the upper roller 331*a* is impregnated with the press working oil.

The lower roller 331*b* is disposed immediately below the strip-shaped steel sheet M, and can be switched between a state of being in contact with the lower surface of the strip-shaped steel sheet M and a state of being separated from the lower surface of the strip-shaped steel sheet M by moving up and down. The lower roller 331*b* can apply a press working oil supplied from the press working oil supply unit to the lower surface of the strip-shaped steel sheet M by rolling while being in contact with the lower surface of the steel sheet M in a state where an outer circumferential surface of the lower roller 331*b* is impregnated with the press working oil.

The oil pan 332 receives and collects an excess press working oil dripping from the upper roller 331*a* and the lower roller 331*b*, and returns the excess press working oil to the press working oil supply unit.

According to the press working oil application unit 330, by supplying a press working oil from the press working oil supply unit in a state where the upper roller 331*a* is in contact with the upper surface of the strip-shaped steel sheet M, it is possible to continuously or intermittently feed the strip-shaped steel sheet M to the downstream side while forming a layer of the press working oil over the entire upper surface of the strip-shaped steel sheet M.

Similarly, by supplying a press working oil from the press working oil supply unit in a state where the lower roller 331*b* is in contact with the lower surface of the strip-shaped steel sheet M, it is possible to continuously or intermittently feed the strip-shaped steel sheet M to the downstream side while forming a layer of the press working oil over the entire lower surface of the strip-shaped steel sheet M.

Alternatively, by sandwiching the strip-shaped steel sheet M between the upper roller 331*a* and the lower roller 331*b*, it is possible to continuously or intermittently feed the strip-shaped steel sheet M to the downstream side while forming a layer of the press working oil over both the entire upper surface and the entire lower surface of the strip-shaped steel sheet M.

As described above, by moving the respective positions of the upper roller 331*a* and the lower roller 331*b* up and down as necessary, selection can be made from three cases of applying the press working oil only to the upper surface of the strip-shaped steel sheet M, applying the press working oil only to the lower surface of the strip-shaped steel sheet M, and applying the press working oil to both the upper and lower surfaces of the strip-shaped steel sheet M.

Here, in any of the above cases, before the press working oil is applied, both the anaerobic adhesive curing accelerator and the instantaneous adhesive curing accelerator applied to the upper surface of the strip-shaped steel sheet M are not naturally dried but actively dried. As described above, since the curing accelerating layer is formed by actively drying the curing accelerators previously, dilution of the curing accelerators due to mixing with the press working oil is suppressed. Therefore, the concentration of the anaerobic adhesive curing accelerator and the concentration of the instantaneous adhesive curing accelerator on the upper surface of the strip-shaped steel sheet M after application of the press working oil are both maintained unchanged before and after application of the press working oil b. Therefore, the strip-shaped steel sheet M after passing through the press working oil application unit 330 is fed to the press working unit 340 while maintaining the concentration of the curing accelerator on the upper surface of the strip-shaped steel sheet M.

The press working unit 340 includes a first-stage punching unit 341, a second-stage punching unit 342, and a third-stage punching unit 343.

The first-stage punching unit 341 is disposed on the downstream side of the press working oil application unit 330 and includes a male die 341*a* and a female die 341*b*. The male die 341*a* and the female die 341*b* are coaxially disposed in the vertical direction, and the strip-shaped steel sheet M is inserted therebetween. Therefore, the male die 341*a* faces the upper surface of the strip-shaped steel sheet M, and the female die 341*b* faces the lower surface of the strip-shaped steel sheet M. Then, in a state where feeding of the strip-shaped steel sheet M is temporarily stopped, the male die 341*a* is moved downward to reach the inside of the female die 341*b* by a hydraulic mechanism (not shown), thereby performing first punching necessary for forming the electrical steel sheet 40 from the strip-shaped steel sheet M. At this time, since the press working oil is applied to the strip-shaped steel sheet M, punching can be performed without causing seizure or the like. After the punching, the male die 341*a* is moved upward to be pulled out from the female die 341*b*, and the strip-shaped steel sheet M is fed toward the downstream side again.

The second-stage punching unit 342 is disposed on the downstream side of the second-stage punching unit 341 and includes a male die 342*a* and a female die 342*b*. The male die 342*a* and the female die 342*b* are coaxially disposed in the vertical direction, and the strip-shaped steel sheet M after the first punching is inserted therebetween. Therefore, the male die 342*a* faces the upper surface of the strip-shaped steel sheet M, and the female die 342*b* faces the lower surface of the strip-shaped steel sheet M. Then, in a state where feeding of the strip-shaped steel sheet M is temporarily stopped again, the male die 342*a* is moved downward to reach the inside of the female die 342*b* by a hydraulic mechanism (not shown), thereby performing second punching necessary for forming the electrical steel sheet 40 from the strip-shaped steel sheet M. Also at this time, since the press working oil is applied to the strip-shaped steel sheet M, punching can be performed without causing seizure or the like. After the punching, the male die 342*a* is moved upward to be pulled out from the female die 342*b*, and the strip-shaped steel sheet M is fed toward the downstream side again.

The third-stage punching unit 343 is disposed on the downstream side of the second-stage punching unit 342 and includes a male die 343*a* and a female die 343*b*. The male die 343*a* and the female die 343*b* are coaxially disposed in the vertical direction, and the strip-shaped steel sheet M after the second punching is inserted therebetween. Therefore, the male die 343*a* faces the upper surface of the strip-shaped steel sheet M, and the female die 343*b* faces the lower surface of the strip-shaped steel sheet M. Then, in a state where feeding of the strip-shaped steel sheet M is temporarily stopped again, the male die 343*a* is moved downward to reach the inside of the female die 343*b* by a hydraulic mechanism (not shown), thereby performing third punching necessary for forming the electrical steel sheet 40 from the strip-shaped steel sheet M. Also at this time, since the press working oil is applied to the upper surface of the strip-shaped steel sheet M, punching can be performed without causing seizure or the like. After the punching, the male die 343*a* is moved upward to be pulled out from the female die 343*b*, and the strip-shaped steel sheet M is fed toward the downstream side again.

The adhesive application unit 350 is incorporated in the stacking and bonding unit 360 on the downstream side of the press working unit 340. The adhesive application unit 350 includes an air pressure feeder 351, a syringe 352, and a nozzle 353.

The syringe 352 is a container having a space for storing an anaerobic adhesive and a space for storing an instantaneous adhesive (not shown). The space for storing an anaerobic adhesive and the space for storing an instantaneous adhesive are partitioned from each other such that the anaerobic adhesive and the instantaneous adhesive are not mixed. Here, as the anaerobic adhesive, those exemplified in the first embodiment can be used. Similarly, as the instantaneous adhesive, those exemplified in the first embodiment can be used.

The syringe 352 and the air pressure feeder 351 are connected to each other through a pipe that feeds air from the air pressure feeder 351 to the syringe 352. In addition, the syringe 352 and the nozzle 353 are connected to each other through a fifth pipe that supplies an anaerobic adhesive from the syringe 352 to the nozzle 353 and a sixth pipe that supplies an instantaneous adhesive.

The nozzle 353 includes a plurality of needles (not shown) whose ejection ports face downward. These needles are disposed above the strip-shaped steel sheet M. Therefore, the ejection ports of the needles face the upper surface of the strip-shaped steel sheet M. The needles include a plurality of first needles for applying an anaerobic adhesive and a plurality of second needles for applying an instantaneous adhesive (not shown). An ejection port of the first needle and an ejection port of the second needle are alternately and uniformly arranged when the nozzle 353 is viewed from the bottom.

Figure 17:
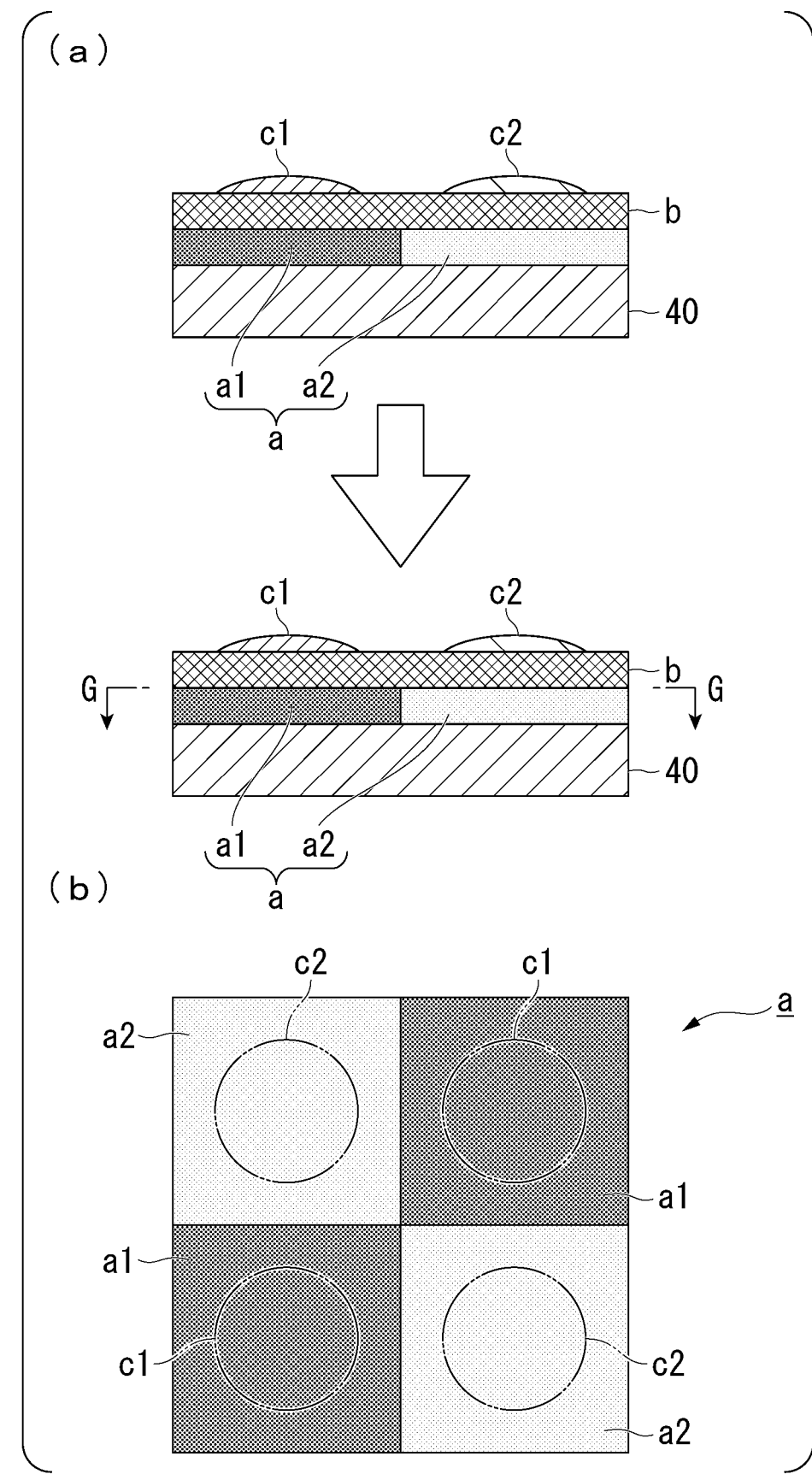

Here, as shown in FIG. 17 described later, when the anaerobic adhesive curing accelerator and the instantaneous adhesive curing accelerator are arranged in a checker shape, the position of the ejection port of each of the first needles preferably coincides with each position of the anaerobic adhesive curing accelerator applied and dried on the upper surface of the strip-shaped steel sheet M. Similarly, the position of the ejection port of each of the second needles preferably coincides with each position of the instantaneous adhesive curing accelerator applied and dried on the upper surface of the strip-shaped steel sheet M. In this case, when feeding of the strip-shaped steel sheet M is temporarily stopped above the nozzle 153 after the strip-shaped steel sheet M passes the press working unit 140, relative positions of the spots of the anaerobic adhesive curing accelerator on the upper surface of the strip-shaped steel sheet M and the ejection ports of the first needles coincide with each other, and relative positions of the spots of the instantaneous adhesive curing accelerator and the ejection ports of the second needles coincide with each other. As a result, the adhesives can be applied to the curing accelerators, respectively in a correct combination.

The first needles are directly connected to a space that stores the anaerobic adhesive through the fifth pipe. On the other hand, the second needles are directly connected to a space that stores the instantaneous adhesive through the sixth pipe.

The first needles and the second needles can apply the anaerobic adhesive and the instantaneous adhesive to the upper surface of the strip-shaped steel sheet M such that the anaerobic adhesive and the instantaneous adhesive form a checker shape (lattice shape). As a result, a square or circular pattern formed of the anaerobic adhesive and a square or circular pattern formed of the instantaneous adhesive are alternately arranged on the insulating coating formed on the upper surface of the strip-shaped steel sheet M in both a longitudinal direction of the strip-shaped steel sheet M and a width direction of the strip-shaped steel sheet M. That is, the anaerobic adhesive and the instantaneous adhesive can be arranged so as to be adjacent to each other in both the longitudinal direction of the strip-shaped steel sheet M and the width direction of the strip-shaped steel sheet M.

Furthermore, in this positioning state, when air is pressure-fed from the air pressure feeder 351 to the syringe 352, the air is uniformly supplied to both the space that stores the anaerobic adhesive and the space that stores the instantaneous adhesive. Then, the anaerobic adhesive is supplied to the first needles through the fifth pipe, and the instantaneous adhesive is supplied to the second needles through the sixth pipe. Then, the anaerobic adhesive is ejected from the ejection ports of the first needles and applied to the upper surface of the strip-shaped steel sheet M. Similarly, the instantaneous adhesive is ejected from the ejection ports of the second needles and applied to the upper surface of the strip-shaped steel sheet M.

The stacking and bonding unit 360 includes an outer circumferential punching male die 361, an outer circumferential punching female die 362, a spring 363, and a heater 364.

The outer circumferential punching male die 361 is a cylindrical die having a circular bottom surface, and a lower end of the spring 363 is connected to an upper end of the outer circumferential punching male die 361. The outer circumferential punching male die 361 can move up and down together with the spring 363 in a state of being supported by the spring 363. The outer circumferential punching male die 361 has an outer diameter dimension substantially the same as the outer diameter dimension of the stator bonded and stacked core 21.

The outer circumferential punching female die 362 is a die having a cylindrical internal space, and has an inner diameter dimension substantially the same as the outer diameter dimension of the stator bonded and stacked core 21.

The heater 364 is integrally incorporated in the outer circumferential punching female die 362. The heater 364 heats the electrical steel sheets (steel sheet components) 40 stacked in the outer circumferential punching female die 362 from a circumference of the electrical steel sheets 40. When a thermosetting type is used as the adhesive, the adhesive is cured by receiving heat from the heater 364. On the other hand, when a room-temperature curing type is used as the adhesive, the adhesive is cured at room temperature without requiring heating.

According to the stacking and bonding unit 360, in a state where feeding of the strip-shaped steel sheet M is temporarily stopped, the outer circumferential punching male die 361 is lowered to sandwich the strip-shaped steel sheet M between the outer circumferential punching male die 361 and the outer circumferential punching female die 362, and furthermore, the outer circumferential punching male die 361 is pressed into the outer circumferential punching female die 362, whereby the electrical steel sheet 40 whose outer circumference has been punched from the strip-shaped steel sheet M is obtained.

The punched electrical steel sheet 40 is stacked on an upper surface of another electrical steel sheet 40 that has been previously punched, and stacked and bonded in the outer circumferential punching female die 362, and furthermore, a pressurizing force from the outer circumferential punching male die 361 and heating from the heater 364 are applied to the punched electrical steel sheet 40. At this time, the pressurizing force applied from the outer circumferential punching male die 361 to the electrical steel sheet 40 is maintained constant all the time by a biasing force of the spring 363.

As described above, the electrical steel sheet 40 punched this time is bonded and fixed to the upper surface of the electrical steel sheet 40 punched last time. By repeating such steps of outer circumferential punching, pressurizing, and heating as many times as the number of stacked electrical steel sheets 40, the stator bonded and stacked core 21 is formed in the outer circumferential punching female die 362.

As shown in FIG. 15, the female die 341*b*, the female die 342*b*, the female die 343*b*, the outer circumferential punching female die 362, and the heater 364 are fixed onto a common fixing base 371. Therefore, relative positions of the female die 341*b*, the female die 342*b*, the female die 343*b*, the outer circumferential punching female die 362, and the heater 364 in the horizontal direction and the up-down direction are fixed.

Similarly, the male die 341*a*, the male die 342*a*, the male die 343*a*, the nozzle 353, and the outer circumferential punching male die 361 are also fixed to the lower surface of the common movable base 372. Therefore, relative positions of the male die 341*a*, the male die 342*a*, the nozzle 353, and the outer circumferential punching male die 361 in the horizontal direction and the up-down direction are also fixed.

The drive unit feeds the strip-shaped steel sheet M toward the downstream side, and lowers the movable base 372 when the drive unit temporarily stops the strip-shaped steel sheet M, whereby outer circumferential punching, stacking, and bonding of the electrical steel sheet 40, application of an adhesive to the electrical steel sheet 40 for the next step, the third punching to the position of the strip-shaped steel sheet M to be subjected to outer circumferential punching next, the second punching to the position of the strip-shaped steel sheet M to be subjected to the third punching next, and the first punching to the position of the strip-shaped steel sheet M to be subjected to the second punching next are simultaneously performed.

Subsequently, the movable base 372 is raised and retracted above the strip-shaped steel sheet M, and then the strip-shaped steel sheet M is fed again toward the downstream side by a predetermined distance by the drive unit and temporarily stopped again. In this state, the movable base 372 is lowered again, and working at each position is continuously performed. As described above, the step of moving the movable base 372 up and down during a temporary stop while intermittently feeding the strip-shaped steel sheet M by the drive unit is repeated, whereby the stator bonded and stacked core 21 is manufactured.

A bonded and stacked core manufacturing method using the bonded and stacked core manufacturing apparatus 300 having the above-described constitution will be described below with reference to FIGS. 16 to 20.

Figure 16:
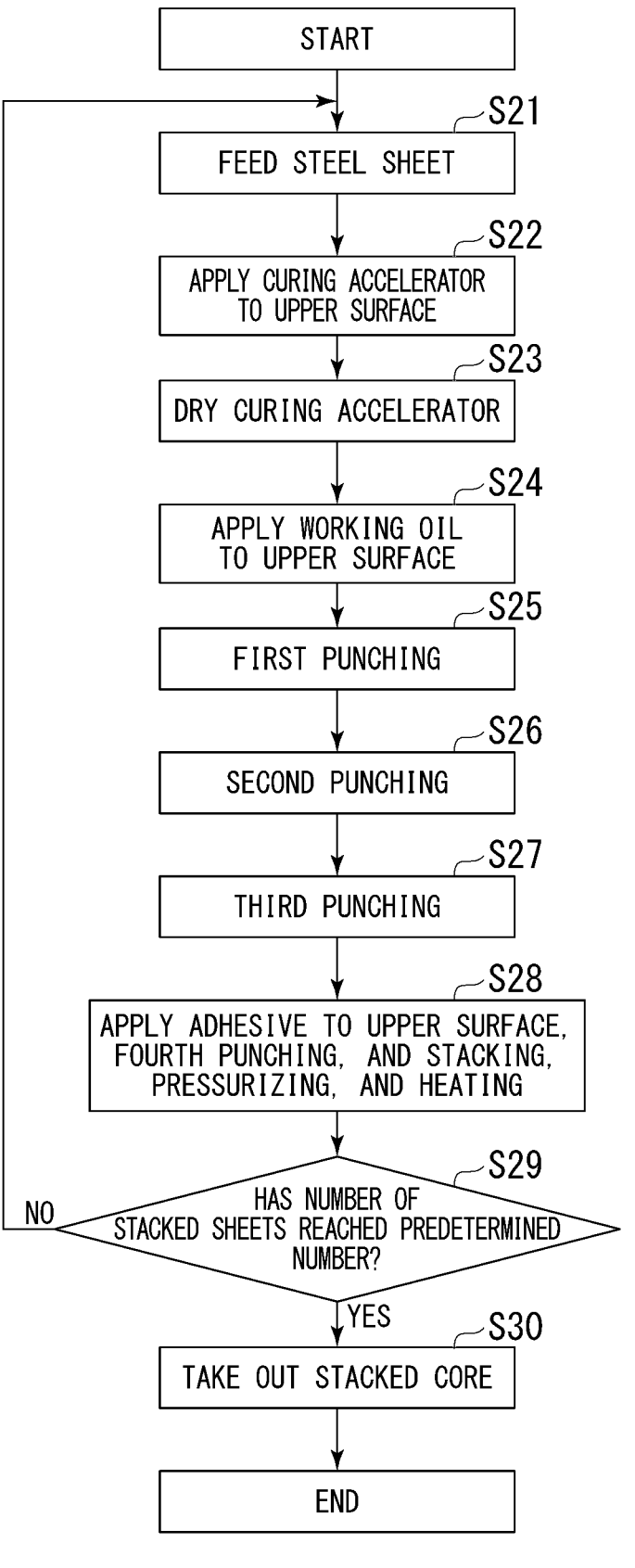
FIG. 16 is a flowchart for explaining a bonded and stacked core manufacturing method according to the embodiment.
Figure 18:
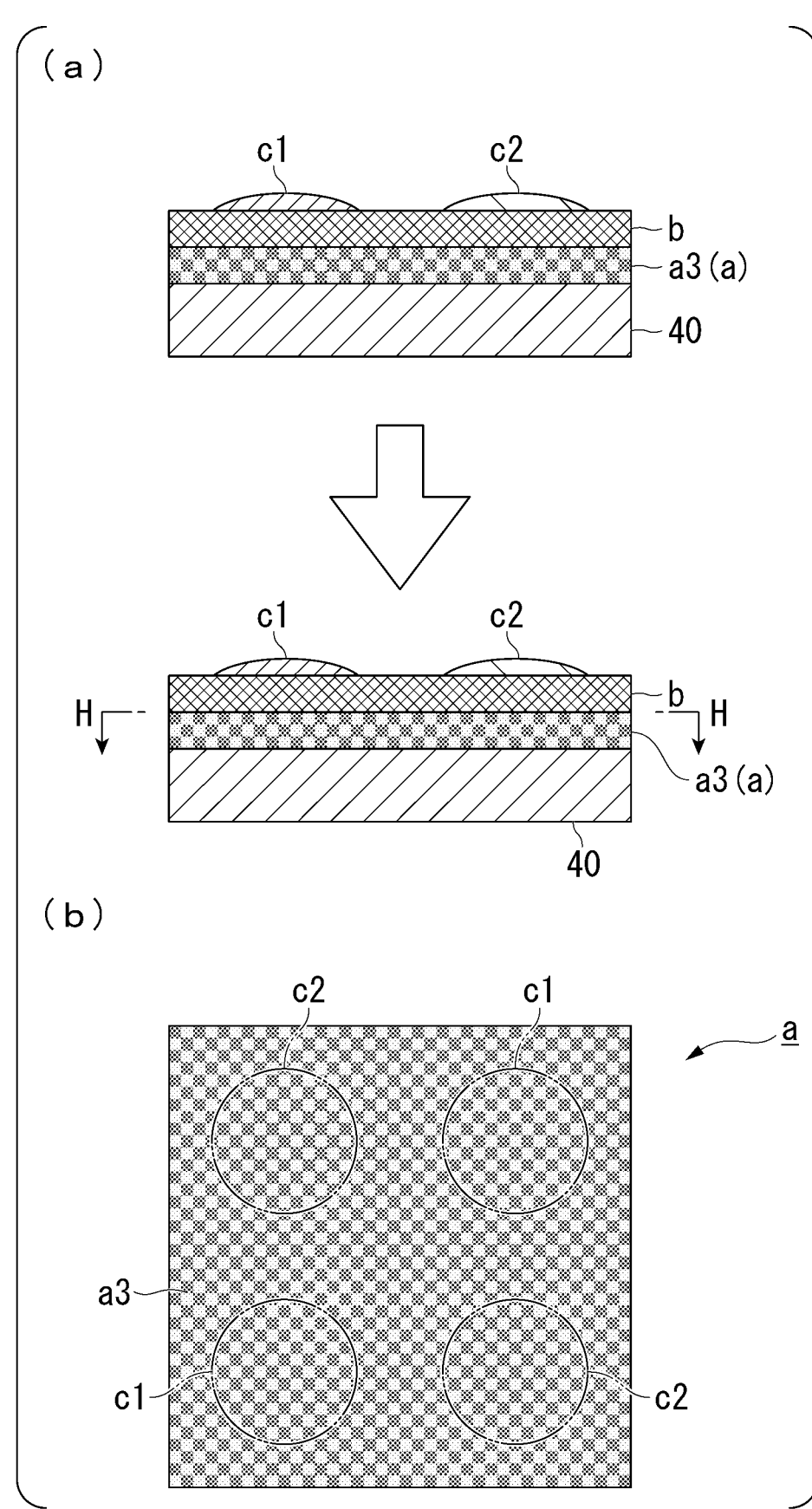
Figure 19:
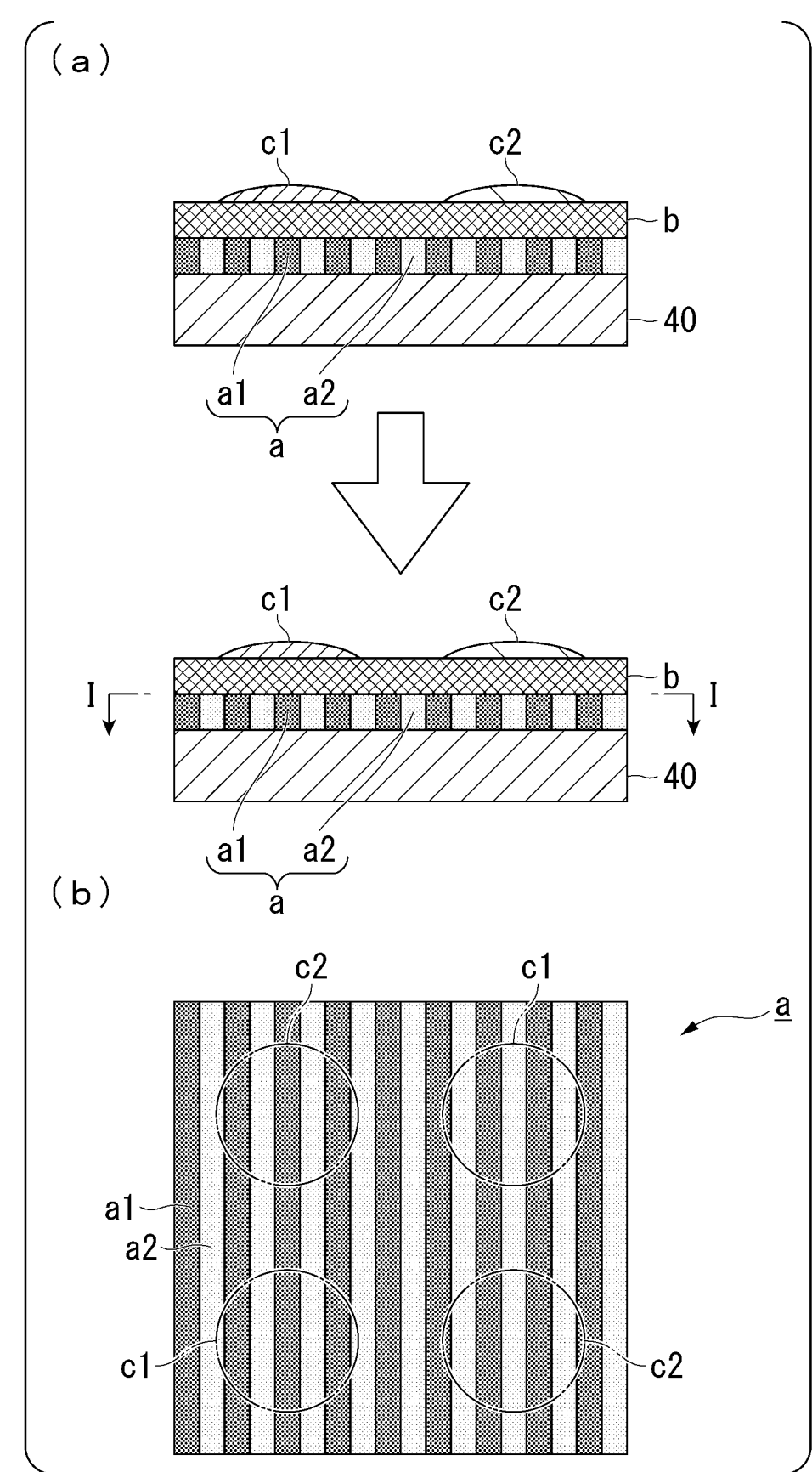
Figure 20:
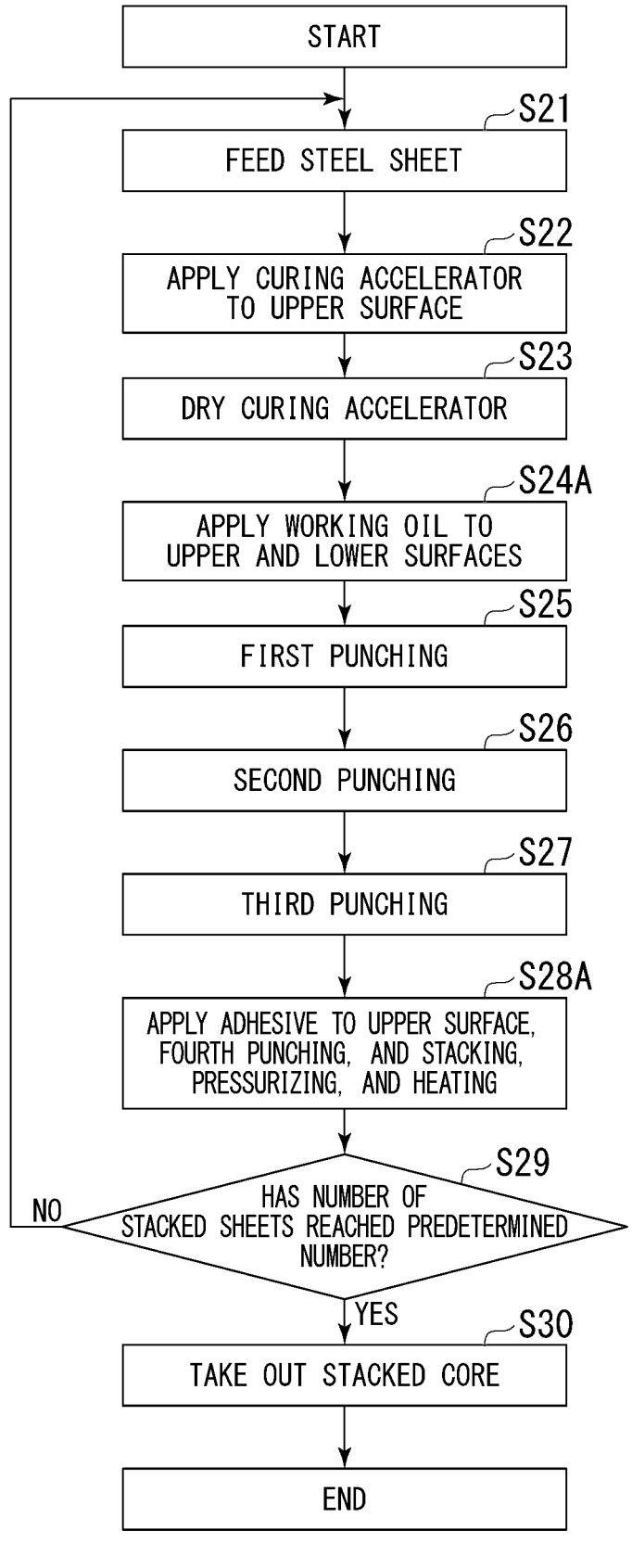
FIG. 20 is a flowchart for explaining a modification example of the bonded and stacked core manufacturing method according to the embodiment.

FIG. 16 is a flowchart for explaining the bonded and stacked core manufacturing method according to the present embodiment. FIG. 17 is a diagram for explaining a first aspect of the bonded and stacked core manufacturing method, in which FIG. 17(*a*) is a partial longitudinal cross-sectional view indicating a stacking and bonding step, and FIG. 17(*b*) is a cross-sectional view taken along line G-G of FIG. 17(*a*). FIG. 18 is a diagram for explaining a second aspect of the bonded and stacked core manufacturing method, in which FIG. 18(*a*) is a partial longitudinal cross-sectional view indicating a stacking and bonding step, and FIG. 18(*b*) is a cross-sectional view taken along line H-H of FIG. 18(*a*). FIG. 19 is a diagram for explaining a third aspect of the bonded and stacked core manufacturing method, in which FIG. 19(*a*) is a partial longitudinal cross-sectional view indicating a stacking and bonding step, and FIG. 19(*b*) is a cross-sectional view taken along line I-I of FIG. 19(*a*). FIG. 20 is a flowchart for explaining a modification example of the bonded and stacked core manufacturing method according to the present embodiment.

As shown in FIG. 16, the bonded and stacked core manufacturing method of the present embodiment includes a steel sheet feeding step S21, a curing accelerator application step S22, a curing accelerator drying step S23, a working oil application step S24, a first punching step S25, a second punching step S26, a third punching step S27, a stacking and bonding step S28, a stacked sheet number confirmation step S29, and a taking-out step S30.

In the steel sheet feeding step S21, the strip-shaped steel sheet M is fed from the hoop material F toward the downstream side.

In the subsequent curing accelerator application step S22, an anaerobic adhesive curing accelerator a1 and an instantaneous adhesive curing accelerator a2 are applied to the entire upper surface of the strip-shaped steel sheet M from the nozzle 322. The anaerobic adhesive curing accelerator a1 and the instantaneous adhesive curing accelerator a2 at this time point are both in a liquid form.

Here, three patterns are exemplified in FIGS. 17 to 19 as an application pattern of the anaerobic adhesive curing accelerator a1 and the instantaneous adhesive curing accelerator a2. FIGS. 17 to 19 are diagrams corresponding to the stacking and bonding step S28, and the application pattern of the anaerobic adhesive curing accelerator a1 and the instantaneous adhesive curing accelerator a2 formed in the curing accelerator application step S22 remains fixed after the curing accelerator drying step S23. Therefore, the application patterns will be described with reference to these drawings.

For example, in the application pattern of FIG. 17, the anaerobic adhesive curing accelerator a1 and the instantaneous adhesive curing accelerator a2 are arranged so as to form a checker shape (lattice shape) on the upper surface of the strip-shaped steel sheet M (electrical steel sheet 40). More specifically, a square or circular pattern formed of the anaerobic adhesive curing accelerator a1 and a square or circular pattern formed of the instantaneous adhesive curing accelerator a2 are alternately arranged on the insulating coating formed on the upper surface of the strip-shaped steel sheet M in both the longitudinal direction of the strip-shaped steel sheet M and the width direction of the strip-shaped steel sheet M. That is, the anaerobic adhesive curing accelerator a1 and the instantaneous adhesive curing accelerator a2 are arranged so as to be adjacent to each other in both the longitudinal direction of the strip-shaped steel sheet M and the width direction of the strip-shaped steel sheet M.

The anaerobic adhesive curing accelerator a1 and the instantaneous adhesive curing accelerator a2 thus applied are dried in the subsequent curing accelerator drying step S23 to form a curing accelerating layer a having a constant coating thickness.

In addition, in the application pattern of FIG. 18, the anaerobic adhesive curing accelerator a1 and the instantaneous adhesive curing accelerator a2 are arranged on the upper surface of the strip-shaped steel sheet M (electrical steel sheet 40) in a state of being previously mixed. This mixing is obtained by taking both the anaerobic adhesive curing accelerator a1 in the first storage unit and the instantaneous adhesive curing accelerator a2 in the second storage unit into the curing accelerator mixing unit through the third pipe, and stirring and mixing the curing accelerators therein in the curing accelerating layer forming unit 320. The mixed accelerator thus obtained is supplied to both the first nozzle holes and the second nozzle holes through the fourth pipe. As a result, the mixed accelerator is ejected from both the first nozzle holes and the second nozzle holes. The ejected mixed accelerator is uniformly disposed on the insulating coating formed on the upper surface of the strip-shaped steel sheet M in both the longitudinal direction of the strip-shaped steel sheet M and the width direction of the strip-shaped steel sheet M.

The mixed accelerator thus applied is dried in the subsequent curing accelerator drying step S23 to form the curing accelerating layer a having a constant coating thickness.

Alternatively, in the application pattern of FIG. 19, the anaerobic adhesive curing accelerator a1 and the instantaneous adhesive curing accelerator a2 are alternately arranged so as to form a stripe shape (linear shape) on the upper surface of the strip-shaped steel sheet M (electrical steel sheet 40). More specifically, the linear pattern formed of the anaerobic adhesive curing accelerator a1 and the linear pattern formed of the instantaneous adhesive curing accelerator a2 are alternately arranged on the insulating coating formed on the upper surface of the strip-shaped steel sheet M in the longitudinal direction of the strip-shaped steel sheet M. That is, when the right direction of FIG. 19(b) is the feeding direction of the strip-shaped steel sheet M, the anaerobic adhesive curing accelerator a1 and the instantaneous adhesive curing accelerator a2 are linearly formed so as to be parallel to a direction orthogonal to the feeding direction. The anaerobic adhesive curing accelerator a1 and the instantaneous adhesive curing accelerator a2 are alternately arranged adjacent to each other when viewed in the feeding direction of the strip-shaped steel sheet M.

The anaerobic adhesive curing accelerator a1 and the instantaneous adhesive curing accelerator a2 thus applied are dried in the subsequent curing accelerator drying step S3 to form a curing accelerating layer a having a constant coating thickness.

Note that, instead of the application form described above, the anaerobic adhesive curing accelerator a1 and the instantaneous adhesive curing accelerator a2 may be formed in a linear shape parallel to the feeding direction such that the downward direction of FIG. 19(b) is the feeding direction of the strip-shaped steel sheet M.

Returning to FIG. 16, in the subsequent curing accelerator drying step S23, air from the dryer 323b is blown onto the upper and lower surfaces of the strip-shaped steel sheet M, and the liquid anaerobic adhesive curing accelerator a1 and the liquid instantaneous adhesive curing accelerator a2 are dried to form the curing accelerating layer a. The curing accelerating layer a is solid.

In the subsequent working oil application step S24, the upper roller 331a rolls while being in contact with the upper surface of the steel sheet M in a state where an outer circumferential surface of the upper roller 331a is impregnated with the press working oil b supplied from the press working oil supply unit. As a result, the press working oil is applied to the entire surface of only the upper surface of the strip-shaped steel sheet M. That is, the press working oil b is applied so as to coat the upper surface of the curing accelerating layer a.

At this time, both the anaerobic adhesive curing accelerator a1 and the instantaneous adhesive curing accelerator a2 are not naturally dried but are actively dried. As described above, since the curing accelerating layer a is formed by actively drying the curing accelerators previously, dilution of the curing accelerators due to mixing with the press working oil b applied on the upper surface of the curing accelerating layer a is suppressed.

On the other hand, since the lower roller 331b descends and is separated from the lower surface of the strip-shaped steel sheet M, the press working oil b is not applied to the lower surface of the strip-shaped steel sheet M, and the insulating coating remains exposed.

In the subsequent first punching step S25, first punching of the strip-shaped steel sheet M is performed by the first-stage punching unit 341. At this time, since the press working oil b is previously applied to the upper surface of the strip-shaped steel sheet M, a defect in press working such as seizure between the male die 341a and the female die 341b does not occur.

In the subsequent second punching step S26, second punching of the strip-shaped steel sheet M is performed by the second-stage punching unit 342. Also at this time, since the press working oil b is previously applied to the upper surface of the strip-shaped steel sheet M, a defect in press working such as seizure between the male die 342a and the female die 342b does not occur.

In the subsequent third punching step S27, third punching of the strip-shaped steel sheet M is performed by the third-stage punching unit 343. Also at this time, since the press working oil b is previously applied to the upper surface of the strip-shaped steel sheet M, a defect in press working such as seizure between the male die 343a and the female die 343b does not occur.

Through the first punching step S25 to the third punching step S27 described above, the core back portion 22 and the tooth portion 23 shown in FIG. 1 are formed in the strip-shaped steel sheet M except for an outer shape portion.

In the subsequent stacking and bonding step S28, the electrical steel sheet 40 whose outer circumference has been punched from the strip-shaped steel sheet M by the outer circumferential punching male die 361 is stacked on an upper surface of another electrical steel sheet 40 that has been previously punched. At this time, the curing accelerating layer a, the press working oil b coating the upper surface of the curing accelerating layer a, and the anaerobic adhesive c1 and the instantaneous adhesive c2 applied onto the press working oil b are disposed on the upper surface of the other electrical steel sheet 40. On the other hand, the insulating coating remains exposed on the lower surface of the electrical steel sheet 40 to be stacked on the other electrical steel sheet 40.

Note that, as shown in FIG. 17(b), when the anaerobic adhesive curing accelerator a1 and the instantaneous adhesive curing accelerator a2 are arranged in a checker shape, the anaerobic adhesive c1 and the instantaneous adhesive c2 are also arranged in a checker shape so as to coincide with the relative positions of the anaerobic adhesive curing accelerator a1 and the instantaneous adhesive curing accelerator a2.

Then, the electrical steel sheets 40 are heated in a state of being stacked and pressurized. Then, the anaerobic adhesive c1 and the instantaneous adhesive c2 on the upper surface of the electrical steel sheet 40 that has been previously subjected to outer circumferential punching are applied to the lower surface of the electrical steel sheet 40 that has been subsequently subjected to outer circumferential punching. Furthermore, the anaerobic adhesive c1 and the instantaneous adhesive c2 push away the press working oil b under the anaerobic adhesive c1 and the instantaneous adhesive c2, and are mixed with the curing accelerating layer a under the press working oil b. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

By sequentially repeating the above steps, a predetermined number of electrical steel sheets 40 are stacked and bonded, and the stator bonded and stacked core 21 is completed.

That is, in the stacked sheet number confirmation step S29, it is determined whether or not the number of stacked electrical steel sheets 40 has reached a predetermined number. As a result, if the number has not reached the predetermined number (determination: NO), the flow returns to the steel sheet feeding step S21, and the steel sheet feeding step S21 to the stacking and bonding step S28 are repeated again. On the other hand, if the number has reached the predetermined number in the stacked sheet number confirmation step S29 (determination: YES), the flow proceeds to the taking-out step S30.

In the subsequent taking-out step S30, the completed stator bonded and stacked core 21 is taken out from the outer circumferential punching female die 362, whereby all the steps of the bonded and stacked core manufacturing method are completed.

The gist of the bonded and stacked core manufacturing method using the bonded and stacked core manufacturing apparatus 300 described above will be summarized below.

The bonded and stacked core manufacturing method of the present embodiment is a method for manufacturing the stator bonded and stacked core 21 (bonded and stacked core) by performing press working on the strip-shaped steel sheet M obtained by applying the anaerobic adhesive a1 and the instantaneous adhesive a2 to one surface (upper surface) side thereof and furthermore, applying the press working oil b onto the anaerobic adhesive a1 and the instantaneous adhesive a2 to obtain a plurality of electrical steel sheets 40 (steel sheet components), and stacking and bonding the electrical steel sheets 40.

In the present embodiment, on the upper surface of the strip-shaped steel sheet M before the press working oil b is applied, the curing accelerating layer an obtained by applying and drying the anaerobic adhesive curing accelerator a1 and the instantaneous adhesive curing accelerator a2, the press working oil b applied on the curing accelerating layer a, and the anaerobic adhesive c1 and the instantaneous adhesive c2 applied on the press working oil b are disposed.

According to the bonded and stacked core manufacturing method using the bonded and stacked core manufacturing apparatus 300 described above, it is possible to obtain the same operation and effects as those described in the first embodiment.

In addition, as shown in FIG. 17, in the bonded and stacked core manufacturing method, the anaerobic adhesive curing accelerator a1 and the instantaneous adhesive curing accelerator a2 may be arranged in a checker shape.

Alternatively, as shown in FIG. 18, in the bonded and stacked core manufacturing method, the curing accelerating layer a may be formed by applying and drying the anaerobic adhesive curing accelerator a1 and the instantaneous adhesive curing accelerator a2 in a state where the curing accelerators are previously mixed.

Alternatively, as shown in FIG. 19, in the bonded and stacked core manufacturing method, the anaerobic adhesive curing accelerator a1 and the instantaneous adhesive curing accelerator a2 may be arranged in a stripe shape to form the curing accelerating layer a.

In any of the above cases, the anaerobic adhesive curing accelerator a1 and the instantaneous adhesive curing accelerator a2 can be uniformly arranged along an application surface of the strip-shaped steel sheet M. Therefore, a bonding force along the application surface can be uniform.

More specifically, the bonded and stacked core manufacturing method includes the following steps.

That is, each electrical steel sheet 40 includes an electrical steel sheet 40 (second steel sheet component) 40 that has been previously subjected to outer circumferential punching and an electrical steel sheet 40 (first steel sheet component) 40 that has been subsequently subjected to outer circumferential punching. The bonded and stacked core manufacturing method includes: a fourth step of preparing an electrical steel sheet 40 (second steel sheet component) 40 that has been previously subjected to outer circumferential punching, having an upper surface (first surface), the curing accelerating layer a formed on the upper surface, the press working oil b disposed on the curing accelerating layer a, and the anaerobic adhesive c1 and the instantaneous adhesive c2 disposed on the press working oil b; a fifth step of preparing an electrical steel sheet 40 (first steel sheet component) that has been subsequently subjected to outer circumferential punching, having a lower surface (second surface); and a sixth step of superimposing and bonding the electrical steel sheet 40 (second steel sheet component) 40 that has been previously subjected to outer circumferential punching and the electrical steel sheet 40 (first steel sheet component) that has been subsequently subjected to outer circumferential punching such that the upper surface and the lower surface face each other.

According to the bonded and stacked core manufacturing method, it is possible to obtain the same operation and effects as those described in the first embodiment.

In the bonded and stacked core manufacturing method, the stator bonded and stacked core (bonded and stacked core) 21 may be a stator for a rotary electric machine. According to the bonded and stacked core manufacturing method, since higher productivity can be obtained while ensuring sufficient bonding strength, it is possible to manufacture a stator for a rotary electric machine having high performance and low manufacturing cost.

The bonded and stacked core manufacturing apparatus 300 of the present embodiment is an apparatus for manufacturing the stator bonded and stacked core (bonded and stacked core) 21 including the plurality of electrical steel sheets (steel sheet components) 40 punched from the strip-shaped steel sheet M.

The bonded and stacked core manufacturing apparatus 300 of the present embodiment includes: the press working oil application unit 330 that applies the press working oil b to an upper surface (one surface) side of the strip-shaped steel sheet M; the press working unit 340 that applies press working to the strip-shaped steel sheet M; the adhesive application unit 350 that applies the anaerobic adhesive a1 and the instantaneous adhesive a2 to an upper surface of the strip-shaped steel sheet M; and the curing accelerating layer forming unit 320 that forms the curing accelerating layer a obtained by applying the anaerobic adhesive curing accelerator a1 and the instantaneous adhesive curing accelerator a2 to the upper surface of the strip-shaped steel sheet M before the press working oil b is applied, and drying the curing accelerators.

According to the bonded and stacked core manufacturing apparatus 300, it is possible to obtain the same operation and effects as those described in the first embodiment.

In the bonded and stacked core manufacturing apparatus 300, as shown in FIG. 17, the curing accelerating layer forming unit 320 may include the nozzle 322 that applies the anaerobic adhesive curing accelerator a1 and the instantaneous adhesive curing accelerator a2 in a checker shape.

Alternatively, in the bonded and stacked core manufacturing apparatus 300, as shown in FIG. 18, the curing accelerating layer forming unit 320 may include a pipe (curing accelerator supply flow path) through which the anaerobic adhesive curing accelerator a1 and the instantaneous adhesive curing accelerator a2 flow in a state where the anaerobic adhesive curing accelerator a1 and the instantaneous adhesive curing accelerator a2 are previously mixed, and the nozzle 322 leading to the pipe.

Alternatively, in the bonded and stacked core manufacturing apparatus 300, as shown in FIG. 19, the curing accelerating layer forming unit 320 may include the nozzle 322 that applies the anaerobic adhesive curing accelerator a1 and the instantaneous adhesive curing accelerator a2 in a stripe shape.

In any of the above cases, the anaerobic adhesive curing accelerator a1 and the instantaneous adhesive curing accelerator a2 can be uniformly arranged along an application surface of the strip-shaped steel sheet M by the nozzle 322. Therefore, a bonding force along the application surface can be uniform.

Note that, in the present embodiment, the case where the press working oil b is applied only to the upper surface of the strip-shaped steel sheet M in the working oil application step S24 shown in FIG. 16 has been described, but the present invention is not limited only to this form. For example, as shown in the modification example of FIG. 20, a working oil application step S24A in which the press working oil b is applied to both the upper and lower surfaces of the strip-shaped steel sheet M may be adopted.

In this working oil application step S24A, the press working oil b is applied to both the upper and lower surfaces of the strip-shaped steel sheet M. That is, the upper roller 331*a* and the lower roller 331*b* are impregnated with the press working oil b, and then the upper roller 331*a* and the lower roller 331*b* are rolled while the strip-shaped steel sheet M is sandwiched therebetween. As a result, on the upper surface of the strip-shaped steel sheet M, the curing accelerating layer a including the anaerobic adhesive curing accelerator a1 and the instantaneous adhesive curing accelerator a2, the press working oil b coating the surface of the curing accelerating layer a, and the anaerobic adhesive c1 and the instantaneous adhesive c2 applied to the surface of the press working oil b are formed. On the other hand, only the press working oil b is formed on the lower surface of the strip-shaped steel sheet M.

In addition, in the stacking and bonding step S28A in FIG. 20, the electrical steel sheet 40 whose outer circumference has been punched from the strip-shaped steel sheet M by the outer circumferential punching male die 361 is stacked on an upper surface of another electrical steel sheet 40 that has been previously subjected to outer circumferential punching, and is heated while being pressurized. At this time, the anaerobic adhesive c1 and the instantaneous adhesive c2 on the upper surface side of the electrical steel sheet 40 that has been previously subjected to outer circumferential punching push away the press working oil b applied to the lower surface of the steel sheet component 40 that has been subsequently subjected to outer circumferential punching, and are applied to the lower surface. At the same time, the anaerobic adhesive c1 and the instantaneous adhesive c2 on the upper surface of the electrical steel sheet 40 that has been previously subjected to outer circumferential punching push away the press working oil b under the anaerobic adhesive c1 and the instantaneous adhesive c2, and are mixed with the curing accelerating layer a under the press working oil b. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

Note that, since the other steps are the same as the steps described with reference to FIG. 16, the same references are used and redundant description is omitted.

Fourth Embodiment

A fourth embodiment of the present invention will be described below with reference to FIGS. 21 to 26.

Figure 21:
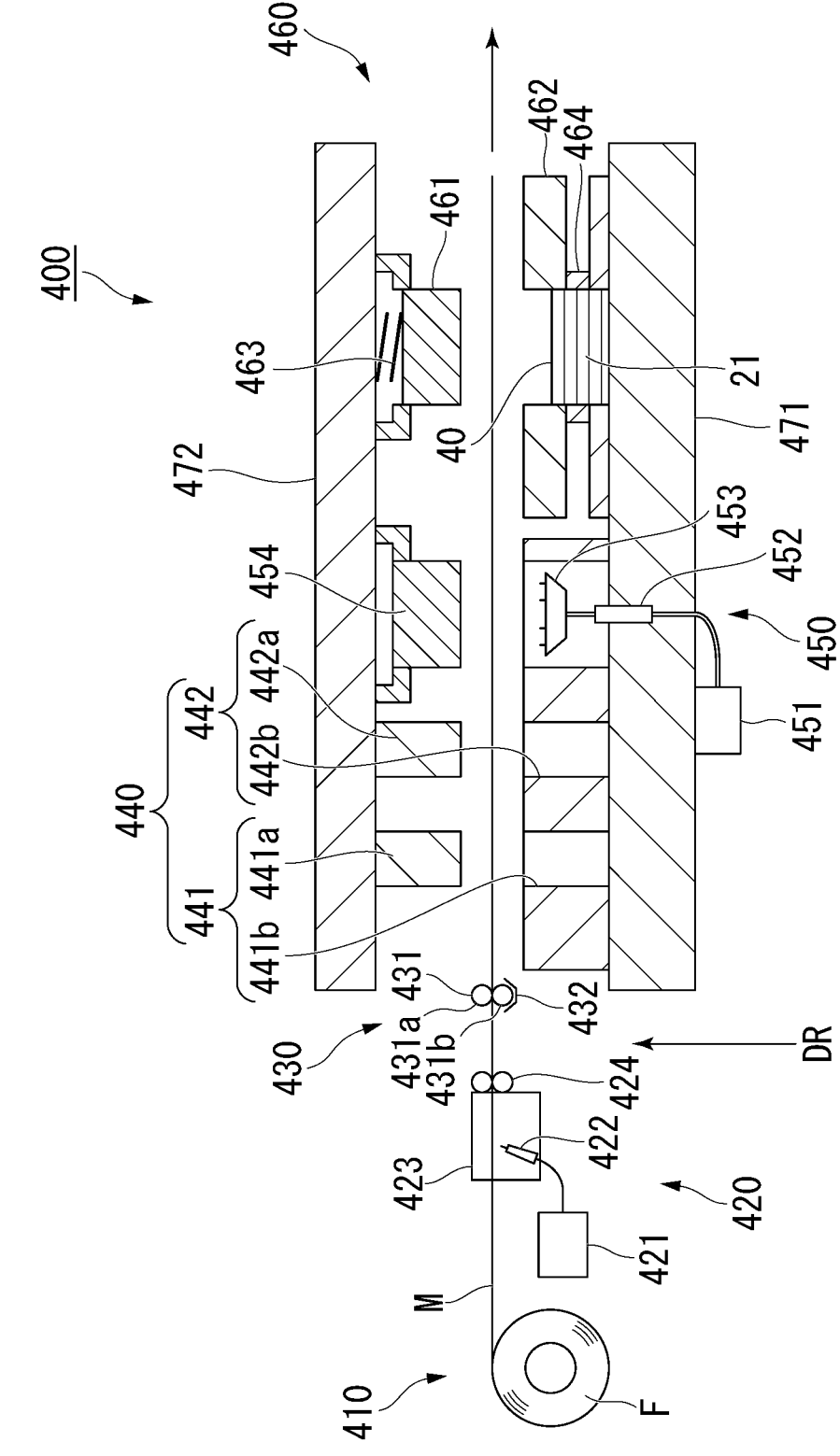
FIG. 21 is a side view of a bonded and stacked core manufacturing apparatus according to a fourth embodiment of the present invention.

First, a bonded and stacked core manufacturing apparatus 400 according to the present embodiment will be described with reference to a side view shown in FIG. 21. As shown in FIG. 21, the bonded and stacked core manufacturing apparatus 400 includes a strip-shaped steel sheet supply unit 410, a curing accelerating layer forming unit 420, a drive unit (not shown), a press working oil application unit 430, a press working unit 440, an adhesive application unit 450, and a stacking and bonding unit 460.

A hoop material F around which the strip-shaped steel sheet M to be a material of the electrical steel sheet (steel sheet component) 40 is wound is pivotally supported by the strip-shaped steel sheet supply unit 410, and the strip-shaped steel sheet M is fed toward the right side of FIG. 21. In the following description, the right side of a drawing, which is a feeding direction of the strip-shaped steel sheet M, may be referred to as a downstream side, and the left side of the drawing, which is the direction opposite thereto, may be referred to as an upstream side. The strip-shaped steel sheet M fed toward the downstream side from the strip-shaped steel sheet supply unit 410 is a steel sheet having the above-described chemical composition, and both surfaces of the strip-shaped steel sheet M are coated with the above-described insulating coatings.

The curing accelerating layer forming unit 420 includes a curing accelerator tank 421, a nozzle 422, a seal box 423, and a wiping roller 424.

The curing accelerator tank 421 includes a first storage unit that stores an anaerobic adhesive curing accelerator dissolved in a solvent, a second storage unit that stores an instantaneous adhesive curing accelerator dissolved in a solvent, and a curing accelerator mixing unit (not shown). The first storage unit and the second storage unit are partitioned from each other such that the anaerobic adhesive curing accelerator and the instantaneous adhesive curing accelerator are not mixed with each other.

The anaerobic adhesive curing accelerator is mixed with the anaerobic adhesive to accelerate instantaneous curing of the anaerobic adhesive, and the anaerobic adhesive curing accelerator exemplified in the first embodiment can be used. Similarly, the instantaneous adhesive curing accelerator is mixed with the instantaneous adhesive (2-cyanoacrylate-based adhesive) to accelerate instantaneous curing of the instantaneous adhesive, and the instantaneous adhesive curing accelerator exemplified in the first embodiment can be used. As the type of solvent, those exemplified in the first embodiment can be used.

The nozzle 422 has a plurality of first nozzle holes for applying the anaerobic adhesive curing accelerator, and a plurality of second nozzle holes for applying the instantaneous adhesive curing accelerator (not shown).

The first nozzle holes are directly connected to the first storage unit of the curing accelerator tank 421 through a first pipe.

The second nozzle holes are directly connected to the second storage unit of the curing accelerator tank 421 through a second pipe.

Furthermore, both the first nozzle holes and the second nozzle holes are also connected to the curing accelerator mixing unit through a third pipe. The curing accelerator mixing unit is connected to both the first storage unit and the second storage unit through a fourth pipe. The anaerobic adhesive curing accelerator from the first storage unit and the instantaneous adhesive curing accelerator from the second storage unit can be taken into the curing accelerator mixing unit, and stirred and mixed therein.

The first pipe, the second pipe, and the fourth pipe are connected to a switching valve (not shown). By operation of this switching valve, a flow of the anaerobic adhesive curing accelerator and a flow of the instantaneous adhesive curing accelerator can be switched to the following (1) or (2).

(1) The anaerobic adhesive curing accelerator in the first storage unit is caused to flow into the first nozzle holes through the first pipe, and at the same time, the instantaneous adhesive curing accelerator in the second storage unit is caused to flow into the second nozzle holes through the second pipe. As a result, the anaerobic adhesive curing accelerator is ejected from the first nozzle holes, and the instantaneous adhesive curing accelerator is ejected from the second nozzle holes.

(2) Both the anaerobic adhesive curing accelerator in the first storage unit and the instantaneous adhesive curing accelerator in the second storage unit are taken into the curing accelerator mixing unit through the fourth pipe, and stirred and mixed therein. The mixed accelerator in which the anaerobic adhesive curing accelerator and the instantaneous adhesive curing accelerator are mixed in this manner is caused to flow into both the first nozzle holes and the second nozzle holes through the third pipe. As a result, the mixed accelerator is ejected from both the first nozzle holes and the second nozzle holes.

Ejection ports of the first nozzle holes face a lower surface of the strip-shaped steel sheet M, and the anaerobic adhesive curing accelerator or the mixed accelerator can be applied to the lower surface in a point shape or a linear shape.

Ejection ports of the second nozzle holes also face the lower surface of the strip-shaped steel sheet M, and the instantaneous adhesive curing accelerator or the mixed accelerator can be applied to the lower surface in a point shape or a linear shape.

In the nozzle 422, the first nozzle holes and the second nozzle holes are alternately arranged, and a pitch is determined such that the curing accelerators ejected from the first nozzle holes and the second nozzle holes are not excessively mixed with each other on an application surface of the strip-shaped steel sheet M. When the anaerobic adhesive curing accelerator and the instantaneous adhesive curing accelerator are applied in a checker shape as described later with reference to FIG. 23, the pitch is preferably the same as a pitch between nozzle holes of a nozzle 453 described later such that application positions of the anaerobic adhesive curing accelerator and the instantaneous adhesive curing accelerator relatively coincide with application positions of an anaerobic adhesive and an instantaneous adhesive in a subsequent step.

By switching to either of the above (1) and (2) by the switching valve, an application form of the anaerobic adhesive curing accelerator and the instantaneous adhesive curing accelerator applied to an application surface of the strip-shaped steel sheet M is divided into a case of application in an unmixed state and a case of application in a mixed state. In the following description, three of the anaerobic adhesive curing accelerators, the instantaneous adhesive curing accelerator, and the mixed accelerator may be collectively referred to simply as "curing accelerator". On the other hand, when it is necessary to distinguish these from each other, the anaerobic adhesive curing accelerator, the instantaneous adhesive curing accelerator, and the mixed accelerator will be described separately.

The seal box 423 is a box having an internal space, and has an inlet and an outlet leading to the internal space. The strip-shaped steel sheet M is fed from the inlet to the internal space of the seal box 423 while maintaining a horizontal state thereof, and then fed from the outlet to the outside of the seal box 423. The nozzle 422 is disposed at a lower portion of the internal space of the seal box 423. As described above, a nozzle port of the nozzle 422 is directed to a lower surface of a portion of the strip-shaped steel sheet M that passes through the internal space. The curing accelerator sprayed from the nozzle 422 onto the lower surface of the strip-shaped steel sheet M is instantaneously dried because a solvent volatilizes. As a result, on the lower surface of the strip-shaped steel sheet M, the curing accelerating layer in which a solvent is dried is formed with a uniform thickness over the entire surface before the strip-shaped steel sheet M goes out of the outlet. The thickness of the curing accelerating layer may be 0.1 μm, for example. Note that, since the curing accelerator is hardly applied to the upper surface of the strip-shaped steel sheet M, an insulating coating almost remains exposed on the upper surface.

The wiping roller 424 mainly wipes off the curing accelerator remaining on the upper surface of the strip-shaped steel sheet M as an excess. As a result, the curing accelerator is completely wiped off from the upper surface of the strip-shaped steel sheet M after the strip-shaped steel sheet M passes through the wiping roller 424, and the insulating coating remains exposed on the upper surface.

Note that a plurality of patterns can be selected for the curing accelerating layer by operation of the switching valve. These patterns will be described later with reference to FIGS. 23 to 25.

The drive unit is disposed at a position DR between the curing accelerating layer forming unit 420 and the press working oil application unit 430. The drive unit intermittently feeds the strip-shaped steel sheet M in the right direction of the drawing from the curing accelerating layer forming unit 420 toward the press working oil application unit 430. Note that, on the lower surface of the strip-shaped steel sheet M fed from the curing accelerating layer forming unit 420, a curing accelerating layer in which the curing accelerator is dried is already formed before the strip-shaped steel sheet M enters the drive unit. On the other hand, on the upper surface of the strip-shaped steel sheet M before the strip-shaped steel sheet M enters the drive unit, there is no curing accelerating layer, and an insulating coating remains exposed.

The press working oil application unit 430 includes an application roller 431 and an oil pan 432.

The oil pan 432 is disposed at a position below the strip-shaped steel sheet M and immediately below the application roller 431. The application roller 431 includes an upper roller 431*a* and a lower roller 431*b*.

The upper roller 431*a* is disposed immediately above the strip-shaped steel sheet M, and can be switched between a state of being in contact with the upper surface of the strip-shaped steel sheet M and a state of being separated from the upper surface of the strip-shaped steel sheet M by moving up and down. The upper roller 431*a* can apply a press working oil supplied from a press working oil supply unit (not shown) to the upper surface of the strip-shaped steel sheet M by rolling while being in contact with the upper surface of the steel sheet M in a state where an outer circumferential surface of the upper roller 431*a* is impregnated with the press working oil.

The lower roller 431*b* is disposed immediately below the strip-shaped steel sheet M, and can be switched between a state of being in contact with the lower surface of the strip-shaped steel sheet M and a state of being separated from the lower surface of the strip-shaped steel sheet M by moving up and down. The lower roller 431*b* can apply a press working oil supplied from the press working oil supply unit to the lower surface of the strip-shaped steel sheet M by rolling while being in contact with the lower surface of the steel sheet M in a state where an outer circumferential surface of the lower roller 431*b* is impregnated with the press working oil.

The oil pan 432 receives and collects an excess press working oil dripping from the upper roller 431*a* and the lower roller 431*b*, and returns the excess press working oil to the press working oil supply unit.

According to the press working oil application unit 430, by supplying a press working oil from the press working oil supply unit in a state where the upper roller 431*a* is in contact with the upper surface of the strip-shaped steel sheet M, it is possible to continuously or intermittently feed the strip-shaped steel sheet M to the downstream side while forming a layer of the press working oil over the entire upper surface of the strip-shaped steel sheet M.

Similarly, by supplying a press working oil from the press working oil supply unit in a state where the lower roller 431*b* is in contact with the lower surface of the strip-shaped steel sheet M, it is possible to continuously or intermittently feed the strip-shaped steel sheet M to the downstream side while forming a layer of the press working oil over the entire lower surface of the strip-shaped steel sheet M.

Alternatively, by sandwiching the strip-shaped steel sheet M between the upper roller 431*a* and the lower roller 431*b*, it is possible to continuously or intermittently feed the strip-shaped steel sheet M to the downstream side while forming a layer of the press working oil over both the entire upper surface and the entire lower surface of the strip-shaped steel sheet M.

As described above, by moving the respective positions of the upper roller 431*a* and the lower roller 431*b* up and down as necessary, selection can be made from three cases of applying the press working oil only to the upper surface of the strip-shaped steel sheet M, applying the press working oil only to the lower surface of the strip-shaped steel sheet M, and applying the press working oil to both the upper and lower surfaces of the strip-shaped steel sheet M.

Here, in any of the above cases, before the press working oil is applied, both the anaerobic adhesive curing accelerator and the instantaneous adhesive curing accelerator applied to the lower surface of the strip-shaped steel sheet M are not naturally dried but actively dried. As described above, since the curing accelerating layer is formed by actively drying the curing accelerators previously, dilution of the curing accelerators due to mixing with the press working oil is suppressed. Therefore, the concentration of the anaerobic adhesive curing accelerator and the concentration of the instantaneous adhesive curing accelerator on the lower surface of the strip-shaped steel sheet M after application of the press working oil are both maintained unchanged before and after application of the press working oil b. Therefore, the strip-shaped steel sheet M after passing through the press working oil application unit 430 is fed to the press working unit 440 while maintaining the concentration of the curing accelerator on the lower surface of the strip-shaped steel sheet M.

The press working unit 440 includes a first-stage punching unit 441 and a second-stage punching unit 442.

The first-stage punching unit 441 is disposed on the downstream side of the press working oil application unit 430 and includes a male die 441*a* and a female die 441*b*. The male die 441*a* and the female die 441*b* are coaxially disposed in the vertical direction, and the strip-shaped steel sheet M is inserted therebetween. Therefore, the male die 441*a* faces the upper surface of the strip-shaped steel sheet M, and the female die 441*b* faces the lower surface of the strip-shaped steel sheet M. Then, in a state where feeding of the strip-shaped steel sheet M is temporarily stopped, the male die 441*a* is moved downward to reach the inside of the female die 441*b* by a hydraulic mechanism (not shown), thereby performing first punching necessary for forming the electrical steel sheet 40 from the strip-shaped steel sheet M. At this time, since the press working oil is applied to the strip-shaped steel sheet M, punching can be performed without causing seizure or the like. After the punching, the male die 441*a* is moved upward to be pulled out from the female die 441*b*, and the strip-shaped steel sheet M is fed toward the downstream side again.

The second-stage punching unit 442 is disposed on the downstream side of the first-stage punching unit 441, and includes a male die 442*a* and a female die 442*b*. The male die 442*a* and the female die 442*b* are coaxially disposed in the vertical direction, and the strip-shaped steel sheet M after the first punching is inserted therebetween. Therefore, the male die 442*a* faces the upper surface of the strip-shaped steel sheet M, and the female die 442*b* faces the lower surface of the strip-shaped steel sheet M. Then, in a state where feeding of the strip-shaped steel sheet M is temporarily stopped again, the male die 442*a* is moved downward to reach the inside of the female die 442*b* by a hydraulic mechanism (not shown), thereby performing second punching necessary for forming the electrical steel sheet 40 from the strip-shaped steel sheet M. Also at this time, since the press working oil is applied to the strip-shaped steel sheet M, punching can be performed without causing seizure or the like. After the punching, the male die 442*a* is moved upward to be pulled out from the female die 442*b*, and the strip-shaped steel sheet M is fed toward the downstream side again.

The adhesive application unit 450 is disposed on the downstream side of the press working unit 440. The adhesive application unit 450 includes an air pressure feeder 451, a syringe 452, a nozzle 453, and a steel sheet retainer 454.

The syringe 452 is a container having a space for storing an anaerobic adhesive and a space for storing an instantaneous adhesive (not shown). The space for storing an anaerobic adhesive and the space for storing an instantaneous adhesive are partitioned from each other such that the anaerobic adhesive and the instantaneous adhesive are not mixed. Here, examples of the anaerobic adhesive include "ARONTITE" (registered trademark) manufactured by Toagosei Co., Ltd., and examples of the instantaneous adhesive (2-cyanoacrylate-based adhesive) include "ARON ALPHA" (registered trademark) manufactured by Toagosei Co., Ltd. The syringe 452 and the air pressure feeder 451 are connected to each other through a pipe that feeds air from the air pressure feeder 451 to the syringe 452. In addition, the syringe 452 and the nozzle 453 are connected to each other through a fifth pipe that supplies an anaerobic adhesive from the syringe 452 to the nozzle 453 and a sixth pipe that supplies an instantaneous adhesive.

The nozzle 453 includes a plurality of needles (not shown) whose ejection ports face upward. These needles are disposed below the strip-shaped steel sheet M. Therefore, the ejection ports of the needles face the lower surface of the strip-shaped steel sheet M. The needles include a plurality of first needles for applying an anaerobic adhesive and a plurality of second needles for applying an instantaneous adhesive (not shown). An ejection port of the first needle and an ejection port of the second needle are alternately and uniformly arranged in a plane view of the nozzle 453.

Figure 23:
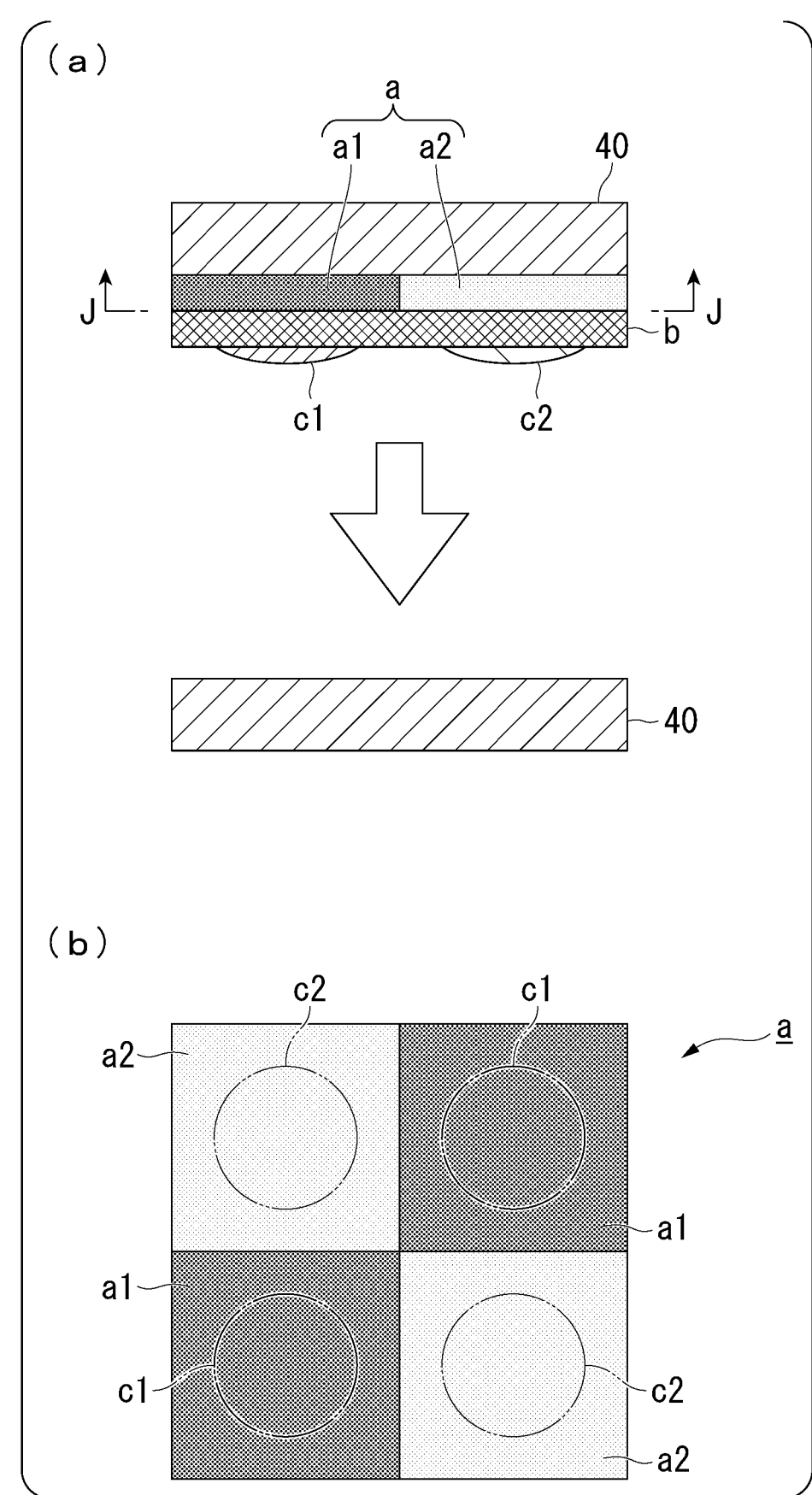

Here, as shown in FIG. 23 described later, when the anaerobic adhesive curing accelerator and the instantaneous adhesive curing accelerator are arranged in a checker shape, the position of the ejection port of each of the first needles preferably coincides with each position of the anaerobic adhesive curing accelerator applied and dried on the lower surface of the strip-shaped steel sheet M. Similarly, the position of the ejection port of each of the second needles preferably coincides with each position of the instantaneous adhesive curing accelerator applied and dried on the lower surface of the strip-shaped steel sheet M. In this case, when feeding of the strip-shaped steel sheet M is temporarily stopped above the nozzle 453 after the strip-shaped steel sheet M passes the press working unit 440, the relative positions of the anaerobic adhesive curing accelerator on the lower surface of the strip-shaped steel sheet M and the ejection ports of the first needles coincide with each other, and the relative positions of the instantaneous adhesive curing accelerator and the ejection ports of the second needles coincide with each other. As a result, the adhesives can be applied to the curing accelerators, respectively in a correct combination.

The first needles are directly connected to a space that stores the anaerobic adhesive through the fifth pipe. On the other hand, the second needles are directly connected to a space that stores the instantaneous adhesive through the sixth pipe.

The first needles and the second needles can apply the anaerobic adhesive and the instantaneous adhesive to the lower surface of the strip-shaped steel sheet M such that the anaerobic adhesive and the instantaneous adhesive form a checker shape (lattice shape). As a result, a square or circular pattern formed of the anaerobic adhesive and a square or circular pattern formed of the instantaneous adhesive are alternately arranged on the insulating coating formed on the lower surface of the strip-shaped steel sheet M in both a longitudinal direction of the strip-shaped steel sheet M and a width direction of the strip-shaped steel sheet M. That is, the anaerobic adhesive and the instantaneous adhesive can be arranged so as to be adjacent to each other in both the longitudinal direction of the strip-shaped steel sheet M and the width direction of the strip-shaped steel sheet M.

The steel sheet retainer 454 is disposed above the nozzle 453 (immediately above the first needles and the second needles). Therefore, the steel sheet retainer 454 faces the upper surface of the strip-shaped steel sheet M. The steel sheet retainer 454 is pushed downward by a hydraulic mechanism (not shown) in a state where feeding of the strip-shaped steel sheet M is temporarily stopped. As a result, the lower surface of the steel sheet retainer 454 comes into contact with the upper surface of the strip-shaped steel sheet M to push the strip-shaped steel sheet M downward. As a result, the height position of the strip-shaped steel sheet M can be pushed down and positioned to the adhesive application position by the nozzle 453. In this positioning state, the lower surface of the strip-shaped steel sheet M is close to the ejection ports of the first needles and the second needles.

Furthermore, in this positioning state, when air is pressure-fed from the air pressure feeder 451 to the syringe 452, the air is uniformly supplied to both the space that stores the anaerobic adhesive and the space that stores the instantaneous adhesive. Then, the anaerobic adhesive is supplied to the first needles through the fifth pipe, and the instantaneous adhesive is supplied to the second needles through the sixth pipe. Then, the anaerobic adhesive is ejected from the ejection ports of the first needles and applied to the lower surface of the strip-shaped steel sheet M. Similarly, the instantaneous adhesive is ejected from the ejection ports of the second needles and applied to the lower surface of the strip-shaped steel sheet M. Thereafter, by raising the steel sheet retainer 454 by the hydraulic mechanism, the height position of the strip-shaped steel sheet M is returned to the original height.

The stacking and bonding unit 460 is disposed on the downstream side of the adhesive application unit 450. The stacking and bonding unit 460 includes an outer circumferential punching male die 461, an outer circumferential punching female die 462, a spring 463, and a heater 464.

The outer circumferential punching male die 461 is a cylindrical die having a circular bottom surface, and a lower end of the spring 463 is connected to an upper end of the outer circumferential punching male die 461. The outer circumferential punching male die 461 can move up and down together with the spring 463 in a state of being supported by the spring 463. The outer circumferential punching male die 461 has an outer diameter dimension substantially the same as the outer diameter dimension of the stator bonded and stacked core 21.

The outer circumferential punching female die 462 is a die having a cylindrical internal space, and has an inner diameter dimension substantially the same as the outer diameter dimension of the stator bonded and stacked core 21.

The heater 464 is integrally incorporated in the outer circumferential punching female die 462. The heater 464 heats the electrical steel sheets (steel sheet components) 40 stacked in the outer circumferential punching female die 462 from a circumference of the electrical steel sheets 40. When a thermosetting type is used as the adhesive, the adhesive is cured by receiving heat from the heater 464. On the other hand, when a room-temperature curing type is used as the adhesive, the adhesive is cured at room temperature without requiring heating.

According to the stacking and bonding unit 460, in a state where feeding of the strip-shaped steel sheet M is temporarily stopped, the outer circumferential punching male die 461 is lowered to sandwich the strip-shaped steel sheet M between the outer circumferential punching male die 461 and the outer circumferential punching female die 462, and furthermore, the outer circumferential punching male die 461 is pressed into the outer circumferential punching female die 462, whereby the electrical steel sheet 40 whose outer circumference has been punched from the strip-shaped steel sheet M is obtained.

The punched electrical steel sheet 40 is stacked on an upper surface of another electrical steel sheet 40 that has been previously punched, and stacked and bonded in the outer circumferential punching female die 462, and furthermore, a pressurizing force from the outer circumferential punching male die 461 and heating from the heater 464 are applied to the punched electrical steel sheet 40. At this time, the pressurizing force applied from the outer circumferential punching male die 461 to the electrical steel sheet 40 is maintained constant all the time by a biasing force of the spring 463.

As described above, the electrical steel sheet 40 punched this time is bonded and fixed to the upper surface of the electrical steel sheet 40 punched last time. By repeating such steps of outer circumferential punching, pressurizing, and heating as many times as the number of stacked electrical steel sheets 40, the stator bonded and stacked core 21 is formed in the outer circumferential punching female die 462.

As shown in FIG. 21, the female die 441*b*, the female die 442*b*, the nozzle 453, the outer circumferential punching female die 462, and the heater 464 are fixed onto a common fixing base 471. Therefore, relative positions of the female die 441*b*, the female die 442*b*, the nozzle 453, the outer circumferential punching female die 462, and the heater 464 in the horizontal direction and the up-down direction are fixed.

Similarly, the male die 441*a*, the male die 442*a*, the steel sheet retainer 454, and the outer circumferential punching male die 461 are also fixed to the lower surface of the common movable base 472. Therefore, relative positions of the male die 441*a*, the male die 442*a*, the steel sheet retainer 454, and the outer circumferential punching male die 461 in the horizontal direction and the up-down direction are fixed.

The drive unit feeds the strip-shaped steel sheet M toward the downstream side, and lowers the movable base 472 when the drive unit temporarily stops the strip-shaped steel sheet M, whereby outer circumferential punching, stacking, and bonding of the electrical steel sheet 40, application of an anaerobic adhesive and an instantaneous adhesive to the position of the electrical steel sheet 40 to be subjected to outer circumferential punching next from the strip-shaped steel sheet M, the second punching to the position of the strip-shaped steel sheet M to which the anaerobic adhesive and the instantaneous adhesive are applied next, and the first punching to the position of the strip-shaped steel sheet M to be subjected to the second punching next are simultaneously performed.

Subsequently, the movable base 472 is raised and retracted above the strip-shaped steel sheet M, and then the strip-shaped steel sheet M is fed again toward the downstream side by a predetermined distance by the drive unit and temporarily stopped again. In this state, the movable base 472 is lowered again, and working at each position is continuously performed. As described above, the step of moving the movable base 472 up and down during a temporary stop while intermittently feeding the strip-shaped steel sheet M by the drive unit is repeated, whereby the stator bonded and stacked core 21 is manufactured.

A bonded and stacked core manufacturing method using the bonded and stacked core manufacturing apparatus 400 having the above-described constitution will be described below with reference to FIGS. 22 to 26.

Figure 22:
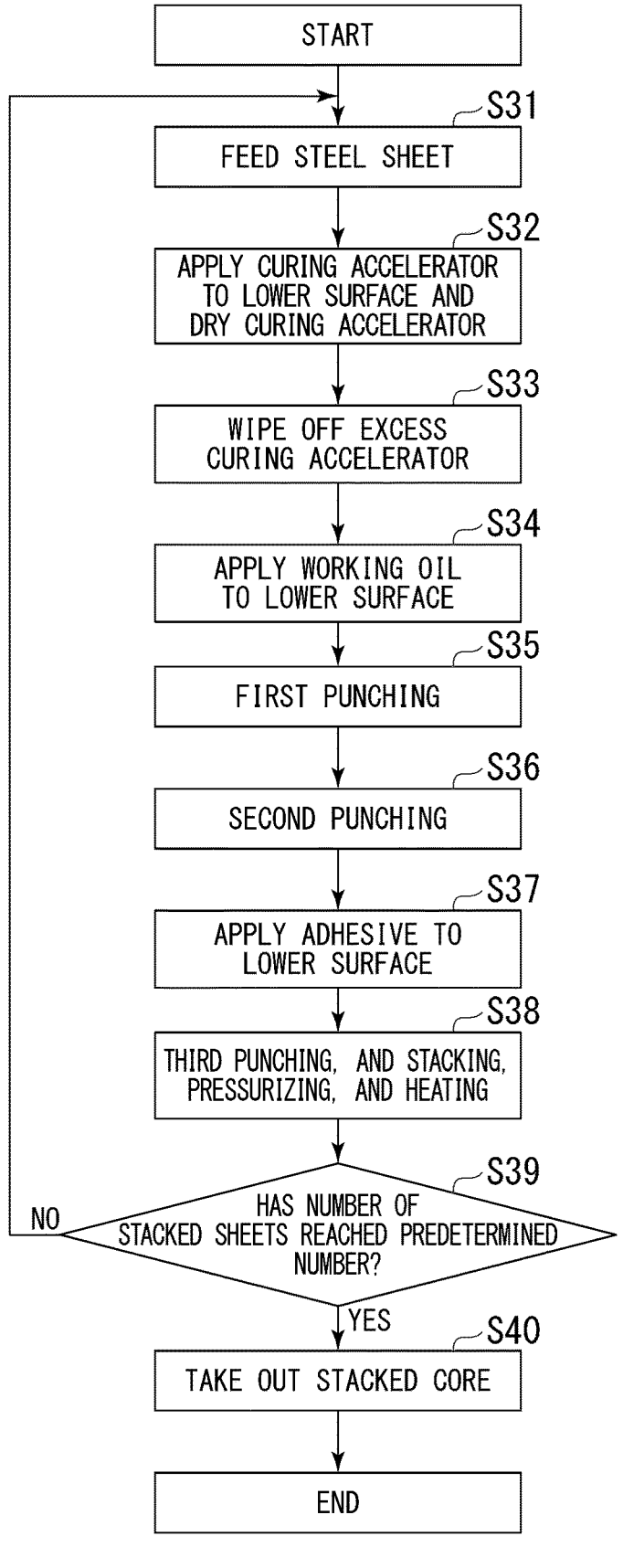
FIG. 22 is a flowchart for explaining a bonded and stacked core manufacturing method according to the embodiment.
Figure 24:
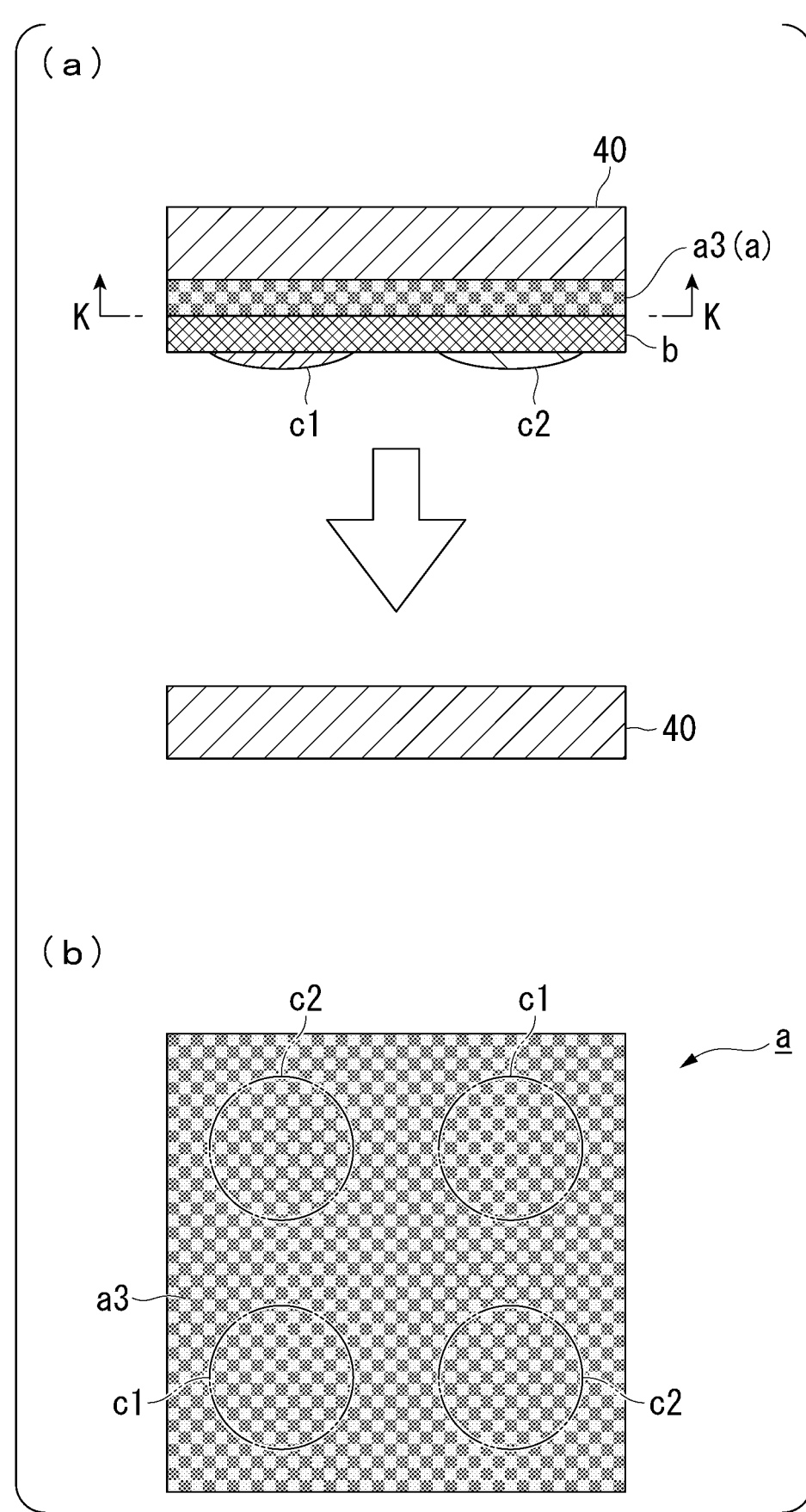
Figure 25:
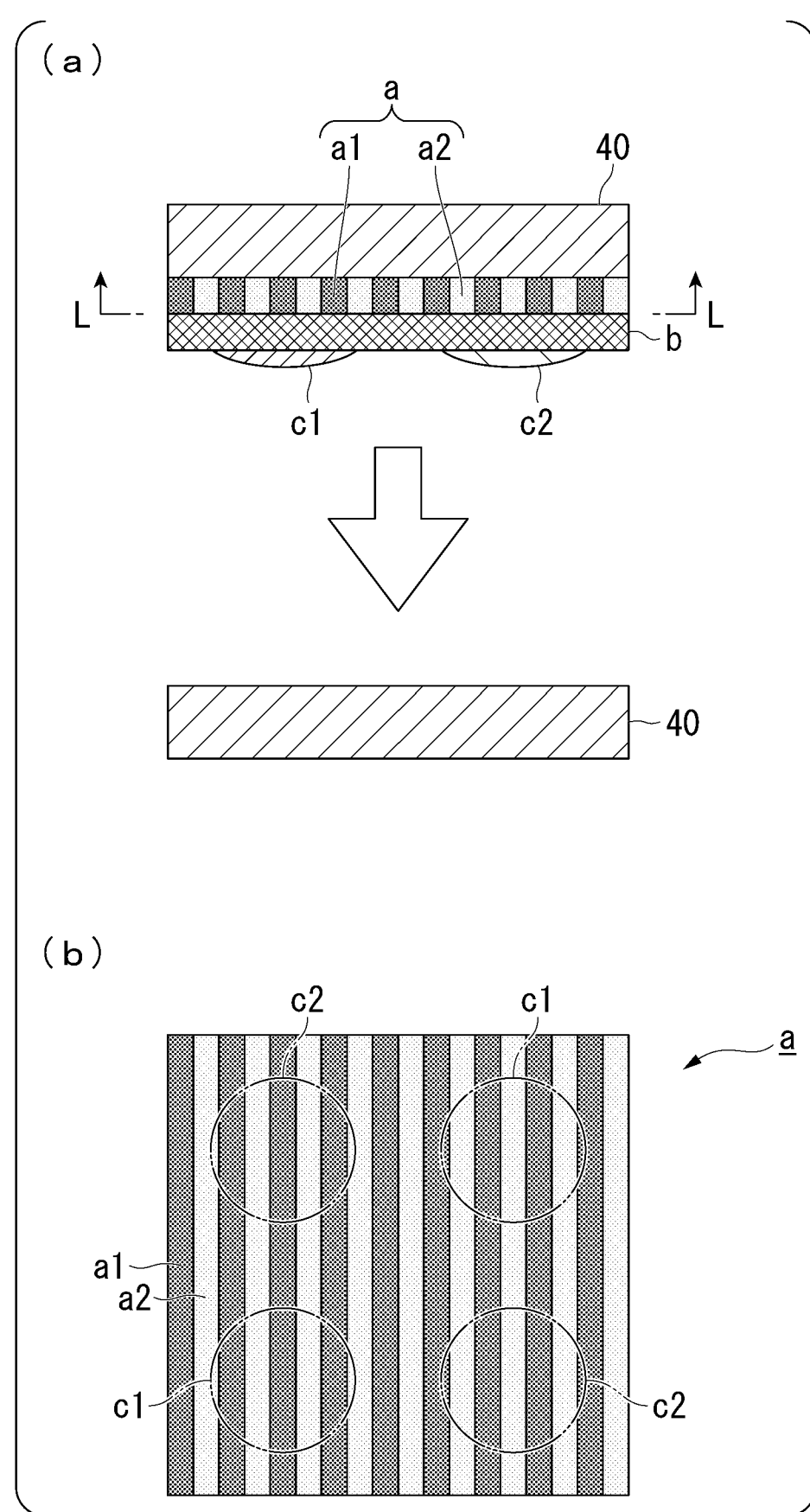
Figure 26:
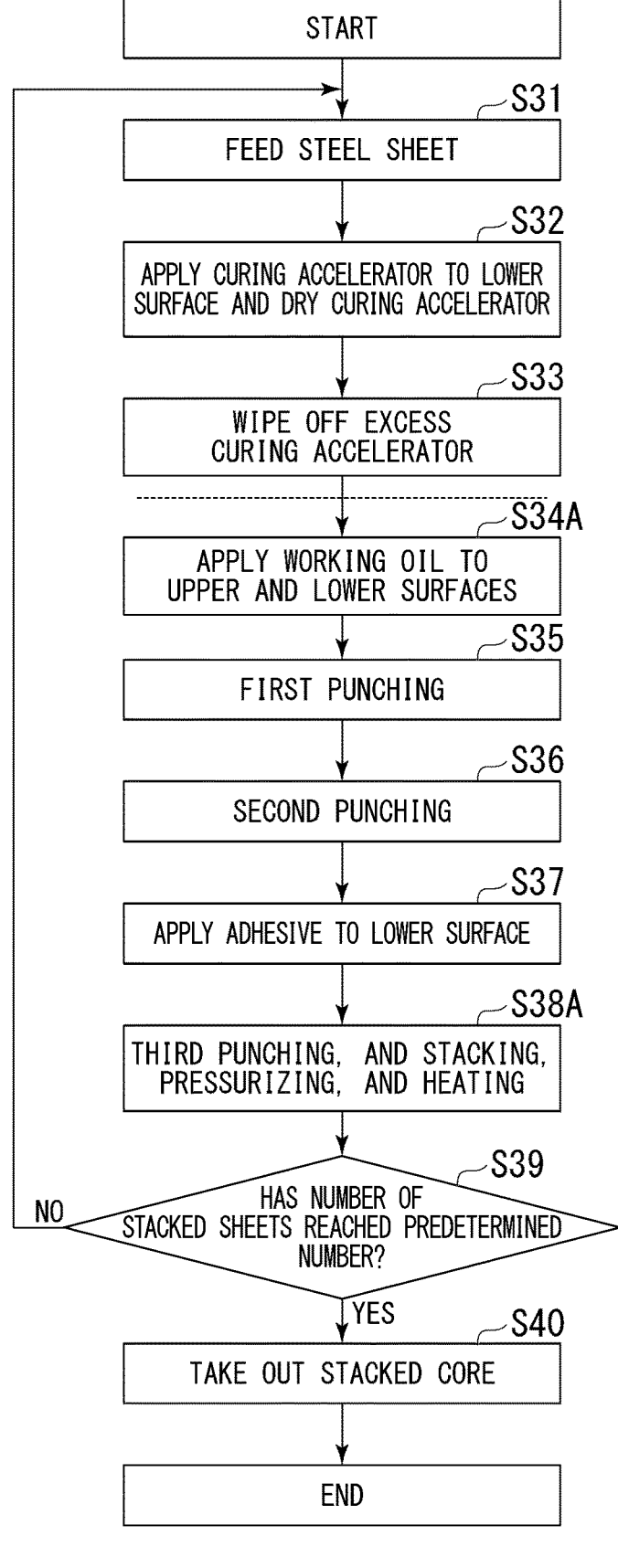
FIG. 26 is a flowchart for explaining a modification example of the bonded and stacked core manufacturing method according to the embodiment.

FIG. 22 is a flowchart for explaining the bonded and stacked core manufacturing method according to the present embodiment. FIG. 23 is a diagram for explaining a first aspect of the bonded and stacked core manufacturing method, in which FIG. 23(*a*) is a partial longitudinal cross-sectional view indicating a stacking and bonding step, and FIG. 23(*b*) is a cross-sectional view taken along line J-J of FIG. 23(*a*). FIG. 24 is a diagram for explaining a second aspect of the bonded and stacked core manufacturing method, in which FIG. 24(*a*) is a partial longitudinal cross-sectional view indicating a stacking and bonding step, and FIG. 24(*b*) is a cross-sectional view taken along line K-K of FIG. 24(*a*). FIG. 25 is a diagram for explaining a third aspect of the bonded and stacked core manufacturing method, in which FIG. 25(*a*) is a partial longitudinal cross-sectional view indicating a stacking and bonding step, and FIG. 25(*b*) is a cross-sectional view taken along line L-L of FIG. 25(*a*). FIG. 26 is a flowchart for explaining a modification example of the bonded and stacked core manufacturing method according to the present embodiment.

As shown in FIG. 22, the bonded and stacked core manufacturing method of the present embodiment includes a steel sheet feeding step S31, a curing accelerator applying and drying step S32, an excess wiping step S33, a working oil application step S34, a first punching step S35, a second punching step S36, an adhesive application step S37, a stacking and bonding step S38, a stacked sheet number confirmation step S39, and a taking-out step S40.

In the steel sheet feeding step S31, the strip-shaped steel sheet M is fed from the hoop material F toward the downstream side.

In the subsequent curing accelerator applying and drying step S32, an anaerobic adhesive curing accelerator a1 and an instantaneous adhesive curing accelerator a2 are applied to the entire lower surface of the strip-shaped steel sheet M from the nozzle 422, and dried. The anaerobic adhesive curing accelerator a1 and the instantaneous adhesive curing accelerator a2 at this time point are both dried to be solid.

Here, three patterns are exemplified in FIGS. 23 to 25 as an application pattern of the anaerobic adhesive curing accelerator a1 and the instantaneous adhesive curing accelerator a2. FIGS. 23 to 25 are diagrams corresponding to the stacking and bonding step S38, and the application pattern of the anaerobic adhesive curing accelerator a1 and the instantaneous adhesive curing accelerator a2 formed in the curing accelerator applying and drying step S32 remains fixed after the curing accelerator applying and drying step S32. Therefore, the application patterns will be described with reference to these drawings.

For example, in the application pattern of FIG. 23, the anaerobic adhesive curing accelerator a1 and the instantaneous adhesive curing accelerator a2 are arranged so as to form a checker shape (lattice shape) on the lower surface of the strip-shaped steel sheet M (electrical steel sheet 40). More specifically, a square or circular pattern formed of the anaerobic adhesive curing accelerator a1 and a square or circular pattern formed of the instantaneous adhesive curing accelerator a2 are alternately arranged on the insulating coating formed on the lower surface of the strip-shaped steel sheet M in both the longitudinal direction of the strip-shaped steel sheet M and the width direction of the strip-shaped steel sheet M. That is, the anaerobic adhesive curing accelerator a1 and the instantaneous adhesive curing accelerator a2 are arranged so as to be adjacent to each other in both the longitudinal direction of the strip-shaped steel sheet M and the width direction of the strip-shaped steel sheet M.

The anaerobic adhesive curing accelerator a1 and the instantaneous adhesive curing accelerator a2 thus applied are dried before the strip-shaped steel sheet M goes out of the seal box 423 to form a curing accelerating layer a having a constant coating thickness. The curing accelerating layer a is solid.

In addition, in the application pattern of FIG. 24, the anaerobic adhesive curing accelerator a1 and the instantaneous adhesive curing accelerator a2 are arranged on the lower surface of the strip-shaped steel sheet M (electrical steel sheet 40) in a state of being previously mixed. This mixing is obtained by taking both the anaerobic adhesive curing accelerator a1 in the first storage unit and the instantaneous adhesive curing accelerator a2 in the second storage unit into the curing accelerator mixing unit through the third pipe, and stirring and mixing the curing accelerators therein in the curing accelerating layer forming unit 420. The mixed accelerator thus obtained is supplied to both the first nozzle holes and the second nozzle holes through the fourth pipe. As a result, the mixed accelerator is ejected from both the first nozzle holes and the second nozzle holes. The ejected mixed accelerator is uniformly disposed on the insulating coating formed on the lower surface of the strip-shaped steel sheet M in both the longitudinal direction of the strip-shaped steel sheet M and the width direction of the strip-shaped steel sheet M.

The mixed accelerator thus applied is dried before the strip-shaped steel sheet M goes out of the seal box 223 to form the curing accelerating layer a having a constant coating thickness. The curing accelerating layer a is solid.

Alternatively, in the application pattern of FIG. 25, the anaerobic adhesive curing accelerator a1 and the instantaneous adhesive curing accelerator a2 are alternately arranged so as to form a stripe shape (linear shape) on the lower surface of the strip-shaped steel sheet M (electrical steel sheet 40). More specifically, the linear pattern formed of the anaerobic adhesive curing accelerator a1 and the linear pattern formed of the instantaneous adhesive curing accelerator a2 are alternately arranged on the insulating coating formed on the lower surface of the strip-shaped steel sheet M in the longitudinal direction of the strip-shaped steel sheet M. That is, when the right direction of FIG. 25(b) is the feeding direction of the strip-shaped steel sheet M, the anaerobic adhesive curing accelerator a1 and the instantaneous adhesive curing accelerator a2 are linearly formed so as to be parallel to a direction orthogonal to the feeding direction. The anaerobic adhesive curing accelerator a1 and the instantaneous adhesive curing accelerator a2 are alternately arranged adjacent to each other when viewed in the feeding direction of the strip-shaped steel sheet M.

The anaerobic adhesive curing accelerator a1 and the instantaneous adhesive curing accelerator a2 thus applied are dried before the strip-shaped steel sheet M goes out of the seal box 423 to form a curing accelerating layer a having a constant coating thickness. The curing accelerating layer a is solid.

Note that, instead of the application form described above, the anaerobic adhesive curing accelerator a1 and the instantaneous adhesive curing accelerator a2 may be formed in a linear shape parallel to the feeding direction such that the downward direction of FIG. 25(b) is the feeding direction of the strip-shaped steel sheet M.

Returning to FIG. 22, in the subsequent excess wiping step S33, the excess curing accelerator on the upper surface of the strip-shaped steel sheet M is wiped off. Therefore, the curing accelerating layer a is not formed on the upper surface of the strip-shaped steel sheet M.

In the subsequent working oil application step S34, the lower roller 131b rolls while being in contact with the lower surface of the steel sheet M in a state where an outer circumferential surface of the lower roller 131b is impregnated with the press working oil b supplied from the press working oil supply unit. As a result, the press working oil b is applied to the entire surface of only the lower surface of the strip-shaped steel sheet M. That is, the press working oil b is applied so as to coat the surface of the curing accelerating layer a.

At this time, both the anaerobic adhesive curing accelerator a1 and the instantaneous adhesive curing accelerator a2 are not naturally dried but are actively dried. As described above, since the curing accelerating layer a is formed by actively drying the curing accelerators previously, dilution of the curing accelerators due to mixing with the press working oil b applied on the surface of the curing accelerating layer a is suppressed.

On the other hand, since the upper roller 131a ascends and is separated from the upper surface of the strip-shaped steel sheet M, the press working oil b is not applied to the upper surface of the strip-shaped steel sheet M, and the insulating coating remains exposed.

In the subsequent first punching step S35, first punching of the strip-shaped steel sheet M is performed by the first-stage punching unit 441. At this time, since the press working oil b is previously applied to the lower surface of the strip-shaped steel sheet M, a defect in press working such as seizure between the male die 441a and the female die 441b does not occur.

In the subsequent second punching step S36, second punching of the strip-shaped steel sheet M is performed by the second-stage punching unit 442. Also at this time, since the press working oil b is previously applied to the lower surface of the strip-shaped steel sheet M, a defect in press working such as seizure between the male die 442a and the female die 442b does not occur.

Through the first punching step S35 and the second punching step S36 described above, the core back portion 22 and the tooth portion 23 shown in FIG. 1 are formed in the strip-shaped steel sheet M except for an outer shape portion.

In the subsequent adhesive application step S37, as shown in FIGS. 23 to 25, an anaerobic adhesive c1 and an instantaneous adhesive c2 ejected from the nozzle 453 are directly applied to the lower surface of the strip-shaped steel sheet M. At this time, the anaerobic adhesive c1 and the instantaneous adhesive c2 are applied in a point shape having a predetermined thickness dimension and a predetermined diameter dimension. Here, since the anaerobic adhesive c1 and the instantaneous adhesive c2 have not been mixed with the curing accelerating layer a yet, the anaerobic adhesive c1 and the instantaneous adhesive c2 are in a liquid form.

Note that, as shown in FIG. 23(b), when the anaerobic adhesive curing accelerator a1 and the instantaneous adhesive curing accelerator a2 are arranged in a checker shape, the anaerobic adhesive c1 and the instantaneous adhesive c2 are also arranged in a checker shape so as to coincide with the relative positions of the anaerobic adhesive curing accelerator a1 and the instantaneous adhesive curing accelerator a2.

In the subsequent stacking and bonding step S38, as shown in FIGS. 23 to 25, the electrical steel sheet 40 whose outer circumference has been punched from the strip-shaped steel sheet M by the outer circumferential punching male die 461 is stacked on an upper surface of another electrical steel sheet 40 that has been previously punched. At this time, the insulating coating remains exposed on the upper surface of the other electrical steel sheet 40. The electrical steel sheet 40 that has been subjected to outer circumferential punching this time is stacked on the other electrical steel sheet 40 and heated while being pressurized. Then, the anaerobic adhesive c1 and the instantaneous adhesive c2 on the lower surface side of the electrical steel sheet 40 that has been subjected to outer circumferential punching this time is applied to the upper surface of the other electrical steel sheet 40 that has been previously subjected to outer circumferential punching. At the same time, the anaerobic adhesive c1 and the instantaneous adhesive c2 on the lower surface side of the electrical steel sheet 40 that has been subjected to outer circumferential punching this time push away the press working oil b on the anaerobic adhesive c1 and the instantaneous adhesive c2, and are mixed with the curing accelerating layer a on the press working oil b. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

By sequentially repeating the above steps, a predetermined number of electrical steel sheets 40 are stacked and bonded, and the stator bonded and stacked core 21 is completed.

That is, in the stacked sheet number confirmation step S39, it is determined whether or not the number of stacked electrical steel sheets 40 has reached a predetermined number. As a result, if the number has not reached the predetermined number (determination: NO), the flow returns to the steel sheet feeding step S31, and the steel sheet feeding step S31 to the stacking and bonding step S38 are repeated again. On the other hand, if the number has reached the predetermined number in the stacked sheet number confirmation step S39 (determination: YES), the flow proceeds to the taking-out step S40.

In the subsequent taking-out step S40, the completed stator bonded and stacked core 21 is taken out from the outer circumferential punching female die 462, whereby all the steps of the bonded and stacked core manufacturing method are completed.

The gist of the bonded and stacked core manufacturing method using the bonded and stacked core manufacturing apparatus 400 described above will be summarized below.

The bonded and stacked core manufacturing method of the present embodiment is a method for manufacturing the stator bonded and stacked core 21 (bonded and stacked core) by performing press working on the strip-shaped steel sheet M obtained by applying the anaerobic adhesive a1 and the instantaneous adhesive a2 to one surface (lower surface) side thereof and furthermore, applying the press working oil b onto the anaerobic adhesive a1 and the instantaneous adhesive a2 to obtain a plurality of electrical steel sheets 40 (steel sheet components), and stacking and bonding the electrical steel sheets 40.

In addition, in the present embodiment, on the lower surface of the strip-shaped steel sheet M before the press working oil b is applied, the curing accelerating layer a obtained by applying and drying the anaerobic adhesive curing accelerator a1 and the instantaneous adhesive curing accelerator a2 is formed.

According to the bonded and stacked core manufacturing method, it is possible to obtain the same operation and effects as those described in the first embodiment.

In the bonded and stacked core manufacturing method, the stator bonded and stacked core (bonded and stacked core) 21 may be a stator for a rotary electric machine. According to the bonded and stacked core manufacturing method, since higher productivity can be obtained while ensuring sufficient bonding strength, it is possible to manufacture a stator for a rotary electric machine having high performance and low manufacturing cost.

The bonded and stacked core manufacturing apparatus 400 of the present embodiment is an apparatus for manufacturing the stator bonded and stacked core (bonded and stacked core) 21 including the plurality of electrical steel sheets (steel sheet components) 40 punched from the strip-shaped steel sheet M.

The bonded and stacked core manufacturing apparatus 400 of the present embodiment includes: the press working oil application unit 430 that applies the press working oil b to a lower surface (one surface) side of the strip-shaped steel sheet M; the press working unit 440 that applies press working to the strip-shaped steel sheet M; the adhesive application unit 450 that applies the anaerobic adhesive a1 and the instantaneous adhesive a2 to a lower surface side of the strip-shaped steel sheet M; and the curing accelerating layer forming unit 420 that forms the curing accelerating layer a obtained by applying the anaerobic adhesive curing accelerator a1 and the instantaneous adhesive curing accelerator a2 to the lower surface of the strip-shaped steel sheet M before the press working oil b is applied, and drying the curing accelerators.

According to the bonded and stacked core manufacturing apparatus 400, it is possible to obtain the same operation and effects as those described in the first embodiment.

In the bonded and stacked core manufacturing apparatus 400, as shown in FIG. 23, the curing accelerating layer forming unit 420 may include the nozzle 422 that applies the anaerobic adhesive curing accelerator a1 and the instantaneous adhesive curing accelerator a2 in a checker shape.

Alternatively, in the bonded and stacked core manufacturing apparatus 400, as shown in FIG. 24, the curing accelerating layer forming unit 420 may include a pipe (curing accelerator supply flow path) through which the anaerobic adhesive curing accelerator a1 and the instantaneous adhesive curing accelerator a2 flow in a state where the anaerobic adhesive curing accelerator a1 and the instantaneous adhesive curing accelerator a2 are previously mixed, and the nozzle 422 leading to the pipe.

Alternatively, in the bonded and stacked core manufacturing apparatus 400, as shown in FIG. 25, the curing accelerating layer forming unit 420 may include the nozzle 422 that applies the anaerobic adhesive curing accelerator a1 and the instantaneous adhesive curing accelerator a2 in a stripe shape.

In any of the above cases, the anaerobic adhesive curing accelerator a1 and the instantaneous adhesive curing accelerator a2 can be uniformly arranged along an application surface of the strip-shaped steel sheet M by the nozzle 422. Therefore, a bonding force along the application surface can be uniform.

Note that, in the present embodiment, the case where the press working oil b is applied only to the lower surface of the strip-shaped steel sheet M in the working oil application step S34 shown in FIG. 22 has been described, but the present invention is not limited only to this form. For example, as shown in the modification example of FIG. 26, a working oil application step S34A in which the press working oil b is applied to both the upper and lower surfaces of the strip-shaped steel sheet M may be adopted.

In this working oil application step S34A, the press working oil b is applied to both the upper and lower surfaces of the strip-shaped steel sheet M. That is, the upper roller 431a and the lower roller 431b are impregnated with the press working oil b, and then the upper roller 431a and the lower roller 431b are rolled while the strip-shaped steel sheet M is sandwiched therebetween. As a result, only the press working oil b is formed on the upper surface of the strip-shaped steel sheet M. On the other hand, on the lower surface of the strip-shaped steel sheet M, the curing accelerating layer a including the anaerobic adhesive curing accelerator a1 and the instantaneous adhesive curing accelerator a2, and the press working oil b coating the surface of the curing accelerating layer a are formed.

In addition, in the stacking and bonding step S38A in FIG. 26, the electrical steel sheet 40 whose outer circumference has been punched from the strip-shaped steel sheet M by the outer circumferential punching male die 461 is stacked on an upper surface of another electrical steel sheet 40 that has been previously subjected to outer circumferential punching, and is heated while being pressurized. At this time, the anaerobic adhesive c1 and the instantaneous adhesive c2 on the lower surface side of the electrical steel sheet 40 that has been subsequently subjected to outer circumferential punching push away the press working oil b applied to the upper surface of the steel sheet component 40 that has been previously subjected to outer circumferential punching, and are applied to the upper surface. At the same time, the anaerobic adhesive c1 and the instantaneous adhesive c2 on the lower surface side of the electrical steel sheet 40 that has been subsequently subjected to outer circumferential punching push away the press working oil b on the anaerobic adhesive c1 and the instantaneous adhesive c2, and are mixed with the curing accelerating layer a on the press working oil b. As a result, the anaerobic adhesive c1 is cured while being mixed with the anaerobic adhesive curing accelerator a1 in the curing accelerating layer a. Similarly, the instantaneous adhesive c2 is instantaneously cured while being mixed with the instantaneous adhesive curing accelerator a2 in the curing accelerating layer a.

Note that, since the other steps are the same as the steps described with reference to FIG. 22, the same references are used and redundant description is omitted.

Fifth Embodiment

Figure 27:
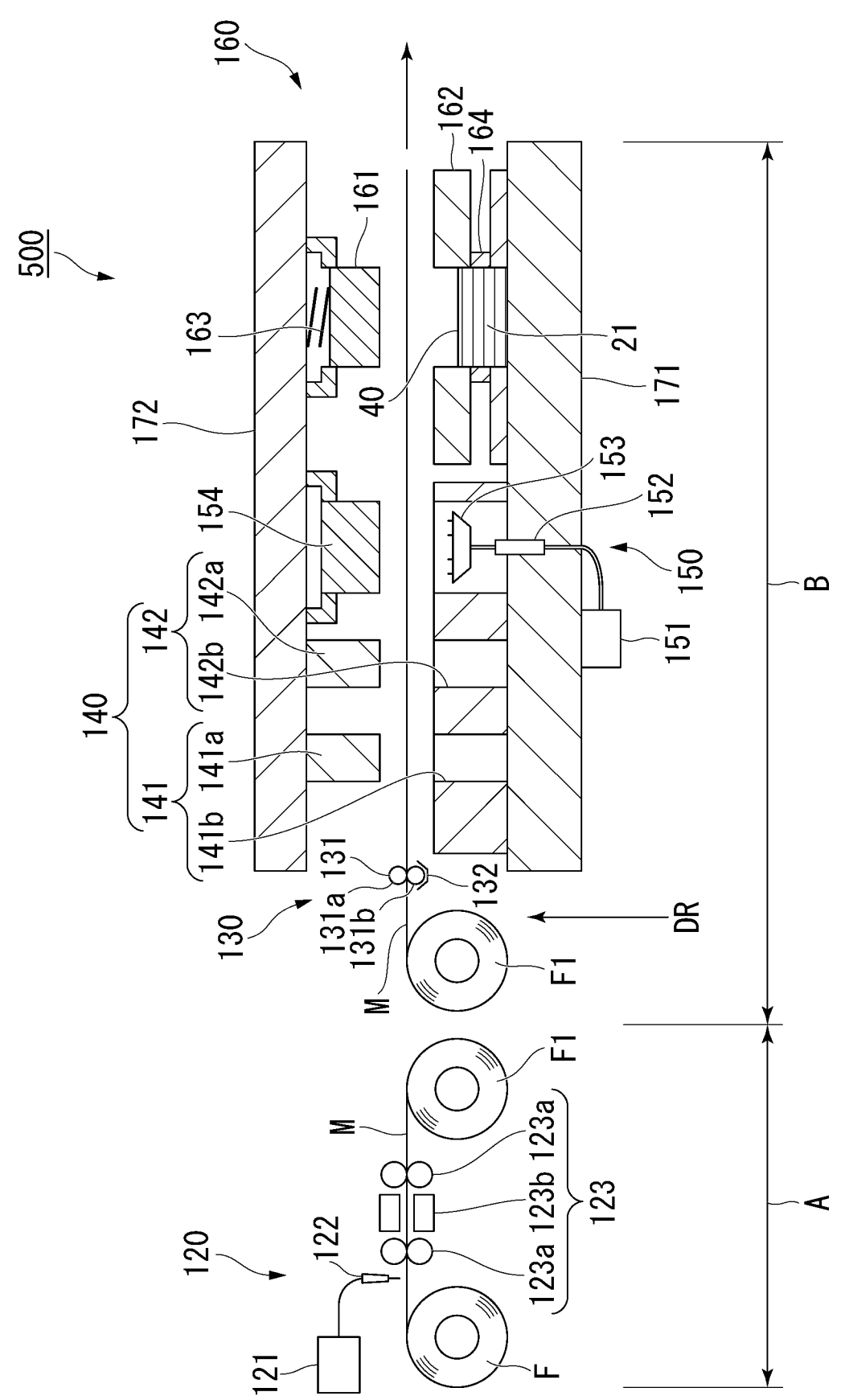
FIG. 27 is a side view of a bonded and stacked core manufacturing apparatus according to a fifth embodiment of the present invention.

A fifth embodiment of the present invention will be described below with reference to FIG. 27. FIG. 27 is a side view of a bonded and stacked core manufacturing apparatus according to the present embodiment.

Since the present embodiment corresponds to a modification example in which only one point of the first embodiment is changed, in the following description, the same components as those of the first embodiment are denoted by the same references, and detailed description thereof is omitted.

A bonded and stacked core manufacturing apparatus 500 of the present embodiment includes a first stage A including the curing accelerating layer forming unit 120 and a second stage B including a conveyance unit that feeds the strip-shaped steel sheet M transferred from the first stage A toward the press working oil application unit 130. On the second stage B, the conveyance unit, the press working oil application unit 130, the press working unit 140, and the adhesive application unit 150 are arranged in this order in the feeding direction of the strip-shaped steel sheet M.

The first stage A includes a conveyance unit that feeds the hoop material F, a curing accelerating layer forming unit 120, and a winding unit that winds the strip-shaped steel sheet M on which the curing accelerating layer a has been formed to form the hoop material F1. The hoop material F1, which is an intermediate material manufactured in the first stage A, is removed from the winding unit of the stage A and moved to another place. By performing this process a plurality of times, a plurality of hoop materials F1 can be prepared and stored.

The second stage B includes another conveyance unit and the drive unit (not shown) that receive the prepared and stored hoop material F1 and feed the hoop material F1 toward the press working oil application unit 130, the press working oil application unit 130, the press working unit 140, the adhesive application unit 150, and the stacking and bonding unit 160. The strip-shaped steel sheet M fed from the other conveyance unit is fed toward the press working oil application unit 130 by the drive unit.

Also in the bonded and stacked core manufacturing method using the bonded and stacked core manufacturing apparatus 500 described above, it is possible to obtain similar operation and effects to those described in the first embodiment.

In addition, also in the second to fourth embodiments other than the first embodiment, similarly to the fifth embodiment, a constitution including divided stages of the first stage A and the second stage B may be adopted.

The embodiments of the present invention have been described above. Note that the technical scope of the present invention is not limited only to the above-described embodiments, and various modification can be made without departing from the gist of the present invention.

For example, the shape of the stator bonded and stacked core 21 is not limited only to the forms described in the embodiments. Specifically, the dimensions of the outer diameter and the inner diameter of the stator bonded and stacked core 21, the stacking thickness, the number of slots, a dimensional proportion between a circumferential direction and a radial direction of the tooth portion 23, a dimensional proportion between the tooth portion 23 and the core back portion 22 in a radial direction, and the like can be arbitrarily designed according to desired characteristics of the rotary electric machine.

In the rotor 30, the pair of permanent magnets 32 forms one magnetic pole, but an object to be manufactured by the present invention is not limited only to this form. For example, one permanent magnet 32 may form one magnetic pole, and three or more permanent magnets 32 may form one magnetic pole.

The permanent magnet field type electric motor has been described as an example of the rotary electric machine 10, but the structure of the rotary electric machine 10 is not limited only thereto as exemplified below, and furthermore, various known structures not exemplified below can also be adopted.

The permanent magnet field type electric motor has been described as an example of the rotary electric machine 10, but the present invention is not limited only thereto. For example, the rotary electric machine 10 may be a reluctance type electric motor or an electromagnetic field type electric motor (winding field type electric motor). The synchronous motor has been described as an example of the AC electric motor, but the present invention is not limited thereto. For example, the rotary electric machine 10 may be an induction electric motor.

The AC electric motor has been described as an example of the rotary electric machine 10, but the present invention is not limited thereto. For example, the rotary electric machine 10 may be a DC electric motor.

The electric motor has been described as an example of the rotary electric machine 10, but the present invention is not limited thereto. For example, the rotary electric machine 10 may be a generator.

In addition, it is possible to appropriately replace the constituent elements in the embodiments with well-known constituent elements without departing from the gist of the present invention, and the above-described modification examples may be appropriately combined with each other. For example, in the first to fifth embodiments, the curing accelerating layer a is formed only on one surface (upper surface or lower surface), but may be formed on both surfaces (upper and lower surfaces) as necessary.

EXAMPLES

First, compounds as curing accelerator components presented in Table 1 below were prepared. That is, a compound having a curing accelerating action of the anaerobic adhesive and a compound having a curing accelerating action of the instantaneous adhesive were prepared.

Then, a curing accelerator solution containing each of these compounds was prepared. Specifically, for each of Invention Examples 1 to 5 and Comparative Examples 1 to 4, a curing accelerator solution having contents presented in Table 1 was prepared. Note that, in Comparative Example 2, the contents of all the compounds are zero because Comparative Example 2 does not use a curing accelerator solution.

TABLE 1

| Adhesive | Compound component in curing accelerator solution | Invention Example 1 | Invention Example 2 | Invention Example 3 | Invention Example 4 | Invention Example 5 | Comparative Example 1 | Comparative Example 2 | Comparative Example 3 | Comparative Example 4 | Comparative Example 5 |
|---|---|---|---|---|---|---|---|---|---|---|---|
| Anaerobic adhesive | Vanadium pentoxide | 10 | 0 | 0 | 0 | 0 | 10 | 0 | 0 | 0 | 10 |
| | Manganese naphthenate | 0 | 20 | 0 | 0 | 0 | 0 | 0 | 20 | 0 | 0 |
| | Copper hexanoate | 0 | 0 | 10 | 0 | 0 | 0 | 0 | 0 | 0 | 0 |
| | Magnesium chromate | 0 | 0 | 0 | 50 | 0 | 0 | 0 | 0 | 0 | 0 |
| | Iron oxide | 0 | 0 | 0 | 0 | 20 | 0 | 0 | 0 | 0 | 0 |
| Instantaneous adhesive | Dimethylaniline | 50 | 0 | 0 | 0 | 0 | 0 | 0 | 0 | 0 | 50 |
| | Diethylamine | 0 | 300 | 0 | 0 | 0 | 0 | 0 | 0 | 0 | 0 |
| | Dimethyl para-toluidine | 0 | 0 | 10 | 0 | 0 | 0 | 0 | 0 | 0 | 0 |
| | N,N-diethylaniline | 0 | 0 | 40 | 30 | 0 | 50 | 0 | 0 | 30 | 0 |
| | Trichloroacetamide | 0 | 0 | 0 | 0 | 150 | 0 | 0 | 0 | 0 | 0 |

*All units are $\mu g/m^2$

On the other hand, a plurality of non-oriented electrical steel sheets containing 3.1% of Si, 0.6% of Al, and 0.1% of Mn in terms of average mass %, with the remainder being Fe and impurities, and having an average sheet thickness of 0.30 mm and an average surface roughness Ra (center line average roughness) in each of an L direction and a C direction of 0.28 μm was prepared. Then, except for Comparative Example 5, the above curing accelerator solution was previously applied to the surface of each of these non-oriented electrical steel sheets with an application apparatus such that an application amount was 0.5 μg/m² to 5.0 μg/m².

Then, the applied curing accelerator solution was dried with hot air at 50° C. to form a curing accelerator-applied that, in Comparative Example 1, the curing accelerator solution was not actively dried, and each item presented in Table 2 below was evaluated in a liquid state in which the curing accelerator solution under the press working oil was not naturally dried. Also in Comparative Example 5, each item presented in Table 2 below was evaluated before the curing accelerator solution on the press working oil was naturally dried.

Subsequently, initial bonding strength and final bonding strength were examined for a case where as a combination of an adhesive and a workpiece component for curing acceleration, those in Invention Examples 1 to 5 and Comparative Examples 1 to 5 were used. Results thereof are presented in Table 2 below.

TABLE 2

| Characteristics | Invention Example 1 | Invention Example 2 | Invention Example 3 | Invention Example 4 | Invention Example 5 | Comparative Example 1 | Comparative Example 2 | Comparative Example 3 | Comparative Example 4 | Comparative Example 5 |
|---|---|---|---|---|---|---|---|---|---|---|
| Initial bonding strength after 20 seconds (MPa) | 5 | 3 | 2 | 1 | 4 | 0.2 | Not bonded | 0.1 | 0.5 | 0.2 |
| Final bonding strength after 24 hours (MPa) | 14 | 9 | 9 | 12 | 14 | 3 | 1 | 6 | 3 | 2 |
| 100 sheets-stacked core taking-out time (seconds) | 10 | 8 | 10 | 12 | 10 | 180 | 300 | 60 | 180 | 300 |
| Evaluation | Good | Good | Good | Good | Good | Bad | Bad | Not Good | Bad | Bad | portion, and a press working oil was applied to the entire upper surface of the dried curing accelerator-applied portion so as to coat the upper surface.

On the other hand, in Comparative Example 1, the applied curing accelerator solution was not dried and was kept in a liquid state, and the press working oil was applied to the entire surface so as to coat the upper surface of the curing accelerator solution before the curing accelerator solution was naturally dried.

In Comparative Example 5, the press working oil was previously applied to the entire surface of the non-oriented electrical steel sheet, and subsequently, the curing accelerator solution was applied onto the press working oil with an application apparatus so as to be superimposed on the press working oil at an application amount of 0.5 μg/m² to 5.0 μg/m². That is, in Comparative Example 5, the same curing accelerator solution as in Invention Example 1 was used, but the curing accelerator solution floated on the upper surface of the press working oil. Then, before the curing accelerator solution was naturally dried, the sample was used for evaluation of initial bonding strength and final bonding strength described later.

Note that the curing accelerator compounds presented in Table 1 were used as a curing accelerator solution by previously dissolving the compounds in various solutions, previously adding the compounds to various solutions and dispersing the compounds therein in a form of fine particles, previously emulsifying the compounds in various solutions, or previously forming the compounds into a solution using a chelate in various solutions. As a solvent, in addition to pure water, an organic solvent such as dioxane, ethanol, acetone, or cellosolve was appropriately used.

The curing accelerator solution presented in Table 1 was applied or sprayed on the surface of the non-oriented electrical steel sheet in a predetermined application pattern so as to remain thinly and uniformly, and then actively dried to obtain the predetermined amounts presented in Table 1. Note In Table 2, for evaluation of the initial bonding strength and the final bonding strength, first, a plurality of sample pieces of 30 mm×60 mm was prepared from the non-oriented electrical steel sheet that had been subjected to the above-described treatment (hereinafter, referred to as "one sample piece"). In addition, a plurality of sample pieces of 30 mm×60 mm was prepared also from another non-oriented electrical steel sheet that had not been subjected to the above-described treatment (hereinafter, referred to as "other sample piece").

Then, a press working oil was applied to the entire surface of the one sample piece. Note that, in Comparative Example 5, since the press working oil had already been applied, the press working oil was not applied again.

Thereafter, 5 μl of an anaerobic adhesive and 5 μl of an instantaneous adhesive were dropped onto an end portion of the surface of the one sample piece within a range of 30 mm×10 mm to form a bonding surface. Then, immediately after the anaerobic adhesive and the instantaneous adhesive were dropped, the other sample piece was superimposed on the bonding surface of the one sample piece to start bonding.

The bonding strength was measured after retention for 20 seconds from start of the superimposition, and the measured value was defined as the initial bonding strength. Then, the bonding strength was measured after standing for 24 hours from the start of superimposition, and the measured value was defined as the final bonding strength.

In addition to evaluation of the initial bonding strength and the final bonding strength, taking-out time at the time of stacking 100 sheets was also evaluated as presented in Table 2.

That is, for the "100 sheets-stacked core taking-out time" presented in Table 2, first, a non-oriented electrical steel sheet containing the compound components presented in Table 1 was processed into a plurality of ring-shaped sample pieces having an outer diameter of 60 mm and an inner diameter of 40 mm using a die. Then, a press working oil was applied to each surface of these sample pieces, and then 5 µl of an anaerobic adhesive and 5 µl of an instantaneous adhesive were applied to each of four portions of each surface. Then, immediately after the anaerobic adhesive and the instantaneous adhesive were applied, each of these sample pieces was stacked on another sample piece.

In this stacking, in Comparative Example 1, the curing accelerator solution was not dried, and stacking was performed in a liquid state in which the curing accelerator solution under the press working oil was not naturally dried. Also in Comparative Example 5, stacking was performed before the curing accelerator solution on the press working oil was naturally dried.

Such stacking was repeated at a stacking rate of 20 spm, and as a result, 100 sample pieces were stacked to obtain a stacked core. The shortest time from a measurement start time point at which the stacking of the stacked core thus obtained was completed to a measurement end time point at which the stacked core thus obtained could be taken out without deviation was defined as "100 sheets-stacked core taking-out time". Note that when stacking was not completed due to occurrence of deviation or when it took 300 seconds or more for stacking, it is described as 300 seconds in Table 2.

Under the above evaluation results, a sample piece that was evaluated as Good in all the evaluation items was evaluated as Good in overall evaluation, a sample piece including at least one Not Good was evaluated as Not Good in overall evaluation, and a sample piece including at least one Bad was evaluated as Bad in overall evaluation.

As presented in Table 2, Good in overall evaluation was obtained in all of Invention Examples 1 to 5, whereas Bad in overall evaluation was obtained in Comparative Examples 1, 2, 4, and 5, and Not Good in overall evaluation was obtained in Comparative Example 3. From the above, it has been confirmed that by forming a curing accelerating layer obtained by applying an anaerobic adhesive curing accelerator and an instantaneous adhesive curing accelerator to one surface or both surfaces of a strip-shaped steel sheet before a press working oil is applied, and drying the curing accelerators, higher productivity can be obtained while sufficient bonding strength is ensured in manufacture of a bonded and stacked core.

In a general bonding step, either an anaerobic adhesive or an instantaneous adhesive is selected according to use, and then bonding is performed. On the other hand, in the present invention, an unusual bonding step of simultaneously using four of an anaerobic adhesive, an instantaneous adhesive, an anaerobic adhesive curing accelerator, and an instantaneous adhesive curing accelerator is adopted. As a result, high handleability immediately after bonding, that is, prevention of a deviation between electrical steel sheets when a stacked core immediately after bonding is disposed to another position is ensured by an instantaneous bonding force expressed by a combination of the instantaneous adhesive and the instantaneous adhesive curing accelerator. In addition, high durability required when a stacked core is incorporated into a motor or the like as a part is ensured by a strong bonding force expressed by a combination of the anaerobic adhesive and the anaerobic adhesive curing accelerator. As described above, both the high handleability and the high product durability can be achieved, and the high effect is as described in the above Examples.

FIELD OF INDUSTRIAL APPLICATION

According to the above aspects of the present invention, it is possible to provide a bonded and stacked core manufacturing method and a bonded and stacked core manufacturing apparatus capable of obtaining higher productivity while ensuring sufficient bonding strength in manufacture of a bonded and stacked core. Therefore, industrial applicability is significant.

BRIEF DESCRIPTION OF THE REFERENCE SYMBOLS

21 Stator bonded and stacked core (bonded and stacked core, stator for rotary electric machine)
40 Electrical steel sheet (steel sheet component, first steel sheet component, second steel sheet component)
100, 200, 300, 400, 500 Bonded and stacked core manufacturing apparatus
120, 220, 320, 420 Curing accelerating layer forming unit
130, 230, 330, 430 Press working oil application unit
140, 240, 340, 440 Press working unit
150, 250, 350, 450 Adhesive application unit
153, 253, 353, 453 Nozzle
a Curing accelerating layer
a1 Anaerobic adhesive curing accelerator
a2 Instantaneous adhesive curing accelerator
b Press working oil
c1 Anaerobic adhesive (adhesive)
c2 Instantaneous adhesive (adhesive)
M Strip-shaped steel sheet

What is claimed is:

1. A bonded and stacked core manufacturing method for manufacturing a bonded and stacked core by performing press working on a strip-shaped steel sheet with a press working oil applied to one surface or both surfaces thereof, applying an anaerobic adhesive and an instantaneous adhesive to one surface of the strip-shaped steel sheet after the press working to obtain a plurality of steel sheet components, and stacking and bonding the steel sheet components, wherein
    a curing accelerating layer is formed by applying an anaerobic adhesive curing accelerator and an instantaneous adhesive curing accelerator to one surface or both surfaces of the strip-shaped steel sheet before the press working oil is applied, and drying the anaerobic adhesive curing accelerator and the instantaneous adhesive curing accelerator.

2. The bonded and stacked core manufacturing method according to claim 1, wherein
    the anaerobic adhesive curing accelerator and the instantaneous adhesive curing accelerator are arranged in a checker shape to form the curing accelerating layer.

3. The bonded and stacked core manufacturing method according to claim 1, wherein
    the curing accelerating layer is formed by applying the anaerobic adhesive curing accelerator and the instantaneous adhesive curing accelerator to one surface or both surfaces of the strip-shaped steel sheet in a state where the anaerobic adhesive curing accelerator and the instantaneous adhesive curing accelerator are previously mixed, and drying the anaerobic adhesive curing accelerator and the instantaneous adhesive curing accelerator.

4. The bonded and stacked core manufacturing method according to claim 1, wherein
    the anaerobic adhesive curing accelerator and the instantaneous adhesive curing accelerator are arranged in a stripe shape to form the curing accelerating layer.

5. The bonded and stacked core manufacturing method according to claim 1, wherein the steel sheet components include a first steel sheet component and a second steel sheet component, and the method comprises:

a first step of preparing the first steel sheet component having a first surface, the curing accelerating layer formed on the first surface, and the press working oil disposed on the curing accelerating layer;

a second step of preparing the second steel sheet component having a second surface, and the anaerobic adhesive and the instantaneous adhesive disposed on the second surface; and a third step of superimposing and bonding the first steel sheet component and the second steel sheet component such that the first surface and the second surface face each other.

6. The bonded and stacked core manufacturing method according to claim 1, wherein the steel sheet components include a first steel sheet component and a second steel sheet component, and the method comprises:

a fourth step of preparing the first steel sheet component having a first surface, the curing accelerating layer formed on the first surface, the press working oil disposed on the curing accelerating layer, and the anaerobic adhesive and the instantaneous adhesive disposed on the press working oil;

a fifth step of preparing the second steel sheet component having a second surface; and a sixth step of superimposing and bonding the first steel sheet component and the second steel sheet component such that the first surface and the second surface face each other.

7. The bonded and stacked core manufacturing method according to claim 1, wherein the anaerobic adhesive curing accelerator contains an active component that accelerates anaerobic curing, selected from titanium, chromium, manganese, iron, cobalt, nickel, copper, zinc, silver, vanadium, molybdenum, ruthenium, saccharin, and combinations thereof.

8. The bonded and stacked core manufacturing method according to claim 1, wherein the instantaneous adhesive curing accelerator contains an active component that accelerates curing of a 2-cyanoacrylate-based adhesive, selected from organic amines such as dimethylaniline, diethylamine, o-phenylenediamine, dimethyl para-toluidine, diethyl para-toluidine, and N,N-diethylaniline, acid amides such as trichloroacetamide, organic imides such as succinimide, quaternary ammonium salts such as tetramethylammonium chloride and benzyltrimethylammonium chloride or the like, and combinations thereof.

9. The bonded and stacked core manufacturing method according to claim 1, wherein at least one of the anaerobic adhesive curing accelerator and the instantaneous adhesive curing accelerator is diluted with a solvent such as a ketone-based solvent, an alcohol-based solvent, an ester-based solvent, a glycol ether-based solvent, a hydrocarbon-based solvent, a halogenated hydrocarbon-based solvent, an ether-based solvent, a glycol-based solvent, or an amine-based solvent.

10. The bonded and stacked core manufacturing method according to claim 1, wherein the bonded and stacked core is a stator for a rotary electric machine.

* * * * *